United States Patent
Obayashi et al.

(10) Patent No.: US 10,862,336 B2
(45) Date of Patent: Dec. 8, 2020

(54) NON-CONTACT POWER-SUPPLY DEVICE WITH VOLTAGE VECTOR TARGET CONTROL

(71) Applicant: DENSO CORPORATION, Kariya (JP)

(72) Inventors: Kazuyoshi Obayashi, Kariya (JP); Akira Kamiya, Kariya (JP); Eisuke Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 923 days.

(21) Appl. No.: 15/516,336

(22) PCT Filed: Jan. 27, 2016

(86) PCT No.: PCT/JP2016/000393
§ 371 (c)(1),
(2) Date: Mar. 31, 2017

(87) PCT Pub. No.: WO2016/121383
PCT Pub. Date: Aug. 4, 2016

(65) Prior Publication Data
US 2017/0305282 A1  Oct. 26, 2017

(30) Foreign Application Priority Data

Jan. 30, 2015  (JP) ................................ 2015-017016
Nov. 25, 2015  (JP) ................................ 2015-229739

(51) Int. Cl.
*H02J 50/12* (2016.01)
*B60L 53/122* (2019.01)
(Continued)

(52) U.S. Cl.
CPC ............ *H02J 50/12* (2016.02); *B60L 53/122* (2019.02); *H02J 7/0029* (2013.01); *H02J 50/80* (2016.02);
(Continued)

(58) Field of Classification Search
CPC ... B60L 53/12–126; H02J 5/005; H02J 7/025; H02J 17/00
See application file for complete search history.

(56) References Cited

U.S. PATENT DOCUMENTS

2012/0043825 A1* 2/2012 Urano ..................... H02J 5/005
307/104
2013/0035814 A1* 2/2013 Boyer ..................... H02J 50/40
701/22

(Continued)

FOREIGN PATENT DOCUMENTS

| JP | H10-225129 A | 8/1998 |
| JP | 2012-120253 A | 6/2012 |
| JP | 2014-207795 A | 10/2014 |

*Primary Examiner* — Rexford N Barnie
*Assistant Examiner* — David A Shiao
(74) *Attorney, Agent, or Firm* — Oliff PLC

(57) ABSTRACT

A non-contact power supply device includes: a power transmission coil that generates a magnetic flux by an alternating current; a power transmission circuit that supplies the alternating current to the power transmission coil; a power transmission side control circuit that controls the power transmission circuit; a power receiving coil that generates an alternating current by interlinking the magnetic flux generated in the power transmission coil; and a power receiving circuit that converts the alternating current supplied from the power receiving coil into a direct current, and supplies the direct current to the power supply target. The power transmission side control circuit obtains a voltage vector target value based on a relationship between a voltage vector and a current vector, and controls the power transmission circuit to set the voltage vector of the alternating current output from the power transmission circuit to be the voltage vector target value.

13 Claims, 45 Drawing Sheets

(51) Int. Cl.
*H02J 50/80* (2016.01)
*H02J 7/00* (2006.01)

(52) U.S. Cl.
CPC ............ *Y02T 10/70* (2013.01); *Y02T 10/7072* (2013.01); *Y02T 90/12* (2013.01); *Y02T 90/14* (2013.01)

(56) References Cited

U.S. PATENT DOCUMENTS

| | | | | |
|---|---|---|---|---|
| 2014/0183972 | A1* | 7/2014 | Endo | H02J 50/12 |
| | | | | 307/104 |
| 2015/0042174 | A1* | 2/2015 | Friedmann | H02J 50/20 |
| | | | | 307/104 |
| 2015/0048788 | A1* | 2/2015 | Doffin | H02J 7/00034 |
| | | | | 320/108 |
| 2015/0303703 | A1* | 10/2015 | Hayashi | H02J 7/022 |
| | | | | 307/104 |
| 2015/0380944 | A1* | 12/2015 | Yu | H02J 50/12 |
| | | | | 307/104 |
| 2016/0084894 | A1* | 3/2016 | Govindaraj | H04B 5/0037 |
| | | | | 307/104 |
| 2017/0066336 | A1* | 3/2017 | Okamoto | H02J 50/80 |
| 2017/0229915 | A1* | 8/2017 | Kuboshima | H02J 50/12 |

* cited by examiner

NON-CONTACT POWER-SUPPLY DEVICE WITH VOLTAGE VECTOR TARGET CONTROL

CROSS REFERENCE TO RELATED APPLICATION

This application is based on Japanese Patent Applications No. 2015-17016 filed on Jan. 30, 2015, and NO. 2015-229739 filed on Nov. 25, 2015, the disclosures of which are incorporated herein by reference.

TECHNICAL FIELD

The present disclosure relates to a non-contact power supply device including a power transmission coil, a power transmission circuit that supplies an alternating current to the power transmission coil, and a power transmission side control circuit that controls the power transmission circuit.

BACKGROUND ART

Up to now, as the non-contact power supply device equipped with the power transmission coil, the power transmission circuit that supplies the alternating current to the power transmission coil, and the power transmission side control circuit that controls the power transmission circuit, a non-contact power supply equipment is disclosed in Patent Literature 1 described below.

The non-contact power supply equipment includes a primary conductive wire, an inverter unit, a voltage detection device, a current detection device, and a phase locked loop. The primary conductive wire and the inverter unit correspond to the power transmission coil and the power transmission circuit. The voltage detection device, the current detection device and the phase locked loop correspond to the power transmission side control circuit.

The inverter unit is connected to the primary conductive wire and supplies an alternating current to the primary conductive wire. The voltage detection device is connected to an output end of the inverter unit and detects an AC voltage output from the inverter unit. The current detection device is disposed in a wiring connecting the inverter unit and the primary conductive wire, and detects an AC current output from the inverter unit. The phase locked loop adjusts a frequency of the alternating current output from the inverter unit so as to eliminate a phase difference between the AC voltage and the AC current output from the inverter unit, which are detected by the voltage detection device and the current detection device. As a result, a loss can be suppressed.

Meanwhile, when an attempt is made to adjust the phase difference between the AC voltage and the AC current output from the inverter unit, the non-contact power supply equipment described above first detects the AC voltage and the AC current output from the inverter unit. The non-contact power supply equipment adjusts the frequency of the alternating current on the basis of the detected AC voltage and AC current, and adjusts the phase difference between the AC voltage and the AC current. In other words, the non-contact power supply equipment adjusts the phase difference between the AC voltage and the AC current through a process of adjusting the AC frequency. For that reason, a delay occurs in adjusting the phase difference. As a result, when an electric power to be transmitted from the primary conductive wire to a power receiving coil is changed, or when a magnetic coupling state between the primary conductive wire and the power receiving coil changes, a response is delayed, resulting in a possibility that an overvoltage is applied or an overcurrent flows.

PRIOR ART LITERATURES

Patent Literature

Patent Literature 1: JP-H10-225129-A

SUMMARY

It is an object of the present disclosure to provide a non-contact power supply device capable of suppressing a delay caused by control and improving a responsiveness.

According to an aspect of the present disclosure, a non-contact power supply device includes: a power transmission coil that generates a magnetic flux by receiving an alternating current; a power transmission circuit that is connected to the power transmission coil and supplies the alternating current to the power transmission coil; a power transmission side control circuit that is connected to the power transmission circuit and controls the power transmission circuit; a power receiving coil that generates an alternating current by interlinking the magnetic flux generated in the power transmission coil; and a power receiving circuit that is connected to the power receiving coil and a power supply target, converts the alternating current supplied from the power receiving coil into a direct current, and supplies the direct current to the power supply target. The power transmission side control circuit obtains a voltage vector target value based on a relationship between a voltage vector and a current vector. The power transmission side control circuit controls the power transmission circuit to set the voltage vector of the alternating current output from the power transmission circuit to be the voltage vector target value.

The above non-contact power supply device makes it possible to directly control the AC voltage and AC current output from the power transmission circuit. Therefore, the non-contact power supply device can suppress the delay caused by the control and improve the responsiveness.

BRIEF DESCRIPTION OF DRAWINGS

The above and other objects, features and advantages of the present disclosure will become more apparent from the following detailed description made with reference to the accompanying drawings. In the drawings.

EMBODIMENTS

Next, the present disclosure will be described in more detail with reference to embodiments. In the present embodiments, an example in which a non-contact power supply device according to the present disclosure is applied to a non-contact power supply device that transmits a power to a vehicle-mounted battery mounted on an electric vehicle or a hybrid vehicle in a non-contact manner will be described.

First Embodiment

A configuration of a non-contact power supply device according to a first embodiment will be described with reference to FIG. 1.

Figure 1:
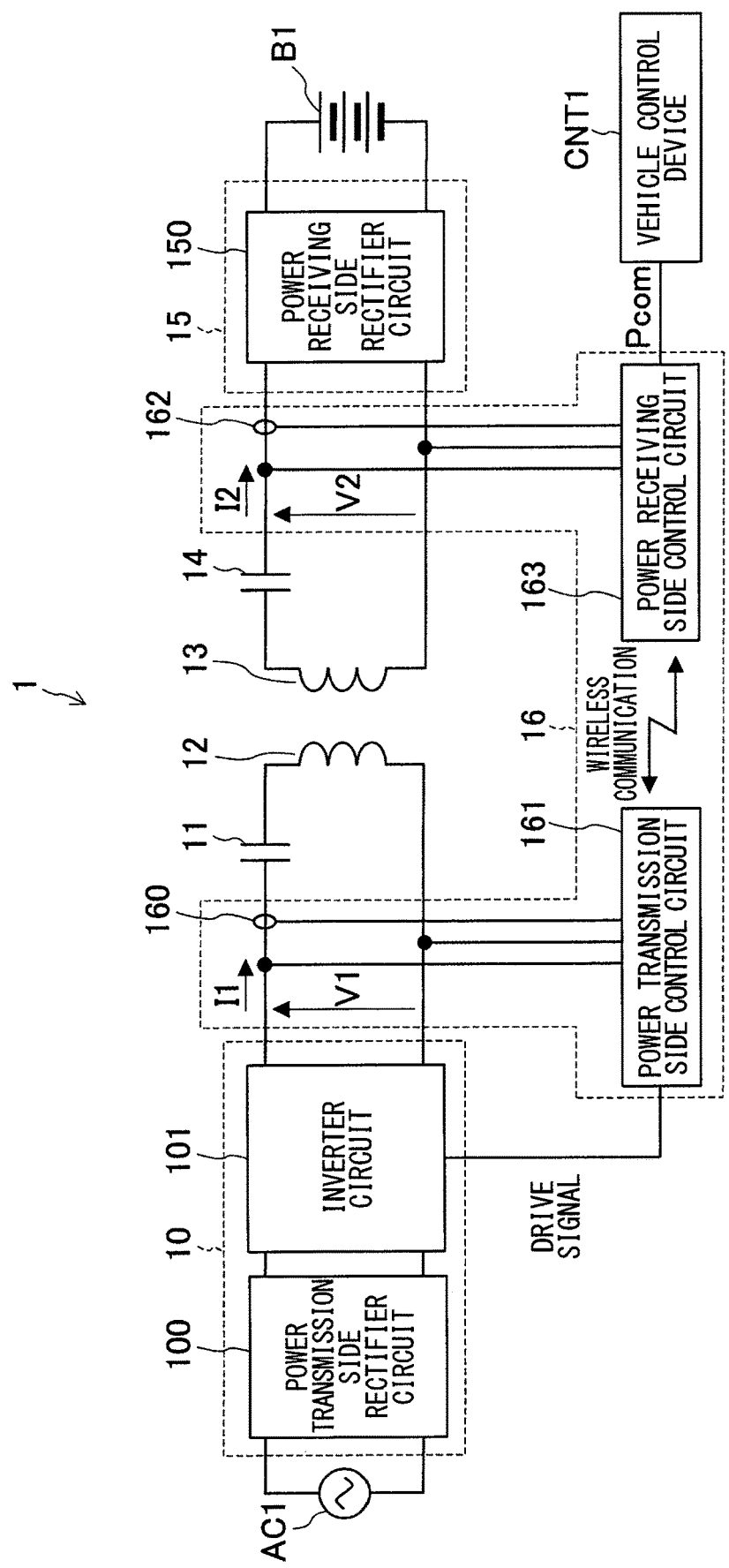
FIG. 1 is a circuit diagram of a non-contact power supply device according to a first embodiment.

A non-contact power supply device 1 illustrated in FIG. 1 is a device that transmits a power from a commercial power supply AC1 outside of a vehicle to a vehicle-mounted battery B1 (power supply target) mounted on the vehicle in a non-contact manner and charges the vehicle-mounted battery B1. The non-contact power supply device 1 includes a power transmission circuit 10, a power transmission side resonance capacitor 11, a power transmission coil 12, a power receiving coil 13, a power receiving side resonance capacitor 14, a power receiving circuit 15, and a control circuit 16.

The power transmission circuit 10 is a circuit that converts an alternating current supplied from the commercial power supply AC1 into a high frequency alternating current and supplies the high frequency alternating current to the power transmission coil 12. The power transmission circuit 10 includes a power transmission side rectifier circuit 100 and an inverter circuit 101.

The power transmission side rectifier circuit 100 is a circuit that rectifies and boosts the alternating current supplied from the commercial power supply AC1 and supplies the rectified and boosted current to the inverter circuit 101. An input end of the power transmission side rectifier circuit 100 is connected to the commercial power supply AC1, and an output end of the power transmission side rectifier circuit 100 is connected to the inverter circuit 101.

The inverter circuit 101 is a circuit that is controlled by the control circuit 16, converts a direct current supplied from the power transmission side rectifier circuit 100 into a high frequency alternating current, and supplies the converted alternating current to the power transmission coil 12. Specifically, the inverter circuit 101 is a known H-bridge circuit configured by four switching devices. The inverter circuit 101 switches the four switching devices at a predetermined timing to convert the direct current supplied from the power transmission side rectifier circuit 100 into a high frequency alternating current and supply the converted alternating current to the power transmission coil 12. An input end of the inverter circuit 101 is connected to an output end of the power transmission side rectifier circuit 100, an output end of the inverter circuit 101 is connected to the power transmission side resonance capacitor 11 and the power transmission coil 12, and a drive signal input end of the inverter circuit 101 is connected to the control circuit 16.

The power transmission side resonance capacitor 11 is an element that configures a resonance circuit together with the power transmission coil 12. One end of the power transmission side resonance capacitor 11 is connected to an output end of the inverter circuit 101 and the other end of the power transmission side resonance capacitor 11 is connected to the power transmission coil 12.

The power transmission coil 12 is an element that generates an alternating magnetic flux with the supply of the alternating current from the inverter circuit 101. The power transmission coil 12 is disposed at a predetermined position on a ground surface of a parking space. One end of the power transmission coil 12 is connected to the other end of the power transmission side resonance capacitor 11 and the other end of the power transmission coil 12 is connected to an output end of the inverter circuit 101.

The power receiving coil 13 is an element that generates the alternating current due to an electromagnetic induction by interlocking with the alternating magnetic flux generated by the power transmission coil 12. When the vehicle is parked in a parking space, the power receiving coil 13 is placed at a bottom portion of the vehicle so as to face the power transmission coil 12 at intervals in a vertical direction. One end of the power receiving coil 13 is connected to the power receiving side resonance capacitor 14, and the other end of the power receiving coil 13 is connected to the power receiving circuit 15.

The power receiving side resonance capacitor 14 is an element that configures a resonance circuit together with the power receiving coil 13. One end of the power receiving side resonance capacitor 14 is connected to one end of the power receiving coil 13 and the other end of the power receiving side resonance capacitor 14 is connected to the power receiving circuit 15.

The power receiving circuit 15 is a circuit that converts the alternating current supplied from the power receiving coil 13 connected to the power receiving side resonance capacitor 14 into the direct current and supplies the direct current to the vehicle-mounted battery B1. The power receiving circuit 15 includes a power receiving side rectifier circuit 150.

The power receiving side rectifier circuit 150 is a circuit that rectifies the alternating current supplied from the power receiving coil 13 connected to the power receiving side resonance capacitor 14, converts the alternating current into a direct current, and supplies the converted direct current to the vehicle-mounted battery B1. An input end of the power receiving side rectifier circuit 150 is connected to the other end of the power receiving side resonance capacitor 14 and the other end of the power receiving coil 13, and an output end of the power receiving side rectifier circuit 150 is connected to the vehicle-mounted battery B1.

The control circuit 16 is a circuit that controls the inverter circuit 101 on the basis of an output power target value Pcom input from a vehicle control device CNT1 and a detection result detected by the control circuit 16 itself. In this example, the output power target value Pcom is a target value of the output power of the power receiving side rectifier circuit 150, and is also a target value of the output power of the power receiving coil 13 connected to the power receiving side resonance capacitor 14. The control circuit 16 includes a power transmission side current sensor 160, a power transmission side control circuit 161, a power receiving side current sensor 162, and a power receiving side control circuit 163.

The power transmission side current sensor 160 is an element that detects the output current I1 of the inverter circuit 101 and outputs the detection result. The power transmission side current sensor 160 is disposed on a wiring connecting the inverter circuit 101 and the power transmission side resonance capacitor 11 so as to clamp the wire. An output end of the power transmission side current sensor 160 is connected to the power transmission side control circuit 161.

The power transmission side control circuit 161 is a circuit that controls the inverter circuit 101 on the basis of information related to the power receiving coil 13 and the power receiving side rectifier circuit 150 which is received from the power receiving side control circuit 163 by wireless communication. More specifically, the power transmission side control circuit 161 is a circuit that controls the switching devices so as to output the high frequency alternating current from the inverter circuit 101 on the basis of the output power target value Pcom received from the power receiving side control circuit 163 by the wireless communication, an output voltage V2 and an output current I2 of the power receiving coil 13 connected to the power receiving side resonance capacitor 14, an output voltage V1 of the inverter circuit 101 detected by the power transmission side control circuit 161 itself, and the output current I1 of the inverter circuit 101 detected by the power transmission side current sensor 160. The power transmission side control circuit 161 obtains a voltage vector target value such that a phase difference between a voltage vector and a current vector of the alternating current output from the inverter circuit 101 reaches a phase difference target value, and controls the inverter circuit 101 so that the voltage vector of the alternating current output from the inverter circuit 101 reaches the voltage vector target value. A voltage detection end of the power transmission side control circuit 161 is connected to an output end of the inverter circuit 101, a current signal input end of the power transmission side control circuit 161 is connected to an output end of the power transmission side current sensor 160, and a drive signal output end of the power transmission side control circuit 161 is connected to a drive signal input end of the inverter circuit 101.

The power receiving side current sensor 162 is an element that detects the output current I2 of the power receiving coil 13 connected to the power receiving side resonance capacitor 14 corresponding to the output current of the power receiving side rectifier circuit 150 and outputs the detection result. The power receiving side current sensor 162 is disposed on a wiring connecting the power receiving side resonance capacitor 14 and the power receiving side rectifier circuit 150 so as to clamp the wire. An output end of the power receiving side current sensor 162 is connected to the power receiving side control circuit 163.

The power receiving side control circuit 163 is a circuit that transmits information which is related to the power receiving coil 13 and the power receiving side rectifier circuit 150 and is necessary for controlling the inverter circuit 101 to the power transmission side control circuit 161 by the wireless communication. More specifically, the power receiving side control circuit 163 is a circuit that transmits the output power target value Pcom input from the vehicle control device CNT1, the output voltage V2 of the power receiving coil 13 connected to the power receiving resonance capacitor 14 corresponding to the output voltage of the power receiving side rectifier circuit 150 which is detected by the power receiving side control circuit 163 itself, and the output current I2 of the power receiving coil 13 connected to the power receiving side resonance capacitor 14, which is detected by the power receiving side current sensor 162 to the power transmission side control circuit 161 by the wireless communication. In response to a request from the power transmission side control circuit 161, the power receiving side control circuit 163 transmits information of the output power target value Pcom, the output voltage V2 of the power receiving side rectifier circuit 150 and the output current I2 to the power transmission side control circuit 161 by the wireless communication. An output power target value input end of the power receiving control circuit 163 is connected to the vehicle control device CNT1, a voltage detection end of the power receiving side control circuit 163 is connected to an output end of the power receiving side rectifier circuit 150, and a current signal input end of the power receiving side control circuit 163 is connected to an output end of the power receiving side current sensor 162.

Next, a configuration of the power transmission side control circuit will be described with reference to FIG. 2 in more detail.

Figure 2:
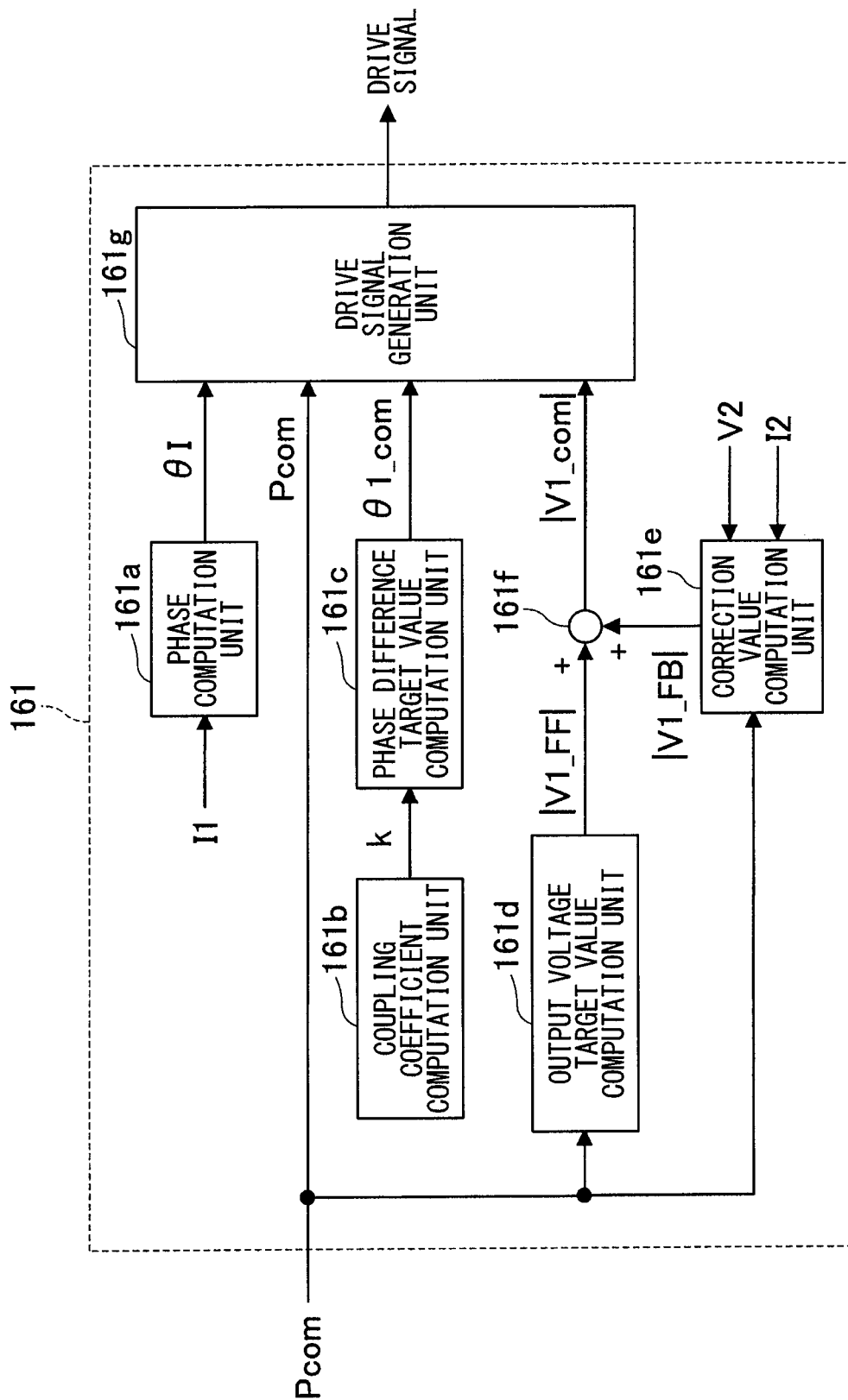
FIG. 2 is a block diagram of a power transmission side control circuit illustrated in FIG. 1.

As illustrated in FIG. 2, the power transmission side control circuit 161 includes a phase computation unit 161*a*, a coupling coefficient computation unit 161*b*, a phase difference target value computation unit 161*c*, an output voltage target value computation unit 161*d*, a correction value computation unit 161*e*, a correction unit 161*f*, and a drive signal generation unit 161*g*.

Figure 3:
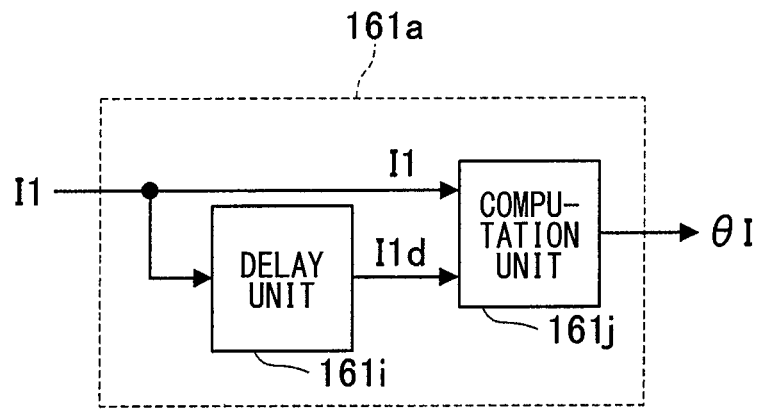
FIG. 3 is a block diagram of a phase computation unit illustrated in FIG. 2.

The phase computation unit 161*a* is a block that computes and outputs a phase θI of the output current I1 on the basis of the output current I1. In this example, the output current I1 is an output current of the inverter circuit 101 illustrated in FIG. 1, which is detected by the power transmission side current sensor 160. The phase θI of the output current is a phase of the output current I1 of the inverter circuit 101. As illustrated in FIG. 3, the phase computation unit 161*a* includes a delay unit 161*i* and a computation unit 161*j*.

The delay unit 161*i* is a block that outputs an output current I1*d* before 1/4 cycles, on the basis of the output current I1.

The computation unit 161*j* is a block that computes and outputs the phase θ1 of the output current I1 on the basis of the output current I1 and the output current I1*d* before the 1/4 cycles output from the delay unit 161*i*. The computation unit 161*j* computes and outputs the phase θI on the basis of Expression 1.

$$\theta I = \tan^{-1}\left(\frac{I1d}{I1}\right) + \frac{\pi}{2} \qquad [\text{Ex. 1}]$$

Figure 4:
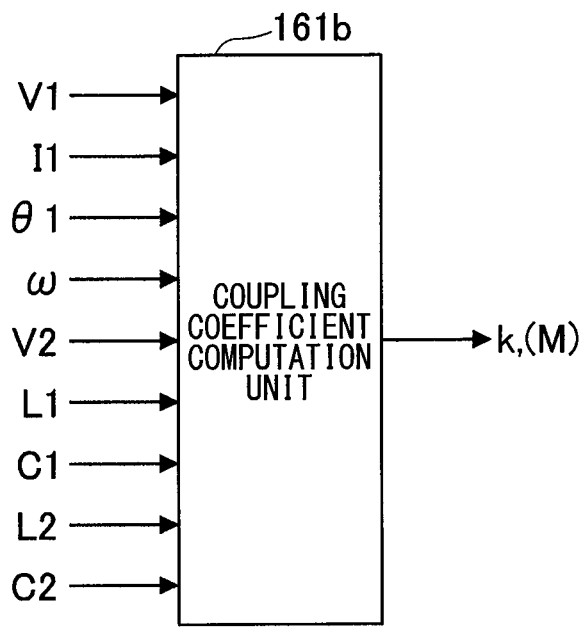
FIG. 4 is a block diagram of a coupling coefficient computation unit illustrated in FIG. 2.

As illustrated in FIG. 4, the coupling coefficient computation unit 161*b* illustrated in FIG. 2 is a block that computes and outputs a coupling coefficient k between the power transmission coil 12 and the power receiving coil 13 on the basis of the output voltage V1, the output current I1, a phase difference θ1, an angular frequency ω, the output voltage V2, an inductance L1 and a capacitance C1, and an inductance L2 and a capacitance C2. The coupling coefficient computation unit 161*b* also computes a mutual inductance M of the power transmission coil 12 and the power receiving coil 13 in a process of computing the coupling coefficient k. In this example, the output voltage V1 is an output voltage of the inverter circuit 101 illustrated in FIG. 1, which is detected by the power transmission side control circuit 161. The phase difference θ1 is a phase difference between the output voltage V1 and the output current I1 of the inverter circuit 101, which is detected from the output voltage V1 and the output current I1. The angular frequency ω is an angular frequency of the alternating current output from the inverter circuit 101, which is detected from the output voltage V1 or the output current I1. Alternatively, the angular frequency ω is obtained from a drive signal. The output voltage V2 is an output voltage of the power receiving coil 13 connected to the power receiving side resonance capacitor 14, and the output voltage V2 is acquired by the wireless communication, which is detected by the power receiving side control circuit 163. The inductance L2 is an inductance of the power receiving coil 13, and the capacitance C2 is a capacitance of the power receiving side resonance capacitor 14, which has been previously set in the power receiving side control circuit 163 and is acquired by the wireless communication. The inductance L1 is an inductance of the power transmission coil 12 and the capacitance C1 is a capacitance of the power transmission side resonance capacitor 11, which has been set in the power transmission side control circuit 161 in advance.

Figure 5:
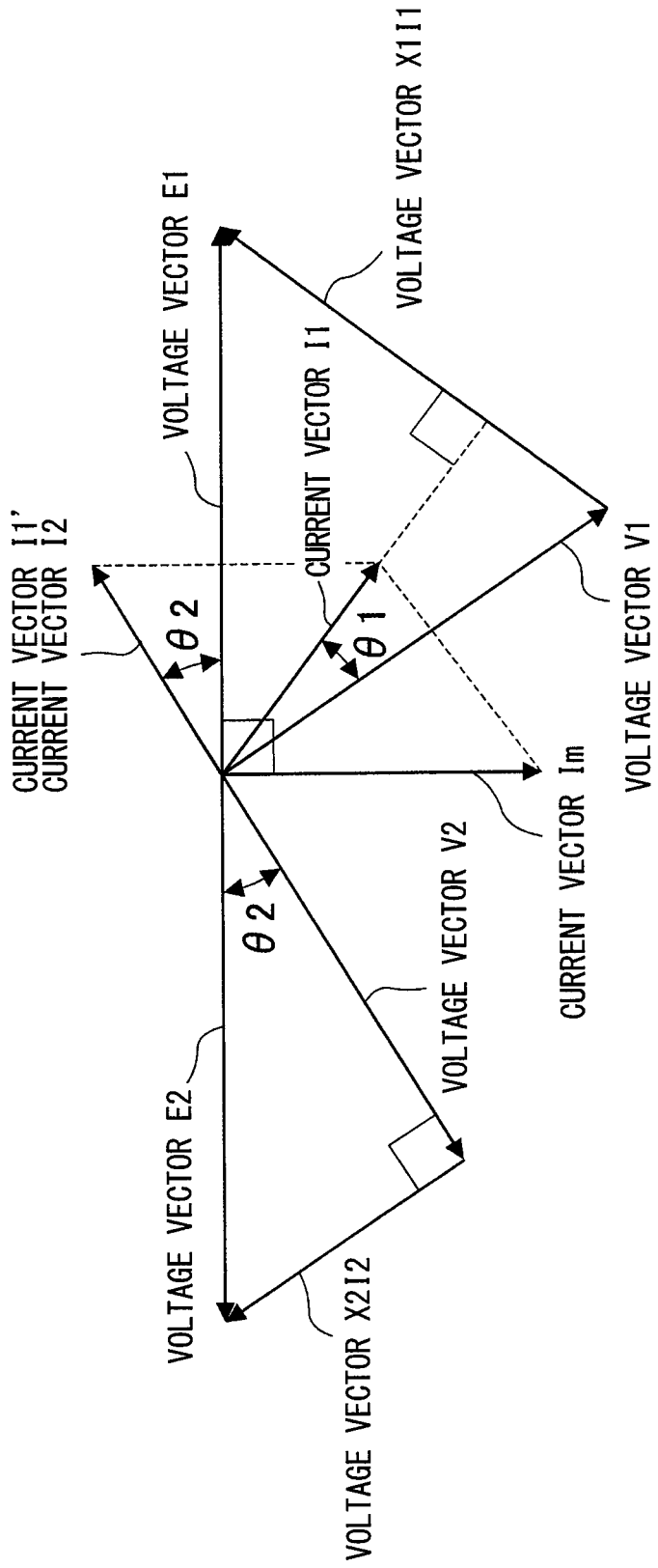
FIG. 5 is a vector diagram illustrating a voltage vector and a current vector of each part of the non-contact power supply device according to the first embodiment.

Incidentally, the voltage vector and the current vector of each part of the non-contact power supply device 1 have a relationship as illustrated in FIG. 5. The vector diagram illustrated in FIG. 5 illustrates a relationship between the voltage vector and the current vector in rotation coordinates rotating at the angular frequency ω. The relationship between the voltage vector and the current vector in the rotating coordinate system can be converted into a stationary coordinate system using the phase θI through a known method of converting the rotating coordinate system widely used in a motor control into the stationary coordinate system. In this example, the voltage vector V1 is a voltage vector indicative of the output voltage of the inverter circuit 101, and the current vector I1 is a current vector indicative of the output current of the inverter circuit 101. The phase difference θ1 is a phase difference between the voltage vector V1 and the current vector I1. A voltage vector E1 is a voltage vector obtained by vectorially combining the voltage vector V1 with a voltage vector X1I1 indicative of an electromotive voltage developed by a combined impedance X1 of the leakage inductance not coupled with the power receiving coil 13 and the capacitance of the power transmission side resonance capacitor 11 in the power transmission coil 12 connected with the power transmission side resonance capacitor 11. In this example, the impedance X1 is obtained on the basis of Expression 2.

$$X1 = \omega \cdot (L1 - M) - \frac{1}{\omega \cdot C1} \quad [\text{Ex. 2}]$$

A current vector Im is a current vector indicative of an exciting current component of the current vector I1, and a phase difference from the voltage vector E1 is 90 deg. A current vector I1' is a current vector indicative of a load current component of the current vector I1. A vector sum of the current vector Im and the current vector I1' becomes the current vector I1. A current vector I2 is a current vector indicative of an output current of the power receiving coil 13 connected to the power receiving side resonance capacitor 14 and is the same as the current vector I1'. A voltage vector E2 is a voltage vector indicative of the electromotive voltage of the power receiving coil 13 connected to the power receiving side resonance capacitor 14, and the voltage vector E2 is a voltage vector obtained by vectorially combining the voltage vector V2 with a voltage vector X2I2 indicative of an electromotive voltage developed by a combined impedance X2 of the leakage inductance not coupled with the power transmission coil 12 and the capacitance of the power receiving side resonance capacitor 14 in the power receiving coil 13 connected with the power receiving side resonance capacitor 14. The voltage vector E2 has the same magnitude as that of the voltage vector E1 and has an opposite phase. In this example, the impedance X2 is obtained on the basis of Expression 3.

$$X2 = \omega \cdot (L2 - M) - \frac{1}{\omega \cdot C2} \quad [\text{Ex. 3}]$$

A voltage vector V2 is a voltage vector indicative of the output voltage of the power receiving coil 13 connected to the power receiving side resonance capacitor 14, that is, the output voltage of the connected power receiving side resonance capacitor 14 and the power receiving coil 13. A phase difference θ2 is a phase difference between the voltage vector E2 and the voltage vector V2 and is also a phase of the current vector I2 with respect to the voltage vector E1.

Because the voltage E1 which is a magnitude of the voltage vector E1 and the voltage E2 which is a magnitude of the voltage vector E2 are equal to each other, the coupling coefficient computation unit 161b illustrated in FIG. 2 computes and outputs the mutual inductance M through Expressions 4 and 5.

$$E1 = \sqrt{[V1^2 + X1^2 \cdot I1^2 - 2 \cdot V1 \cdot X1 \cdot \sin\theta 1]} \quad [\text{Ex. 4}]$$

$$= \sqrt{\left[\begin{array}{c} V1^2 + \left\{\omega \cdot (L1 - M) - \frac{1}{\omega \cdot C1}\right\}^2 \cdot \\ I1^2 - 2 \cdot V1 \cdot \left\{\omega \cdot (L1 - M) - \frac{1}{\omega \cdot C1}\right\} \cdot I1 \cdot \sin\theta 1 \end{array}\right]}$$

$$E2 = \sqrt{[V2^2 + X2^2 \cdot I2^2]} \quad [\text{Ex. 5}]$$

$$= \sqrt{\left[V2^2 + \left\{\omega \cdot (L2 - M) - \frac{1}{\omega \cdot C2}\right\}^2 \cdot I2^2\right]}$$

The coupling coefficient k is computed and outputted on the basis of Expression 6.

$$k = \frac{M}{\sqrt{L1 \cdot L2}} \quad [\text{Ex. 6}]$$

The phase difference target value computation unit 161c is a block that computes and outputs a phase difference target value θ1_com that is a target value of the phase difference between the output voltage V1 and the output current I1 according to a coupling coefficient k output from the coupling coefficient computation unit 161b on the basis of a vector diagram showing a relationship between the voltage vector and the current vector.

Figure 6:
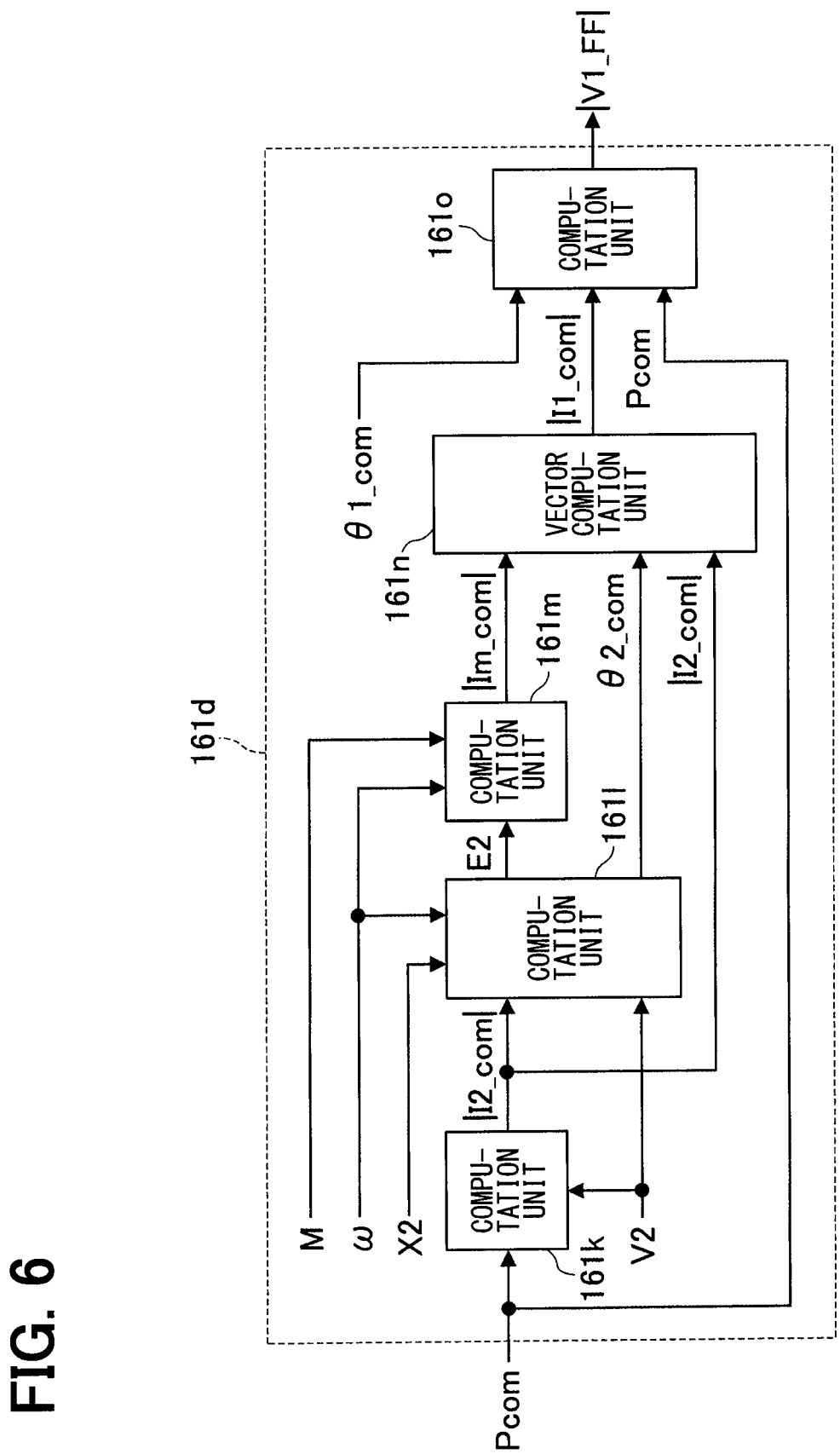
FIG. 6 is a block diagram of an output voltage target value computation unit illustrated in FIG. 2.

As illustrated in FIG. 6, the output voltage target value computation unit 161d is a block that computes and outputs an output voltage target value |V1_FF| that is a target value of the magnitude of the voltage vector indicative of the output voltage of the inverter circuit 101 according to the mutual inductance M, the angular frequency ω, the impedance X2, the output power target value Pcom, the output voltage V2, and the phase difference target value θ1_com on the basis of a vector diagram showing a relationship between the voltage vector and the current vector. In this example, the impedance X2 is obtained through Expression 3 on the basis of the information obtained by the wireless communication. The output power target value Pcom is a target value of the output power of the power receiving side rectifier circuit 150, which is input from the vehicle control device CNT1 to the power receiving side control circuit 163 and obtained by the wireless communication. The output voltage target value computation unit 161d includes computation units 161k to 161m, a vector computation unit 161n, and a computation unit 161o.

The computation unit 161k is a block that calculates and outputs an output current target value |I2_com| which is a target value of the magnitude of the current vector indicative of the output current of the power receiving coil 13 connected to the power receiving side resonance capacitor 14 on the basis of the output power target value Pcom and the output voltage V2. The computation unit 161k computes and outputs the output current target value |I2_com| on the basis of Expression 7.

$$|I2\_com| = \frac{Pcom}{|V2|} \quad [\text{Ex. 7}]$$

The computation unit 161l is a block that computes and outputs the voltage E2 and a phase target value θ2_com which is a target value of the phase of the output current I2 on the basis of the angular frequency ω, the impedance X2, and the output current target value |I2_com| and the output voltage V2 which are output from the computation unit 161k. The computation unit 161l computes and outputs the voltage E2 and the phase target value θ2_com on the basis of Expressions 8 and 9.

$$E2 = \sqrt{V2^2 + (X2 \cdot |I2\_com|)^2} \quad [\text{Ex. 8}]$$

$$\theta 2\_com = \tan^{-1}\frac{X2 \cdot |I2\_com|}{V2} \quad [\text{Ex. 9}]$$

The computation unit 161*m* is a block that computes and outputs an excitation current target value |Im_com| which is a target value of the magnitude of the excitation current vector flowing through the power transmission coil 12, on the basis of the mutual inductance M, the angular frequency ω, and the voltage E2 output from the computation unit 161. The computation unit 161*m* computes and outputs the excitation current target value |Im_com| on the basis of Expression 10.

$$|Im\_com| = \frac{E2}{\omega \cdot M} \quad [\text{Ex. 10}]$$

Figure 7:
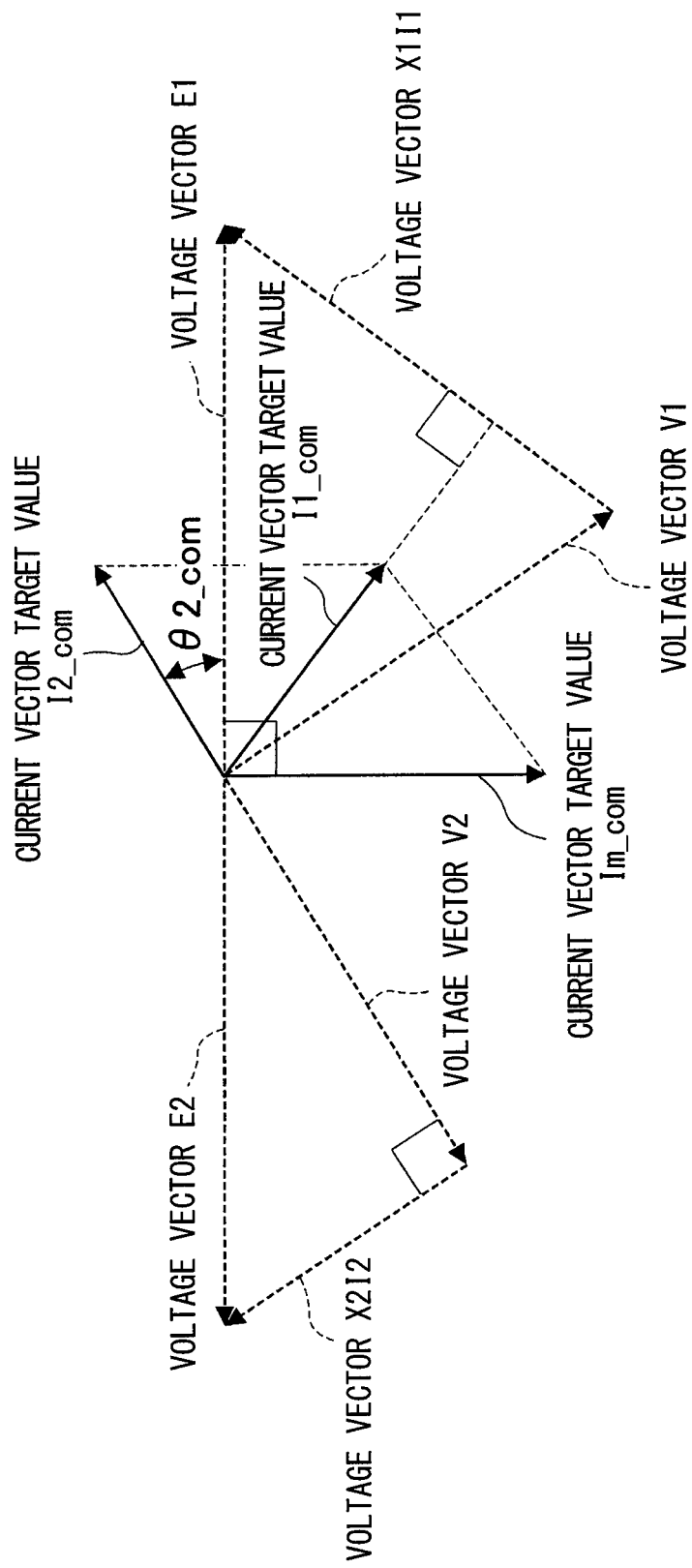
FIG. 7 is a vector diagram illustrating the operation of an output current target value computation unit illustrated in FIG. 2.

The vector computation unit 161*n* is a block that vectorially computes and outputs an output current target value |I1_com| which is a target value of the magnitude of the current vector indicative of the output current of the inverter circuit 101 on the basis of the excitation current target value |Im_com| output from the computation 161*m* unit, the phase target value θ2_com output from the computation unit 161*l*, and the output current target value |I2_com| output from the computation unit 161*k*. As illustrated in FIG. 7, the vector computation unit 161*n* vectorially synthesizes the current vector target values Im_com and I2_com, which are target values for the current vectors Im and I2 illustrated in FIG. 5, and obtains the current vector target value I1_com which is a target value for the current vector I1 illustrated in FIG. 5. Specifically, as illustrated in FIG. 5, a phase difference between the current vector Im and the voltage vector E1 is 90 degrees, a phase of the current vector I2 with respect to the voltage vector E1 is θ2, and the target value for the phase θ2 is the phase target value θ2_com as illustrated in FIG. 7. Therefore, the output current target value |I1_com| is obtained on the basis of the excitation current target value |Im_com| and the output current target value |I2_com|.

The computing unit 161*o* illustrated in FIG. 6 is a block that computes and outputs an output voltage target value |V1_FF| which is a target value of the magnitude of the voltage vector indicative of the output voltage of the inverter circuit 101 on the basis of the output current phase difference target value θ1_com output from the vector computation unit 161*n*, the output current target value |I1_com| output from the computation unit 161*n*, and the output power target value Pcom. The computation unit 161*o* computes and outputs the output voltage target value |V1_FF| on the basis of Expression 11.

$$|V1\_FF| = \frac{Pcom}{|I1\_com| \cdot \cos(\theta 1\_com)} \quad [\text{Ex. 11}]$$

Figure 8:
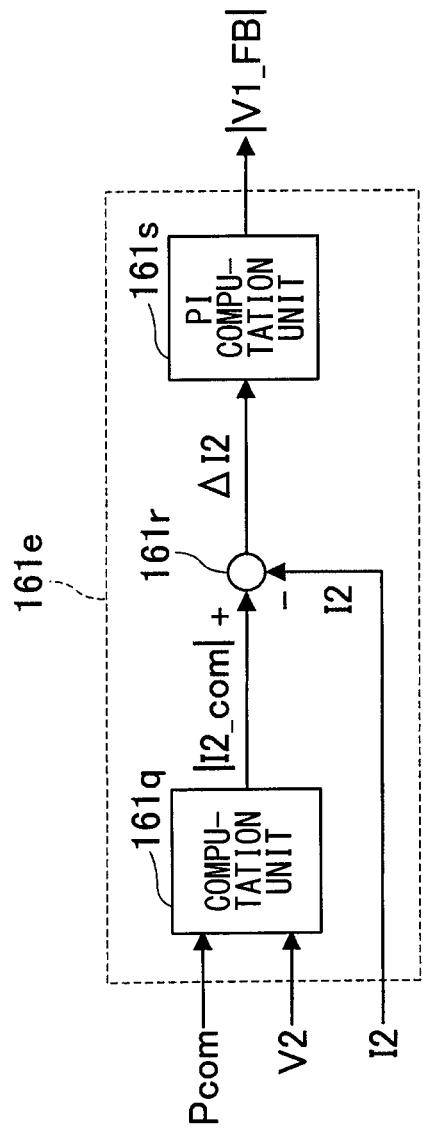
FIG. 8 is a block diagram of a correction value computation unit illustrated in FIG. 2.

As illustrated in FIG. 8, the correction value computation unit 161*e* illustrated in FIG. 2 is a block that computes and outputs a correction value |V1_FB| for correcting the output voltage target value |V1_FF| on the basis of the output power target value Pcom, the output voltage V2 and the output current I2. In this example, the output current I2 is an output current of the power receiving side rectifier circuit 150 illustrated in FIG. 1, which is input from the power receiving side current sensor 162 to the power receiving side control circuit 163 and obtained by the wireless communication. The correction value computation unit 161*e* includes computation units 161*q*, 161*r* and a PI computation unit 161*s*.

The computation unit 161*q* illustrated in FIG. 8 is a block that computes and outputs an output current target value |I2_com| which is a target value of the magnitude of the current vector indicative of the output current of the power receiving side rectifier circuit 150 on the basis of the output power target value Pcom and the output voltage V2. The computation unit 161*q* computes and outputs the output current target value |I2_com| on the basis of Expression 12.

$$|I2\_com| = \frac{Pcom}{|V2|} \quad [\text{Ex. 12}]$$

The computation unit 161*r* is a block that computes and outputs a deviation ΔI2 between the output current target value |I2_com| output from the computation unit 161*q* and the output current I2. The computation unit 161*r* computes and outputs the deviation ΔI2 on the basis of Expression 13.

$$\Delta I2 = |I2\_com| - I2 \quad [\text{Ex. 13}]$$

The PI computation unit 161*s* is a block that proportionally integrates the deviation ΔI2 output from the computation unit 161*r* and outputs the integrated value as a correction value |V1_FB|.

As illustrated in FIG. 2, the correction unit 161*f* is a block that adds a correction value |V1_FB| output from the correction value computation unit 161*e* to an output voltage target value |V1_FF| output from the output voltage target value computation unit 161*d* to output the added target value as a new output voltage target value |V1_com|.

Figure 9:
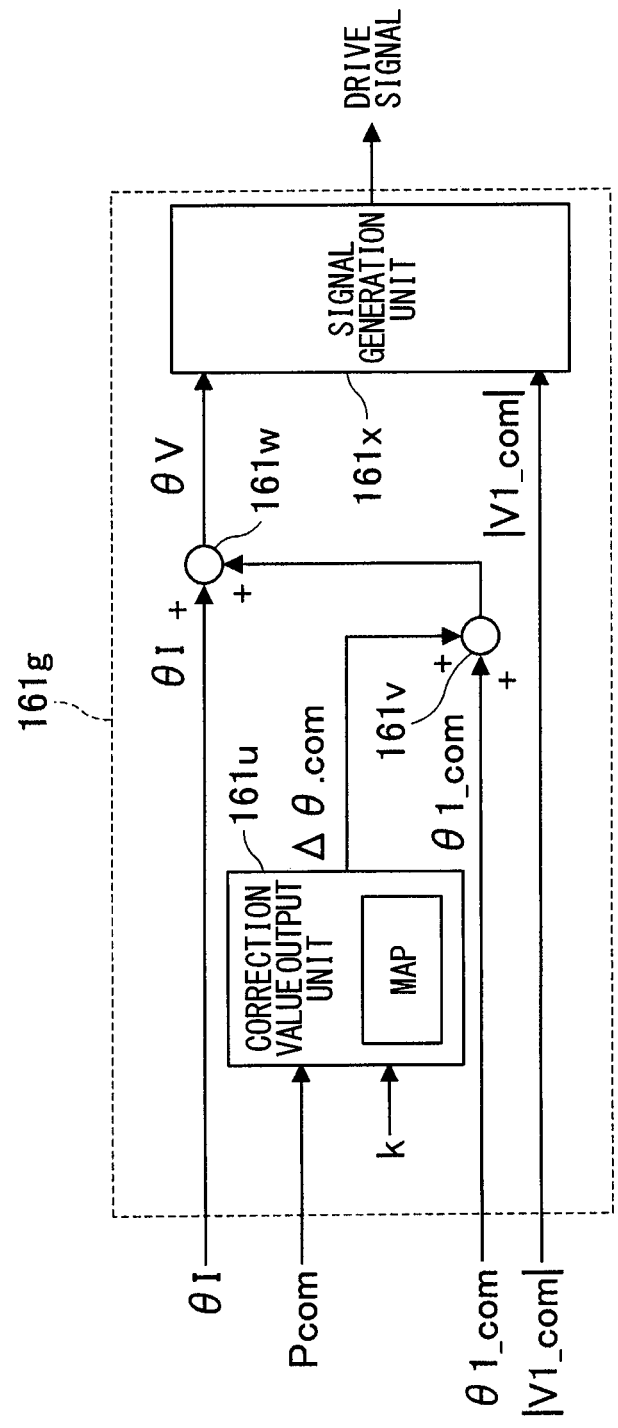
FIG. 9 is a block diagram of a drive signal generation unit illustrated in FIG. 2.

As illustrated in FIG. 9, the drive signal generation unit 161*g* is a block that generates and outputs a drive signal for controlling the switching device of the inverter circuit 101 on the basis of the phase θI, the output power target value Pcom, the coupling coefficient k, the phase difference target value θ1_com, and the output voltage target value |V1_com|. The drive signal generation unit 161*g* includes a correction value output unit 161*u*, computation units 161*v* and 161*w*, and a signal generation unit 161*x*.

Figure 10:
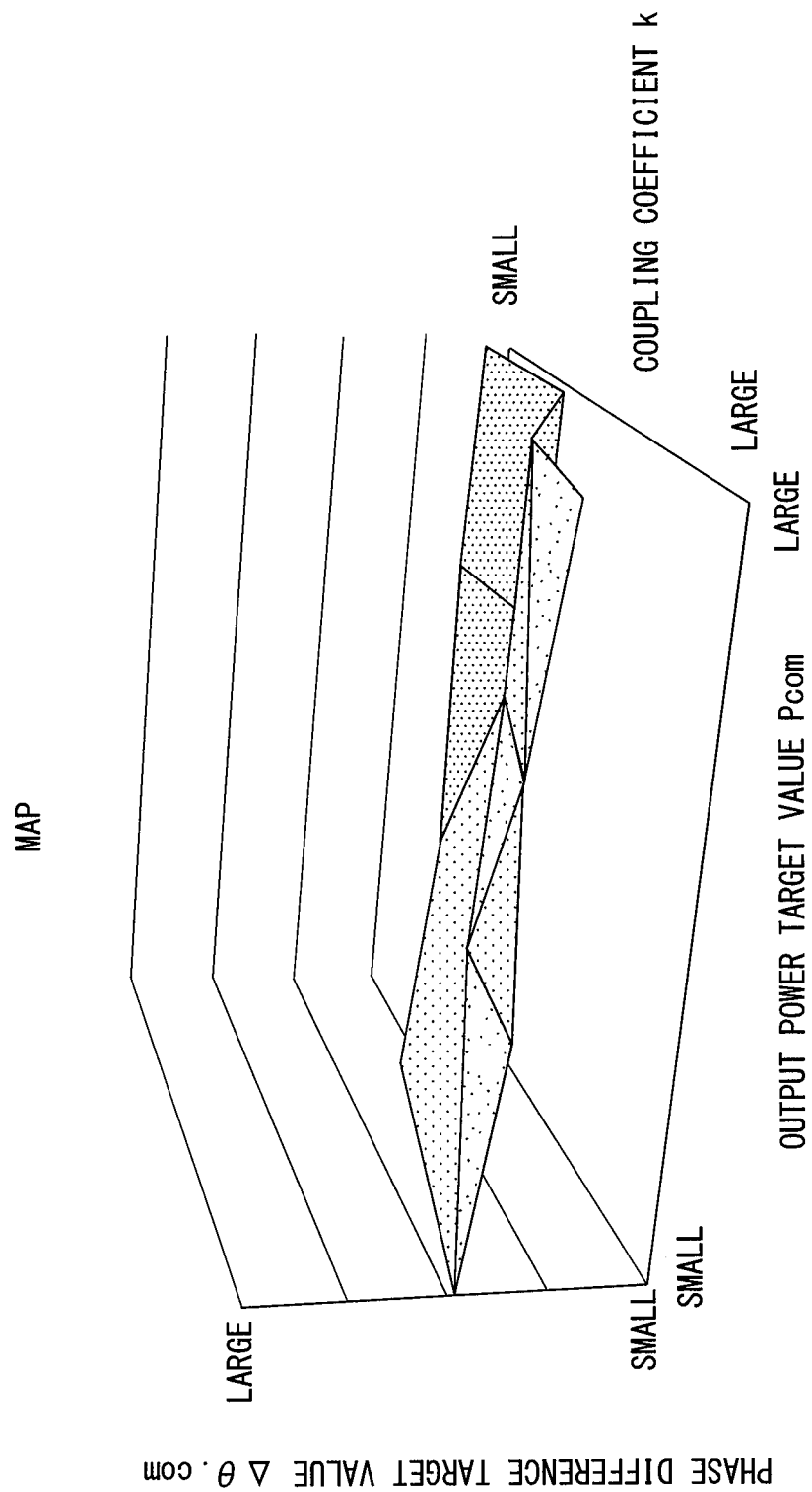
FIG. 10 is an illustrative diagram illustrating a map illustrated in FIG. 9.

In the case where the switching device of the inverter circuit 101 is subjected to a PWM control on the basis of the output power target value Pcom, the coupling coefficient k, and a map set in advance, the correction value output unit 161*u* is a block that obtains and outputs a correction value Δθ.com for correcting a phase difference target value θ1_com so that a current flowing through the subject switching device falls within a predetermined range close to 0 when the switching device turns off. In this example, as illustrated in FIG. 10, the map defines a relationship between the output power target value Pcom and the correction value Δθ.com for the coupling coefficient k. The map is obtained and set in advance by experiment and simulation.

As illustrated in FIG. 9, the computation unit 161*v* is a block that adds the correction value Δθ.com output from the correction value output unit 161*u* to the phase difference target value θ1_com, and outputs the added value as a new phase difference target value.

The computation unit 161*w* is a block that adds the output of the computation unit 161*v* to the phase θI and outputs a phase target value θV which is a target value of the phase of the voltage vector indicative of the output voltage of the inverter circuit 101. The computation unit 161w computes and outputs the phase target value θV on the basis of Expression 14.

$$\theta V = \theta I + (\theta 1\_com + \Delta\theta.com) \qquad [\text{Ex. 14}]$$

The signal generation unit 161x is a block that generates and outputs a drive signal for controlling the switching devices of the inverter circuit 101 on the basis of the phase target value θV and the output voltage target value |V1_com| output from the computation unit 161w, which are the target values of the voltage vector. The signal generation unit 161x generates and outputs a drive signal such that the phase of the voltage vector indicative of the output voltage of the inverter circuit 101 becomes θV and the magnitude of the voltage vector becomes |V1_com|.

Next, the operation of the non-contact power supply device according to the first embodiment will be described with reference to FIGS. 1 to 4, 6, 8, 9, and 11 to 13.

When the vehicle is parked in a parking space, the power transmission coil 12 and the power receiving coil 13 illustrated in FIG. 1 are opposed to each other with a predetermined space in a vertical direction. When a charging start button (not shown) is pressed in this state and a start of charging is instructed, the non-contact power supply device 1 starts operation.

In response to a request from the power transmission side control circuit 161, the power receiving side control circuit 163 transmits information of the output power target value Pcom, the output voltage V2, and the output current I2 to the power transmission side control circuit 161 by the wireless communication.

The power transmission side rectifier circuit 100 rectifies and boosts the alternating current supplied from the commercial power supply AC1 and supplies the rectified and boosted current to the inverter circuit 101.

The power transmission side control circuit 161 obtains the voltage vector target value so that the phase difference between the voltage vector and the current vector of the alternating current outputted from the inverter circuit 101 becomes the phase difference target value on the basis of the output power target value Pcom received from the power receiving side control circuit 163 by the wireless communication, the output voltage V2, the output current I2, the output voltage V1 detected by the power transmission side control circuit 161 itself, and the output current I1 detected by the power transmission side current sensor 160. The power transmission side control circuit 161 controls the inverter circuit 101 so that the voltage vector of the alternating current becomes the voltage vector target value.

As illustrated in FIG. 3, the phase computation unit 161a illustrated in FIG. 2 computes and outputs the phase θI through Expression 1 on the basis of the output current I1.

As illustrated in FIG. 4, the coupling coefficient computation unit 161b illustrated in FIG. 2 computes and outputs the mutual inductance M through Expressions 2 and 3 on the basis of the output voltage V1, the output current a phase difference θ1, an angular frequency ω, the output voltage V2, an inductance L1 and a capacitance C1, and an inductance L2 and a capacitance C2. The coupling coefficient k is computed and output on the basis of Expression 6.

The phase difference target value computation unit 161c illustrated in FIG. 2 computes and outputs the phase difference target value θ1_com on the basis of the coupling coefficient k. When the phase difference between the AC voltage and the AC current output from the inverter circuit 101 is to be zeroed, the phase difference target value computation unit 161c outputs 0 as the phase difference target value θ1_com.

As illustrated in FIG. 6, the output voltage target value computation unit 161d computes and outputs the output voltage target value |V1_FF| through Expressions 7 to 11 on the basis of the mutual inductance M, the angular frequency ω, the impedance X2, the output power target value Pcom, the output voltage V2, and the phase difference target value θ1_com.

As illustrated in FIG. 8, the correction value computation unit 161e illustrated in FIG. 2 computes and outputs the correction value |V1_FB| on the basis of the output power target value Pcom, the output voltage V2 and the output current I2. As illustrated in FIG. 2, the correction unit 161f is a block that adds the correction value |V1_FB| output from the correction value computation unit 161e to an output voltage target value |V1_FF| to output the added target value as a new output voltage target value |V1_com|.

As illustrated in FIG. 9, the drive signal generation unit 161g includes the correction value output unit 161u, the computation units 161v and 161w, and the signal generation unit 161x.

The correction value output unit 161u obtains the correction value Δθ.com on the basis of the output power target value Pcom, the coupling coefficient k, and the map. The computation unit 161v adds the correction value Δθ.com to the phase difference target value θ1_com to obtain a new phase difference target value. The computation unit 161w adds the output of the computation unit 161v to the phase θI and outputs the phase target value θV.

The signal generation unit 161x generates and outputs the drive signal for controlling the switching devices of the inverter circuit 101 on the basis of the phase target value θV and the output voltage target value |V1_com|, which are the target values of the voltage vector.

The inverter circuit 101 switches the four switching devices according to the drive signal to convert the direct current supplied from the power transmission side rectifier circuit 100 into a high frequency alternating current and supply the converted alternating current to the power transmission coil 12.

Figure 11:
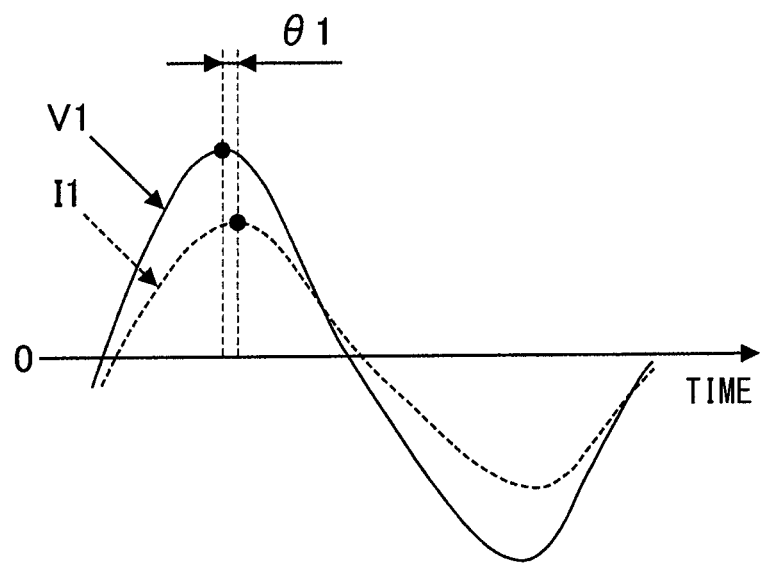
FIG. 11 is a waveform diagram of an output voltage and an output current in the case where an output voltage of an inverter circuit illustrated in FIG. 1 is a sinusoidal waveform.
Figure 12:
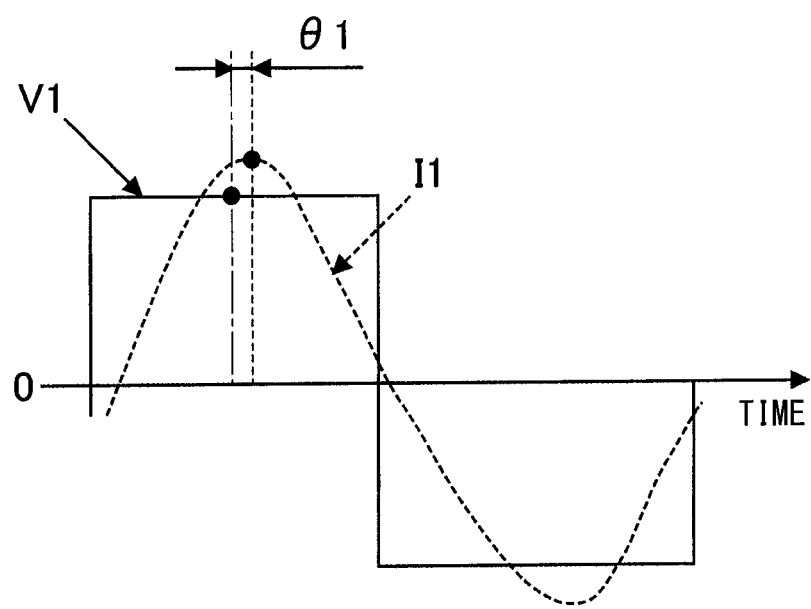
FIG. 12 is a waveform diagram of an output voltage and an output current in the case where the output voltage of the inverter circuit illustrated in FIG. 1 is a rectangular waveform under a 180-degree energization control.
Figure 13:
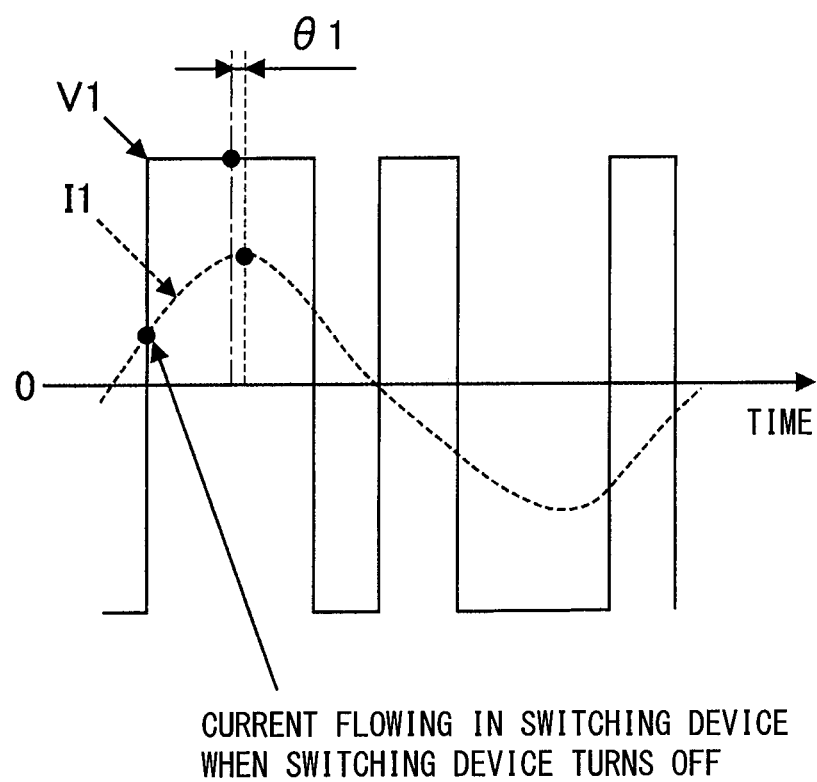
FIG. 13 is a waveform diagram of an output voltage and an output current in the case where the output voltage of the inverter circuit illustrated in FIG. 1 is a rectangular waveform under a PWM control.

As a result, as illustrated in FIG. 11, when the AC voltage output from the inverter circuit 101 has a sinusoidal waveform, a phase difference θ1 between a peak point of the sinusoidal output voltage and a peak point of the sinusoidal output current is controlled to the phase difference target value θ1_com. As illustrated in FIG. 12, when the inverter circuit 101 performs a 180-degree energization control and the AC voltage output from the inverter circuit 101 is of a rectangular waveform whose amplitude changes every 180 degrees, the phase difference θ1 between a center point of the rectangular waveform output voltage and the peak point of the sinusoidal output current is controlled to the phase difference target value θ1_com. As illustrated in FIG. 13, in the case where the inverter circuit 101 performs the PWM control and the AC voltage output from the inverter circuit 101 is of a rectangular waveform having a varying width, the phase θ1 of the center point of the rectangular waveform output voltage corresponding to the peak point of the sine wave and the peak point of the sinusoidal output current is controlled to the phase difference target value θ1_com. In that case, when a correction with the correction value Δθ.com is performed by the computation unit 161v, and the switching device is turned on, the current flowing through the switching device is controlled so as to fall within a predetermined range close to zero.

The power receiving coil 13 generates the alternating current due to an electromagnetic induction by interlocking with the alternating magnetic flux generated by the power transmission coil 12. The power receiving side rectifier circuit 150 rectifies the alternating current supplied from the power receiving coil 13 connected to the power receiving side resonance capacitor 14, converts the alternating current into a direct current, supplies the converted direct current to the vehicle-mounted battery B1, and charges the vehicle-mounted battery B1. In that manner, the power can be transmitted from the commercial power supply AC1 to the vehicle-mounted battery B1 in a non-contact manner.

Subsequently, advantages of the non-contact power supply device according to the first embodiment will be described.

According to the first embodiment, the power transmission side control circuit 161 obtains the voltage vector target value |V1_FF| on the basis of the relationship between the voltage vector and the current vector. The power transmission side control circuit 161 controls the inverter circuit 101 so that the voltage vector of the alternating current output from the inverter circuit 101 is kept at the voltage vector target value |V1_FF|. For that reason, the power transmission side control circuit 161 can directly control the AC voltage and AC current output from the inverter circuit 101. Therefore, the non-contact power supply device can suppress the delay caused by the control and improve the responsiveness.

According to the first embodiment, the power transmission side control circuit 161 obtains the voltage vector target value |V1_FF| with the use of the voltage vector X1I1 indicative of an electromotive voltage generated by an impedance X1 including a leakage inductance not coupled with the power receiving coil 13, and a voltage vector X2I2 indicative of an electromotive voltage generated by an impedance X2 including a leakage inductance not coupled with the power transmission coil 12, on the basis of a relationship between the voltage vector and the current vector. For that reason, the voltage vector target value |V1_FF| can be obtained more accurately.

According to the first embodiment, the power transmission side control circuit 161 obtains a voltage vector target value such that a phase difference between a voltage vector and a current vector of the alternating current output from the inverter circuit 101 reaches a phase difference target value, and controls the inverter circuit 101 so that the voltage vector of the alternating current output from the inverter circuit 101 reaches the voltage vector target value. Therefore, in order to adjust the phase difference between the AC voltage and the AC current output from the inverter circuit 101, there is no need to adjust the AC frequency. The phase difference between the AC voltage and the AC current can be directly controlled. Therefore, the non-contact power supply device can suppress the delay caused by the control and more reliably improve the responsiveness.

According to the first embodiment, the power transmission side control circuit 161 obtains the output voltage target value that is a target value of the magnitude of the voltage vector, which configures the voltage vector target value on the basis of the output power target value Pcom that is the target value of the power supplied from the power receiving side rectifier circuit 150 to the vehicle-mounted battery B1. This makes it possible to directly control the phase of the AC voltage and the AC current and to control the power supplied from the power receiving side rectifier circuit 150 to the vehicle-mounted battery B1 to the output power target value Pcom.

According to the first embodiment, the power transmission side control circuit 161 obtains the output voltage target value |V1_FF| on the basis of the output power target value Pcom, the mutual inductance M of the power transmission coil 12 and the power receiving coil 13, the angular frequency $\omega$ of the alternating current output from the inverter circuit 101, and the inductance L2 of the power receiving coil 13. More specifically, the output voltage target value computation unit 161d computes the output voltage target value |V1_FF| through Expressions 7 to 11 on the basis of the mutual inductance M, the angular frequency $\omega$, the impedance X2, the output power target value Pcom, the output voltage V2, and the phase difference target value $\theta$1_com. For that reason, the power transmission side control circuit 161 can reliably obtain the output voltage target value |V1_com| according to the output power target value P com.

According to the first embodiment, the power transmission side control circuit 161 obtains the mutual inductance M of the power transmission coil 12 and the power receiving coil 13 on the basis of the AC voltage V1 and the AC current I1 output from the inverter circuit 101, the phase difference $\theta$1 between the AC voltage V1 and the AC current I1 output from the inverter circuit 101, the angular frequency $\omega$ of the alternating current output from the inverter circuit 101, and the inductances L1 and L2 of the power transmission coil 12 and the power receiving coil 13. More specifically, the coupling coefficient computation unit 161b computes the mutual inductance M through Expressions 2 and 3 on the basis of the output voltage V1, the output current I1, the phase difference $\theta$1, the angular frequency $\omega$, the output voltage V2, the inductance L1 and the capacitance C1, and the inductance L2 and the capacitance C2. Therefore, the power transmission side control circuit 161 can reliably obtain the mutual inductance M varying depending on the parking state of the vehicle or the like. Therefore, even if the mutual inductance M is changed, the power transmission side control circuit 161 can reliably control the phase difference between the AC voltage and AC voltage output from the inverter circuit 101.

According to the first embodiment, the power transmission side control circuit 161 corrects the output voltage target value |V1_com| on the basis of the output power target value Pcom and the power supplied from the power receiving side rectifier circuit 150 to the vehicle-mounted battery B1. More specifically, the correction value computation unit 161e computes the correction value |V1_FB| on the basis of the output power target value Pcom, the output voltage V2 and the output current I2. The correction unit 161f adds the correction value |V1_FB| to an output voltage target value |V1_FF| to set the added target value as a new output voltage target value |V1_com|. Therefore, even when the power supplied from the power receiving side rectifier circuit 150 to the vehicle-mounted battery B1 is dissociated from the output power target value Pcom, the control can be performed so as to cancel the influence.

According to the first embodiment, the power receiving side control circuit 163 transmits information necessary for controlling the inverter circuit 101, which is information related to the power receiving coil 13 and the power receiving side rectifier circuit 150, to the power transmission side control circuit 161 by the wireless communication. The power transmission side control circuit 161 controls the inverter circuit 101 on the basis of information related to the power receiving coil 13 and the power receiving side rectifier circuit 150 which is received from the power receiving side control circuit 163 by the wireless communication. Therefore, information on the output current I2 of the power receiving coil 13 connected to the power receiving side resonance capacitor 14, which is not required in the control of the conventional non-contact power supply device, can be obtained by the power transmission side control circuit 161. Therefore, the power transmission side control circuit 161 can reliably control the phase difference between the AC voltage and AC current output from the inverter circuit 101.

According to the first embodiment, in the case where the switching device of the inverter circuit 101 is subjected to the PWM control, the power transmission side control circuit 161 corrects the phase difference target value θ1_com so that the current flowing through the switching device falls within a predetermined range close to 0 when the switching device is turned on. More specifically, the correction value output unit 161$u$ obtains the correction value Δθ.com on the basis of the output power target value Pcom, the coupling coefficient k, and the map. The computation unit 161$v$ adds the correction value Δθ.com to the phase difference target value θ1_com to obtain a new phase difference target value. For that reason, when the switching device is turned on, the computation unit 161$v$ can suppress the current flowing through the switching device to about 0. Therefore, a switching loss generated when the switching device is turned on can be suppressed. This makes it possible to suppress the switching loss which is a problem in performing the PWM control for the switching device of the inverter circuit 101 and to improve the power transmission efficiency.

In the first embodiment, the correction value output unit 161$u$ has the map, and obtains the correction value Δθ.com on the basis of the map, but the present disclosure is not limited to this configuration. The map is replaced with a relational expression representing a relationship defined in the map by an expression, and the correction value Δθ.com may be obtained on the basis of the relational expression.

In the first embodiment, on the condition that the voltage vector and the current vector of each part of the non-contact power supply device 1 have the relationship as illustrated in FIGS. 5 and 7, an example of obtaining mathematical expressions of the computation units configuring the power transmission side control circuit 161 is described. However, the present disclosure is not limited to the above configuration. In the vector diagrams illustrated in FIGS. 5 and 7, resistances of the wiring and the coil are not taken into account. The mathematical expressions of the computation units may be obtained on the basis of the vector diagrams taking those resistances into account. More accurate control can be performed.

Second Embodiment

Subsequently, a non-contact power supply device according to a second embodiment will be described. The non-contact power supply device according to the second embodiment is different from the non-contact power supply device of the first embodiment in that the power supply target is changed from the vehicle-mounted battery to a resistive load, and a configuration of the output voltage target value computation unit is partially changed in association with the change in the power supply target.

Since the configurations and operation other than those of the output voltage target value computation unit are the same as those of the first embodiment, a description of those configurations and operation will be omitted except when it is necessary.

First, a configuration of the output voltage target value computation unit will be described with reference to FIG. 14.

Figure 14:
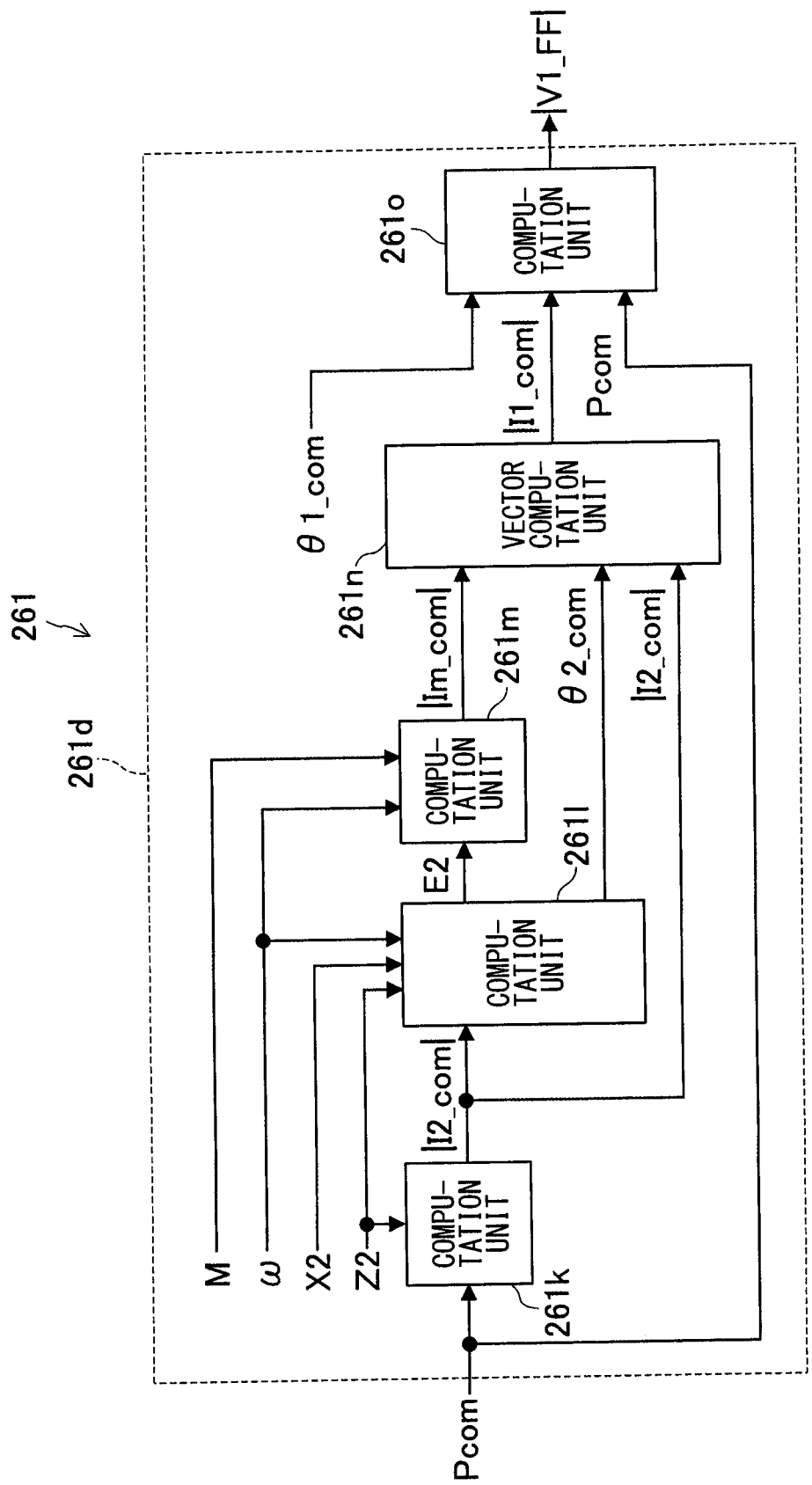
FIG. 14 is a block diagram of an output voltage target value computation unit of a power transmission side control circuit according to a second embodiment.

As illustrated in FIG. 14, an output voltage target value computation unit 261$d$ is a block that computes and outputs an output voltage target value |V1_FF| on the basis of a mutual inductance M, an angular frequency ω, impedances X2 and Z2, and an output power target value Pcom. The output voltage target value computation unit 261$d$ includes computation units 261$k$ to 261$m$, a vector computation unit 261$n$, and a computation unit 261$o$.

The computation unit 261$k$ is a block that computes and outputs an output current target value |I2_com| on the basis of the output power target value Pcom, and the impedance Z2. In this example, the impedance Z2 is an impedance of a load, which is set in a power receiving side control circuit previously, and obtained by a wireless communication. The computation unit 261$k$ computes and outputs the output current target value |I2_com| on the basis of Expression 15.

$$|I2\_com| = \sqrt{\frac{Pcom}{Z2}} \quad [\text{Ex. 15}]$$

The computation unit 261$l$ is a block that computes and outputs a voltage E2 and a phase target value θ2_com on the basis of the angular frequency ω, the impedances X2, Z2, and the output current target value |I2_com| which are output from the computation unit 261$k$. The computation unit 261$l$ computes and outputs the voltage E2 and the phase target value θ2_com on the basis of Expressions 16 and 17.

$$E2 = |I2\_com| \cdot \sqrt{Z2^2 + X2^2} \quad [\text{Ex. 16}]$$

$$\theta2\_com = \tan^{-1}\frac{X2}{Z2} \quad [\text{Ex. 17}]$$

The computation unit 261$m$, the vector computation unit 261$n$, and the computation unit 261$o$ are the same blocks as the computation unit 161$m$, the vector computation unit 161$n$, and the computation unit 161$o$ in the first embodiment.

Next, the operation of the output voltage target value computation unit in the non-contact power supply device according to the second embodiment will be described with reference to FIG. 14.

As illustrated in FIG. 14, the output voltage target value computation unit 261$d$ computes and outputs an output voltage target value |V1_FF| through Expressions 15 to 17 on the basis of the mutual inductance M, the angular frequency ω, the impedances X2 and Z2, and the output power target value Pcom. Because the computation unit 261$l$ computes the voltage E2 and the phase target value θ2_com through Expressions 16 and 17 on the basis of the angular frequency ω, the impedances X2 and Z2, the output current target value |I2_com|, even if the output voltage V2 is not input to the computation unit 261$l$, the same output voltage target value |V1_FF| as that in the first embodiment can be computed and output.

Subsequently, advantages of the non-contact power supply device according to the second embodiment will be described.

According to the second embodiment, even if the power supply target is a resistive load, the same output voltage target value |V1_FF| as that in the first embodiment can be computed and output. For that reason, the same advantages as those in the first embodiment can be obtained.

Third Embodiment

Subsequently, a non-contact power supply device according to a third embodiment will be described. The non-contact power supply device according to the third embodiment is configured to correct an output power target value whereas the non-contact power supply device of the first embodiment corrects the output voltage target value.

Because the configurations and operation other than those of the power transmission side control circuit are the same as those of the first embodiment, a description of those configurations and operation will be omitted except when it is necessary.

First, a configuration of the power transmission side control circuit will be described with reference to FIGS. 15 and 16.

Figure 15:
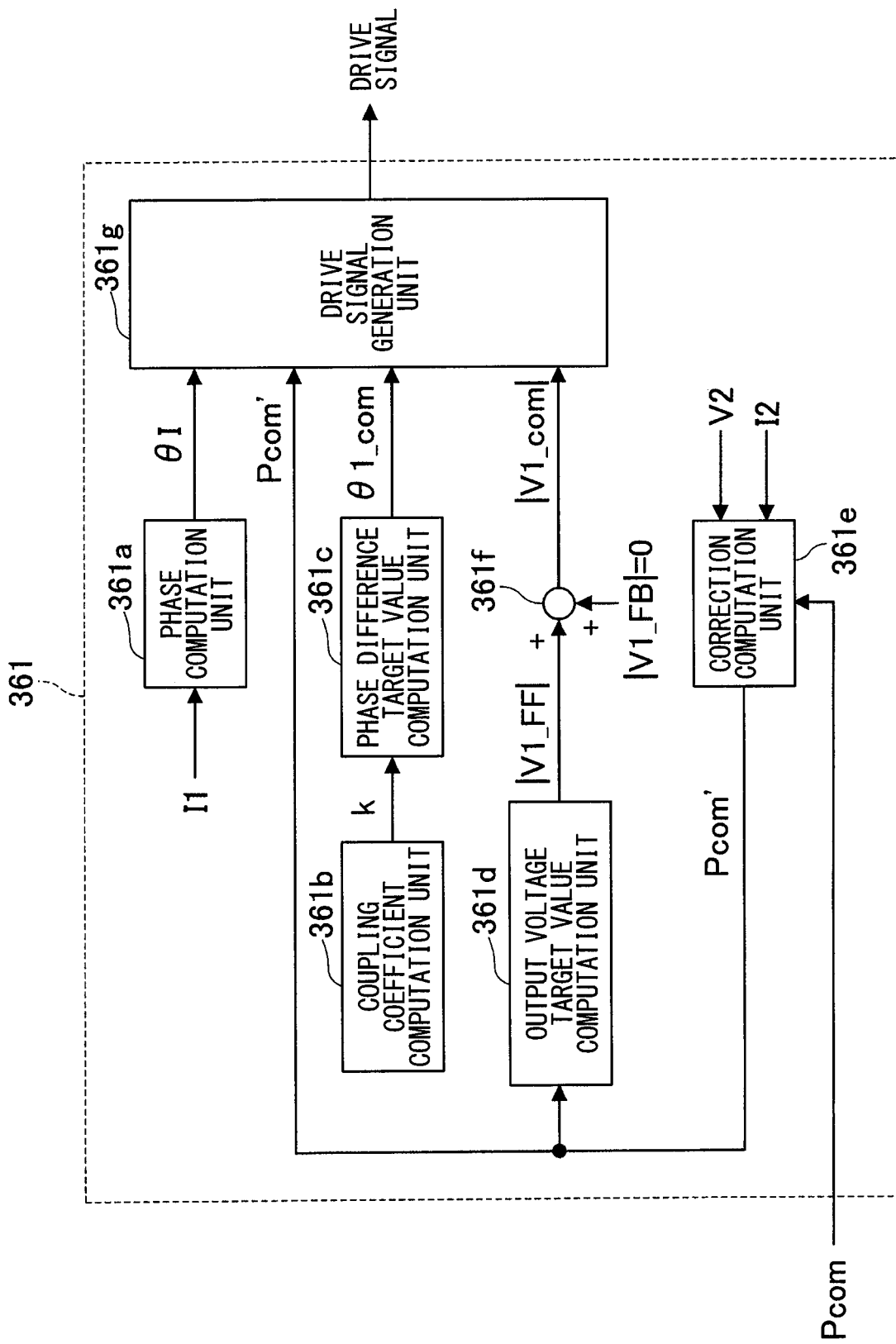
FIG. 15 is a block diagram of a power transmission side control circuit according to a third embodiment.

As illustrated in FIG. 15, a power transmission side control circuit 361 includes a phase computation unit 361a, a coupling coefficient computation unit 361b, a phase difference target value computation unit 361c, an output voltage target value computation unit 361d, a correction computation unit 361e, a correction unit 361f, and a drive signal generation unit 361g.

The phase computation unit 361a, the coupling coefficient computation unit 361b, and the phase difference target value computation unit 361c are the same blocks as those of the phase computation unit 161a, the coupling coefficient computation unit 161b, and the phase difference target value computation unit 161c in the first embodiment.

Figure 16:
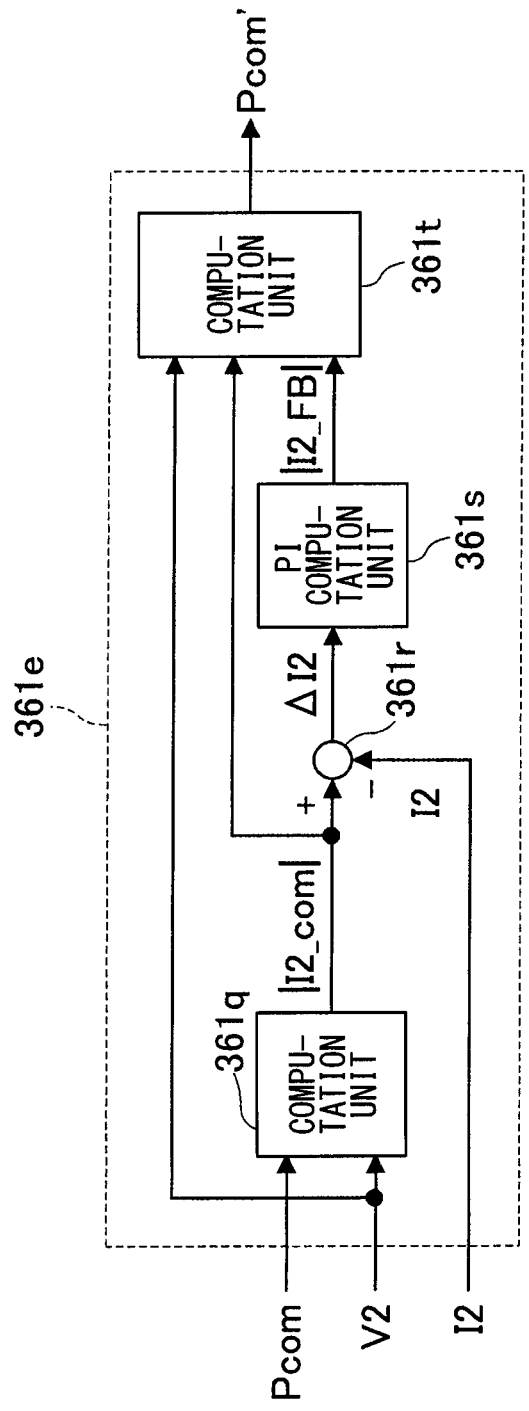
FIG. 16 is a block diagram of a correction computation unit illustrated in FIG. 15.

As illustrated in FIG. 16, the correction computation unit 361e is a block that computes and outputs a new output power target value Pcom' obtained by correcting a output power target value Pcom on the basis of an output voltage V2 and an output current I2. The correction computation unit 361e includes computation units 361q, 361r and a PI computation unit 361a, and a computation unit 361t.

The computation units 361q, 361r and the PI computation unit 361s are the same blocks as those of the computation units 161q, 161r and the PI computation unit 161s of the first embodiment.

The computation unit 361t is a block that computes and outputs the new output power target value Pcom' on the basis of the output voltage V2, an output current target value |I2_com|, and a correction value |I2_FB|. In this example, the correction value |I2_FB| is the same as the correction value |V1_FB| of the first embodiment. The computation unit 361t computes and outputs the output power target value Pcom' on the basis of Expression 18.

$$Pcom' = (|I2\_com| + |I2\_FB|) \cdot V2 \quad [\text{Ex. 18}]$$

The output voltage target value computation unit 361d illustrated in FIG. 15 is a block that computes and outputs an output voltage target value |V1_FF| on the basis of a mutual inductance M, an angular frequency ω, an impedance X2, an output power target value Pcom', an output voltage V2, and a phase difference θ1_com. The output voltage target value computation unit 361d is the same block as that of the output voltage target value computation unit 161d of the first embodiment, and the Pcom of the output power target value is replaced with the Pcom'.

The correction unit 361f is the same block as that of the correction unit 161f of the first embodiment, but because the output power target value Pcom is corrected, a correction value |V1_FF| is set to 0.

The drive signal generation unit 361g is a block that generates and outputs a drive signal for controlling the switching device of the inverter circuit on the basis of a phase θI, the new output power target value Pcom', a coupling coefficient k, a phase difference target value θ1_com, and an output voltage target value |V1_com|. The drive signal generation unit 361g is the same block as that of the drive signal generation unit 161g of the first embodiment, and the Pcom of the output power target value is replaced with Pcom'.

Next, the operation of the power transmission side control circuit in the non-contact power supply device according to the third embodiment will be described with reference to FIGS. 15 and 16.

As illustrated in FIG. 16, the correction computation unit 361e illustrated in FIG. 15 is a block that computes and outputs a new output power target value Pcom' obtained by correcting the output power target value Pcom through Expression 18 on the basis of the output voltage V2 and the output current I2.

The output voltage target value computation unit 361d illustrated in FIG. 15 is the same block as that of the output voltage target value computation unit 161d of the first embodiment, and the Pcom of the output power target value is replaced with the Pcom'. The output voltage target value computation unit 361d computes and outputs the output voltage target value |V1_FF| on the basis of the mutual inductance M, the angular frequency ω, the impedance X2, the output power target value Pcom', the output voltage V2, and the phase difference target value |θ1_com|.

The correction unit 361f is the same block as that of the correction unit 161f of the first embodiment, but because the output power target value Pcom is corrected, a correction value |V1_FF| is set to 0. The correction unit 361f outputs the output voltage target value |V1_FF| as a new output voltage target value |V1_com|.

The drive signal generation unit 361g is the same block as that of the drive signal generation unit 161g of the first embodiment, and the Pcom of the output power target value is replaced with Pcom'. The drive signal generation unit 361g generates and outputs a drive signal for controlling the switching device of the inverter circuit on the basis of the phase θI, the new output power target value Pcom', the coupling coefficient k, the phase difference target value θ1_com, and the output voltage target value |V1_com|.

As a result, the correction to the output power target value Pcom is reflected in the drive signal as in the first embodiment.

Subsequently, advantages of the non-contact power supply device according to the third embodiment will be described.

According to the third embodiment, even if the output power target value is corrected instead of the output voltage target value, the same advantages as those in the first embodiment can be obtained.

Fourth Embodiment

Subsequently, a non-contact power supply device according to a fourth embodiment will be described. The non-contact power supply device according to the fourth embodiment is configured to correct the inverter circuit on the basis of the output current target value whereas the non-contact power supply device of the first embodiment controls the inverter circuit on the basis of the output power target value.

Because the configurations and operation other than those of the power transmission side control circuit are the same as those of the first embodiment, a description of those configurations and operation will be omitted except when it is necessary.

First, a configuration of the power transmission side control circuit will be described with reference to FIGS. 17 to 19.

Figure 17:
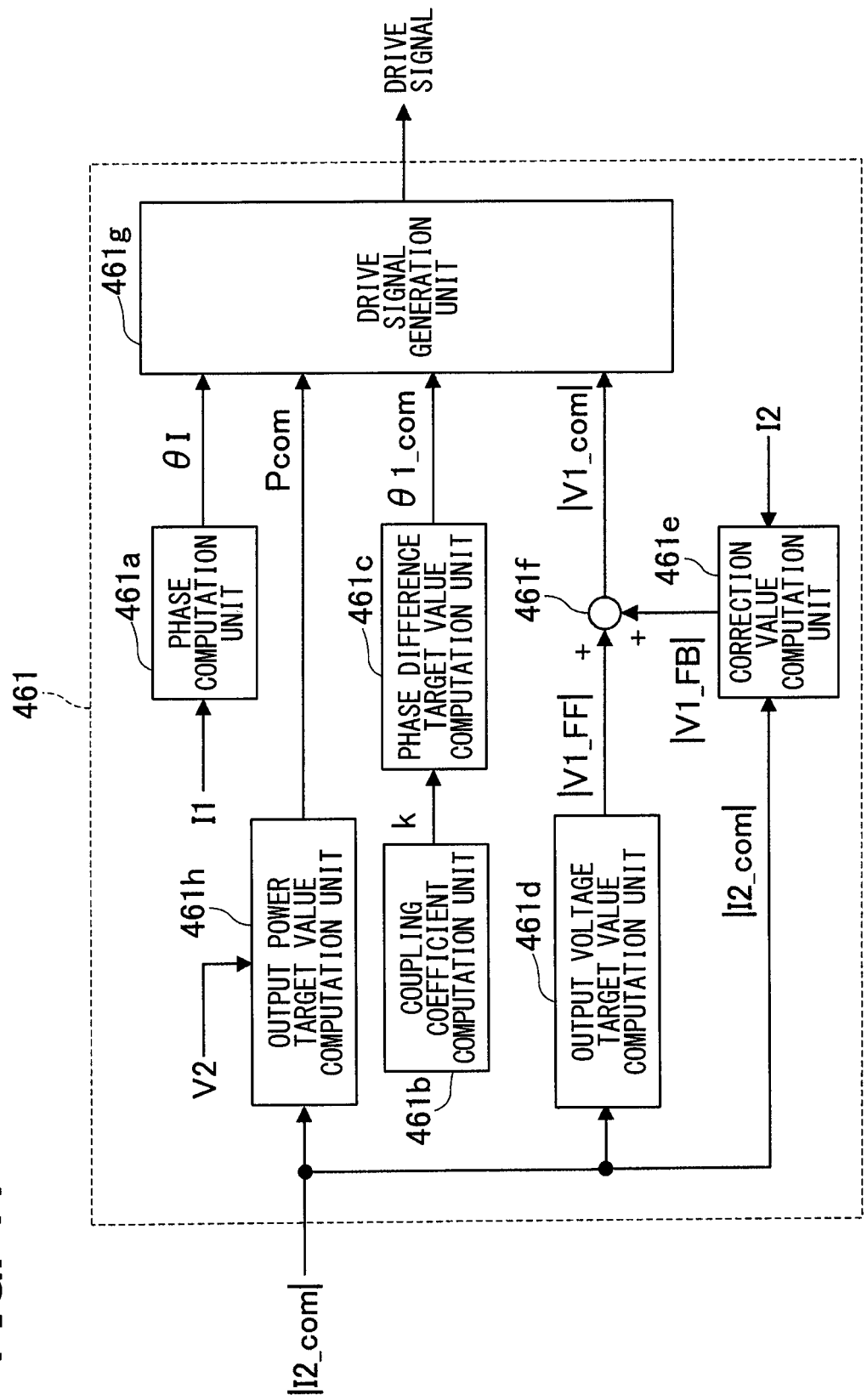
FIG. 17 is a block diagram of a power transmission side control circuit according to a fourth embodiment.

As illustrated in FIG. 17, a power transmission side control circuit 461 includes a phase computation unit 461*a*, a coupling coefficient computation unit 461*b*, a phase difference target value computation unit 461*c*, an output voltage target value computation unit 461*d*, a correction value computation unit 461*e*, a correction unit 461*f*, and a drive signal generation unit 461*g*. Further, the power transmission side control circuit 461 includes an output power target value computation unit 461*h*.

The output power target value computation unit 461*h* is a block that computes and outputs an output power target value Pcom on the basis of an output current target value |I2_com| and an output voltage V2. In this example, the output current target value |I2_com| is equivalent to a target value of a current supplied from a power receiving side rectifier circuit to a vehicle-mounted battery, and also serves as a target value of the magnitude of a current vector indicative of an output current of a power receiving coil connected to a power receiving side resonance capacitor. This is because the output voltage V2 and the output current I2 of the power receiving coil connected to the power receiving side resonance capacitor and the voltage applied and current supplied to the vehicle-mounted battery have a known relationship. Therefore, as in the first embodiment, the output current target value is written as |I2_com|. The output power target value computation unit 461*h* computes and outputs the output power target value Pcom on the basis of Expression 19.

$$Pcom = |I2\_com| \cdot V2 \qquad [Ex.\ 19]$$

Figure 18:
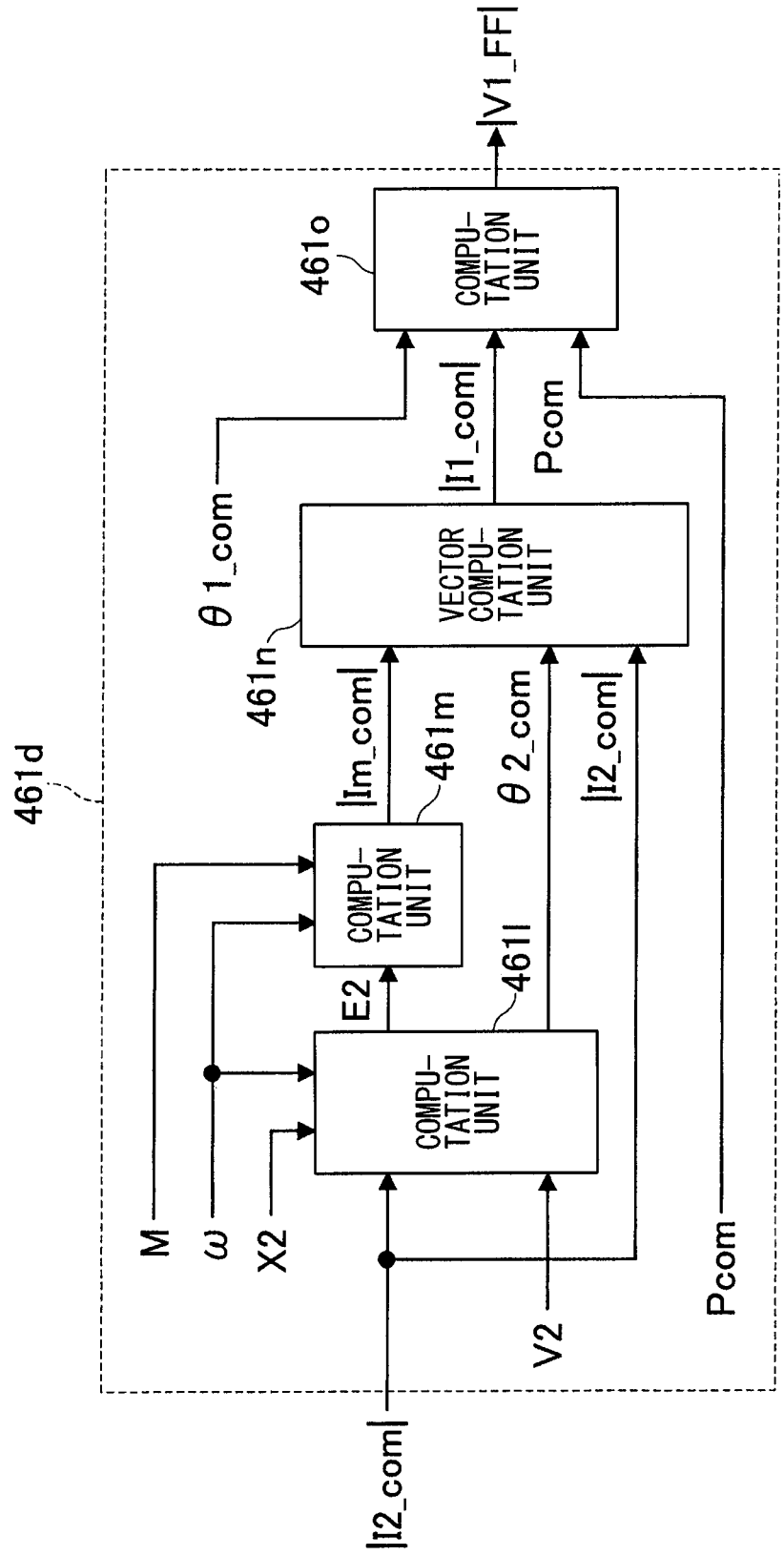
FIG. 18 is a block diagram of an output voltage target value computation unit illustrated in FIG. 17.

As illustrated in FIG. 18, the output voltage target value computation unit 461*d* is a block that computes and outputs an output voltage target value |V1_FF| that is a target value of the magnitude of the voltage vector indicative of the output voltage of the inverter circuit on the basis of a mutual inductance M, an angular frequency ω, an impedance X2, the output current target value |I2_com|, an output voltage V2, an output power target value Pcom, and a phase difference target value θ1_com. The output voltage target value computation unit 461*d* includes computation units 461*l*, 461*m*, a vector computation unit 461*n*, and a computation unit 461*o*. Since there is no need to obtain the output current target value |I2_com|, there is no block corresponding to the computation unit 161*k* of the first embodiment. The computation units 461*l*, 461*m*, the vector computation unit 461*n*, and the computation unit 461*o* are the same blocks as those of the arithmetic units 161*l*, 161*m*, the vector computation unit 161*n*, and the computation unit 161*o* of the first embodiment, respectively.

The phase computation unit 461*a*, the coupling coefficient computation unit 461*b*, the phase difference target value computation unit 461*c*, and the output voltage target value computation unit 461*d* illustrated in FIG. 17 are the same blocks as those of the phase computation unit 161*a*, the coupling coefficient computation unit 161*b*, the phase difference target value computation unit 161*c*, and the output voltage target value computation unit 161*d* in the first embodiment, respectively.

Figure 19:
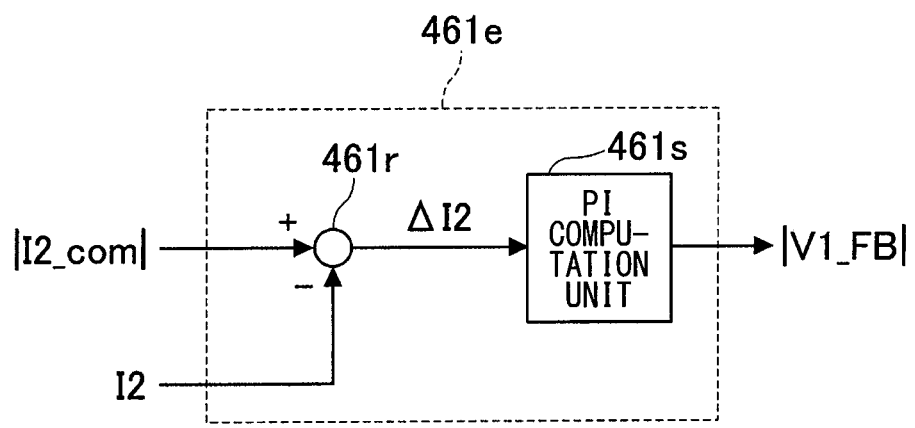
FIG. 19 is a block diagram of a correction value computation unit illustrated in FIG. 17.

As illustrated in FIG. 19, the correction value computation unit 461*e* is a block that computes and outputs a correction value |V1_FB| on the basis of the output current target value |I2_com| and the output current I2. The correction value computation unit 461*e* includes computation units 461*r* and 461*s*. Because there is no need to obtain the output current target value |I2_com|, there is no block corresponding to the computation unit 161*q* of the first embodiment. The computation units 461*r* and 461*s* are the same blocks as those of the computation units 161*r* and 161*s* of the first embodiment, respectively.

The correction unit 461*f* and the drive signal generation unit 461*g* illustrated in FIG. 17 are the same blocks as those of the correction unit 161*f* and the drive signal generation unit 161*g* in the first embodiment, respectively.

Next, the operation of the power transmission side control circuit in the non-contact power supply device according to the fourth embodiment will be described with reference to FIGS. 17 to 19. Since the configurations and operation other than those of the output power target value computation unit, the output power target value computation unit and the correction value computation unit are the same as those of the first embodiment, a description of those configurations and operation will be omitted except when it is necessary.

The output power target value computation unit 461*h* illustrated in FIG. 17 computes and outputs the output power target value Pcom through Expression 19 on the basis of the output current target value |I2_com| and the output voltage V2.

As illustrated in FIG. 18, the output voltage target value computation unit 461*d* computes and outputs the output voltage target value |V1_FF| on the basis of the mutual inductance M, the angular frequency ω, the impedance X2, the output current target value |I2_com|, the output voltage V2, the output power target value Pcom, and the phase difference target value θ1_com. As a result, even when the control is performed on the basis of the output current target value |I2_com|, the same output voltage target value |V1_FF| as that in the first embodiment can be obtained.

As illustrated in FIG. 19, the correction value computation unit 461*e* illustrated in FIG. 17 computes and outputs the correction value |V1_FB| on the basis of the output current target value |I2_com|, and the output current I2. As a result, even when the control is performed on the basis of the output current target value |I2_com|, the same correction value |V1_FB| as that in the first embodiment can be obtained.

Subsequently, advantages of the non-contact power supply device according to the fourth embodiment will be described.

According to the fourth embodiment, the inverter circuit similar to that in the first embodiment can be controlled even when the voltage vector target value is obtained on the basis of the output current target value |I2_com|. For that reason, the same advantages as those in the first embodiment can be obtained.

Fifth Embodiment

Subsequently, a non-contact power supply device according to a fifth embodiment will be described. The non-contact power supply device according to the fifth embodiment is different from the non-contact power supply device of the fourth embodiment in that the power supply target is changed from the vehicle-mounted battery to a resistive load, and a configuration of the output voltage target value computation unit is partially changed in association with the change in the power supply target.

Since the configurations and operation other than those of the output voltage target value computation unit are the same as those of the fourth embodiment, a description of those configurations and operation will be omitted except when it is necessary.

First, a configuration of the output voltage target value computation unit will be described with reference to FIG. 20.

Figure 20:
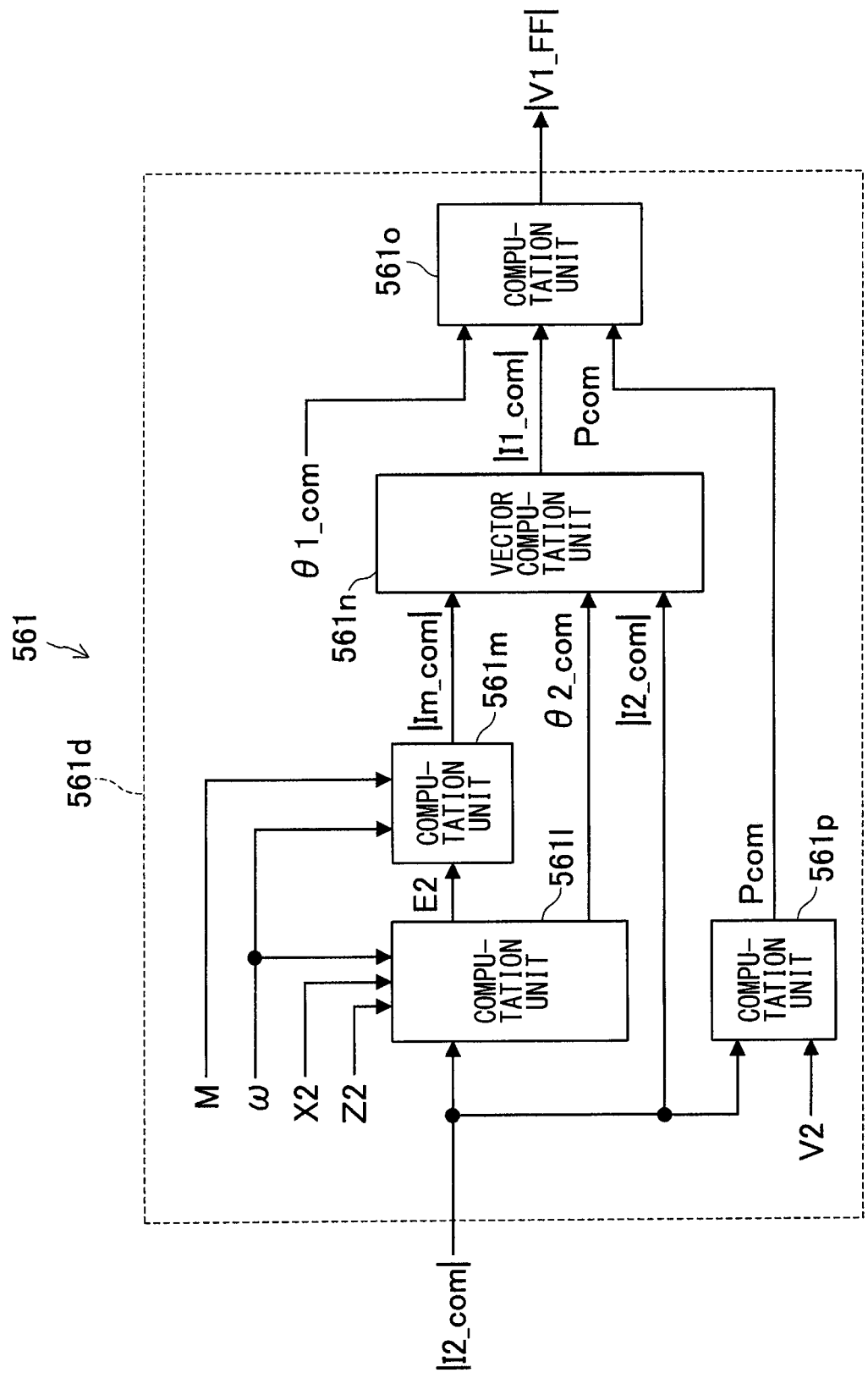
FIG. 20 is a block diagram of an output voltage target value computation unit of a power transmission side control circuit according to a fifth embodiment.

As illustrated in FIG. 20, an output voltage target value computation unit 561d is a block that computes and outputs an output voltage target value |V1_FF| on the basis of a mutual inductance M, an angular frequency ω, impedances X2 and Z2, an output power target value Pcom, and an output voltage V2. The output voltage target value computation unit 561d includes computation units 561l, 561m, a vector computation unit 561n, and a computation unit 561o. Further, the output voltage target value computation unit 561d includes a computation unit 561p.

The computation unit 561p is a block that computes and outputs the output power target value Pcom on the basis of an output current target value |I2_com|, and the output voltage V2. The computation unit 561p computes and outputs the output power target value Pcom on the basis of Expression 20.

$$Pcom = |I2\_com| \cdot |V2|  \quad [\text{Ex. 20}]$$

The computation unit 561l is a block that computes and outputs the voltage E2 and the phase target value θ2_com on the basis of the angular frequency ω, the impedances X2, Z2, and the output current target value |I2_com|. The computation unit 561l computes and outputs the voltage E2 and the phase target value θ2_com on the basis of Expressions 21 and 22.

$$E2 = |I2\_com| \cdot \sqrt{Z2^2 + X2^2} \quad [\text{Ex. 21}]$$

$$\theta2\_com = \tan^{-1}\frac{X2}{Z2} \quad [\text{Ex. 22}]$$

The computation unit 561m, the vector computation unit 561n, and the computation unit 561o are the same blocks as the computation unit 461m, the vector computation unit 461n, and the computation unit 461o in the fourth embodiment.

Next, the operation of the output voltage target value computation unit in the non-contact power supply device according to the fifth embodiment will be described with reference to FIG. 20.

As illustrated in FIG. 20, the output voltage target value computation unit 561d computes and outputs the output voltage target value |V1_FF| through Expressions 20 to 22 on the basis of the mutual inductance M, the angular frequency ω, the impedances X2 and Z2, the output power target value Pcom, and the output voltage V2. Because the computation unit 561p computes the output power target value Pcom through Expression 20 on the basis of the output current target value |I2_com| and the output voltage V2, even if the output power target value Pcom is not input, the same output voltage target value |V1_FF| as that in the fourth embodiment can be computed.

Subsequently, advantages of the non-contact power supply device according to the fifth embodiment will be described.

According to the fifth embodiment, even if the power supply target is a resistive load, the same output voltage target value |V1_FF| as that in the fourth embodiment can be computed and output. For that reason, the same advantages as those in the fourth embodiment can be obtained.

Sixth Embodiment

Subsequently, a non-contact power supply device according to a sixth embodiment will be described. The non-contact power supply device according to the sixth embodiment is configured to correct an output power target value whereas the non-contact power supply device of the fourth embodiment corrects the output voltage target value.

Because the configurations and operation other than those of the power transmission side control circuit are the same as those of the fourth embodiment, a description of those configurations and operation will be omitted except when it is necessary.

First, a configuration of the power transmission side control circuit will be described with reference to FIGS. 21 and 22.

Figure 21:
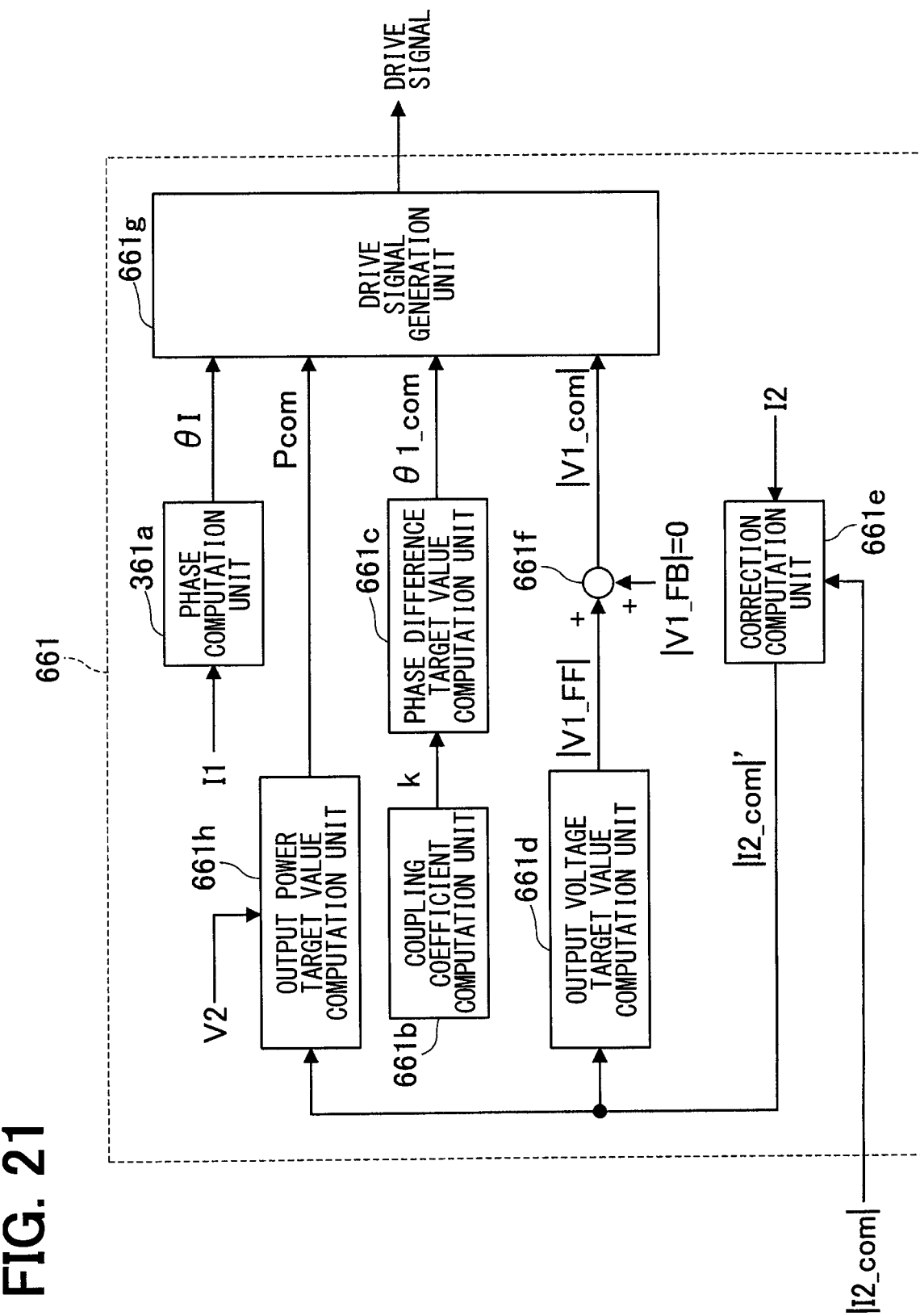
FIG. 21 is a block diagram of a power transmission side control circuit according to a sixth embodiment.

As illustrated in FIG. 21, the power transmission side control circuit 661 includes a phase computation unit 661a, a coupling coefficient computation unit 661b, a phase difference target value computation unit 661c, an output voltage target value computation unit 661d, a correction computation unit 661e, a correction unit 661f, and a drive signal generation unit 661g. Further, the power transmission side control circuit 661 includes an output power target value computation unit 661h.

The phase computation unit 661a, the coupling coefficient computation unit 661b, and the phase difference target value computation unit 661c are the same blocks as those of the phase computation unit 461a, the coupling coefficient computation unit 461b, and the phase difference target value computation unit 461c in the fourth embodiment.

Figure 22:
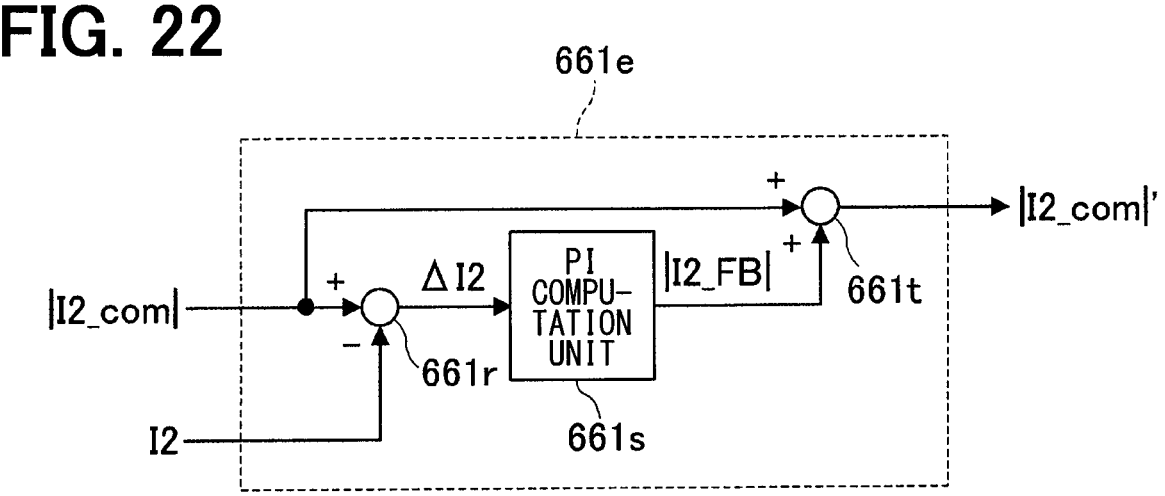
FIG. 22 is a block diagram of a correction computation unit illustrated in FIG. 21.

As illustrated in FIG. 22, the correction computation unit 661e is a block that computes and outputs a new output current target value |I2_com|' obtained by correcting the output current target value |I2_com| on the basis of the output current I2. The correction computation unit 661e includes a computation unit 661r, and a PI computation unit 661s, and a computation unit 661t.

The computation units 661r and the PI computation unit 661s are the same blocks as those of the computation units 461r and the PI computation unit 461s of the fourth embodiment.

The computation unit 661t is a block that computes and outputs the new output power target value Pcom' on the basis of the output current target value |I2_com|, and the correction value |I2_FB| output from the PI computation unit 661s. In this example, the correction value |I2_FB| is the same as the correction value |V1_FB| of the fourth embodiment. The computation unit 661t computes and outputs the output current target value |I2_com|' on the basis of Expression 23.

$$|I2\_com|' = |I2\_com| + |I2\_FB| \quad [\text{Ex. 23}]$$

The output voltage target value computation unit 661d illustrated in FIG. 21 is a block that computes and outputs the output voltage target value |V1_FF| on the basis of a mutual inductance M, an angular frequency ω, an impedance X2, an output power target value Pcom', an output voltage V2, and a phase difference target value θ1_com. The output voltage target value computation unit 661*d* is the same block as that of the output voltage target value computation unit 461*d* of the fourth embodiment, and the Pcom of the output power target value is replaced with the Pcom'.

The correction unit 661*f* is the same block as that of the correction unit 461*f* of the fourth embodiment, but because the output power target value Pcom is corrected, the correction value |V1_FF| is set to 0.

The drive signal generation unit 661*g* is a block that generates and outputs a drive signal for controlling the switching device of the inverter circuit on the basis of the phase θI, the new output power target value Pcom', the coupling coefficient k, the phase difference target value θ1_com, and the output voltage target value |V1_com|. The drive signal generation unit 661*g* is the same block as that of the drive signal generation unit 461*g* of the fourth embodiment, and the Pcom of the output power target value is replaced with Pcom'.

Next, the operation of the power transmission side control circuit in the non-contact power supply device according to the sixth embodiment will be described with reference to FIGS. 21 and 22.

As illustrated in FIG. 22, the correction computation unit 661*e* illustrated in FIG. 21 computes and outputs a new output current target value |I2_com|' obtained by correcting the output current target value |I2_com| through Expression 23 on the basis of the output current I2.

The output voltage target value computation unit 661*d* illustrated in FIG. 21 is the same block as that of the output voltage target value computation unit 461*d* of the fourth embodiment, and the Pcom of the output power target value is replaced with the Pcom'. The output voltage target value computation unit 661*d* computes and outputs the output voltage target value |V1_FF| on the basis of the mutual inductance M, the angular frequency ω, the impedance X2, the output power target value Pcom', the output voltage V2, and the phase difference target value θ1_com.

The correction unit 661*f* is the same block as that of the correction unit 461*f* of the fourth embodiment, but because the output power target value Pcom is corrected, the correction value |V1_FF| is set to 0. The correction unit 661*f* outputs the output voltage target value |V1_FF| as a new output voltage target value |V1_com|.

The drive signal generation unit 661*g* is the same block as that of the drive signal generation unit 461*g* of the fourth embodiment, and the Pcom of the output power target value is replaced with Pcom'. The drive signal generation unit 661*g* generates and outputs a drive signal for controlling the switching device of the inverter circuit on the basis of the phase θI, the new output power target value Pcom', the coupling coefficient k, the phase difference target value θ1_com, and the output voltage target value |V1_com|.

As a result, the correction to the output current target value |I2_com| is reflected in the drive signal as in the fourth embodiment.

Subsequently, advantages of the non-contact power supply device according to the sixth embodiment will be described.

According to the sixth embodiment, even if the output current target value is corrected instead of the output voltage target value, the same advantages as those in the fourth embodiment can be obtained.

In the first to sixth embodiments, the example in which the power transmission side resonance capacitor and the power receiving side resonance capacitor are connected directly in series to the power transmission coil and the power receiving coil has been described, but the present disclosure is not limited to the above configuration. The power transmission side resonance capacitor and the power receiving side resonance capacitor may be connected in parallel to the power transmission coil and the power receiving coil. In that case, the impedances X1' and X2' corresponding to the impedances X1 and X2 are obtained on the basis of Expressions 24 and 25.

$$X1' = \frac{\omega \cdot (L1 - M)}{1 - \omega^2 \cdot (L1 - M) \cdot C1} \quad [\text{Ex. 24}]$$

$$X2' = \frac{\omega \cdot (L2 - M)}{1 - \omega^2 \cdot (L2 - M) \cdot C2} \quad [\text{Ex. 25}]$$

In the first to sixth embodiments, the example in which the information necessary for control is transmitted from the power receiving side control circuit to the power transmission side control circuit, and all computations required for control are performed by the power transmission side control circuit has been described. However, the present disclosure is not limited to the above configuration. A part of the computation performed by the power transmission side control circuit may be performed by the power receiving side control circuit. In that case, the information required for control may be transmitted from the power transmission side control circuit to the power receiving side control circuit. The information related to the phase of the current to be supplied from the power receiving coil to the power receiving circuit may be exchanged between the power transmission side control circuit and the power receiving side control circuit.

In the first to sixth embodiments, the example in which the power receiving side rectifier circuit rectifies and outputs the supplied alternating current has been described, but the present disclosure is not limited to the above configuration. As with the power transmission side rectifier circuit, the supplied alternating current may be rectified, boosted and output.

Even when a winding ratio of the power transmission coil and the power receiving coil changes in the first to sixth embodiments, the mathematical expressions reviewed on the basis of the vector diagram showing the relationship between the voltage vector and the current vector of each part is applicable to such a change in the winding ratio.

Seventh Embodiment

Subsequently, a non-contact power supply device according to a seventh embodiment will be described. The non-contact power supply device according to the seventh embodiment is different from the non-contact power supply device in the first embodiment in the configuration of the coupling coefficient computation unit. Specifically, the coupling coefficient computation unit according to the first embodiment computes the coupling coefficient k of the power transmission coil 12 and the power receiving coil 13 on the basis of the output voltage V1, the output current I1, the phase difference θ1, the angular frequency ω, the output voltage V2, the inductance L1, the capacitance C1, the inductance L2, and the capacitance C2. On the contrary, a coupling coefficient computation unit according to the seventh embodiment computes a coupling coefficient k of a power transmission coil and a power receiving coil on the basis of an output voltage V1, an output current I1, a phase difference θ1, an angular frequency ω, an output voltage V2, an output current I2, and capacitances C1 and C2.

Because the configurations and operation other than those of the coupling coefficient computation unit are the same as those of the first embodiment, a description of those configurations and operation will be omitted except when it is necessary. First, a configuration and operation of the coupling coefficient computation unit will be described with reference to FIGS. 23 and 24.

Figure 23:
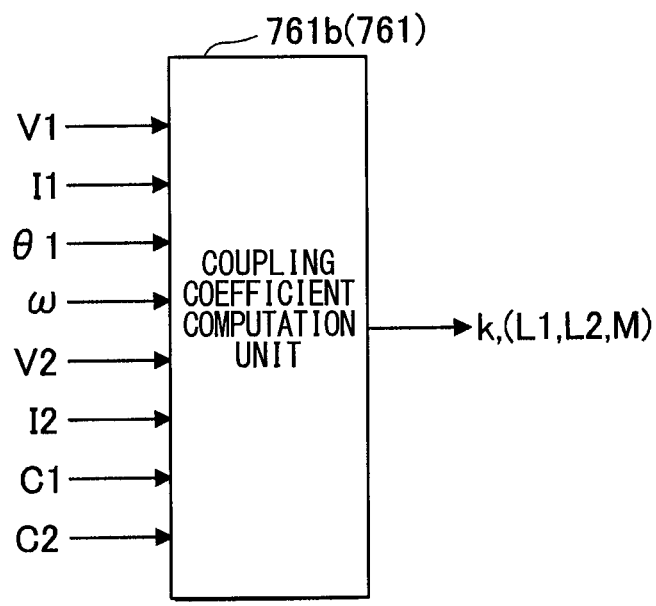
FIG. 23 is a block diagram of a coupling coefficient computation unit of a power transmission control circuit according to a seventh embodiment.

As illustrated in FIG. 23, a coupling coefficient computation unit 761$b$ is a block corresponding to the coupling coefficient computation unit 161$b$ in the first embodiment, which configures a power transmission side control circuit 761. More specifically, the coupling coefficient computation unit 761$b$ is a block that computes and outputs the coupling coefficient k between the power transmission coil and the power receiving coil on the basis of the output voltage V1, the output current I1, the phase difference θ1, the angular frequency ω, the output voltage V2, the output current I2, and the capacitances C1 and C2. The coupling coefficient computation unit 761$b$ also computes the inductance L1 of the power transmission coil, the inductance L2 of the power receiving coil, and the mutual inductance M of the power transmission coil and the power receiving coil in a process of computing the coupling coefficient k.

Figure 24:
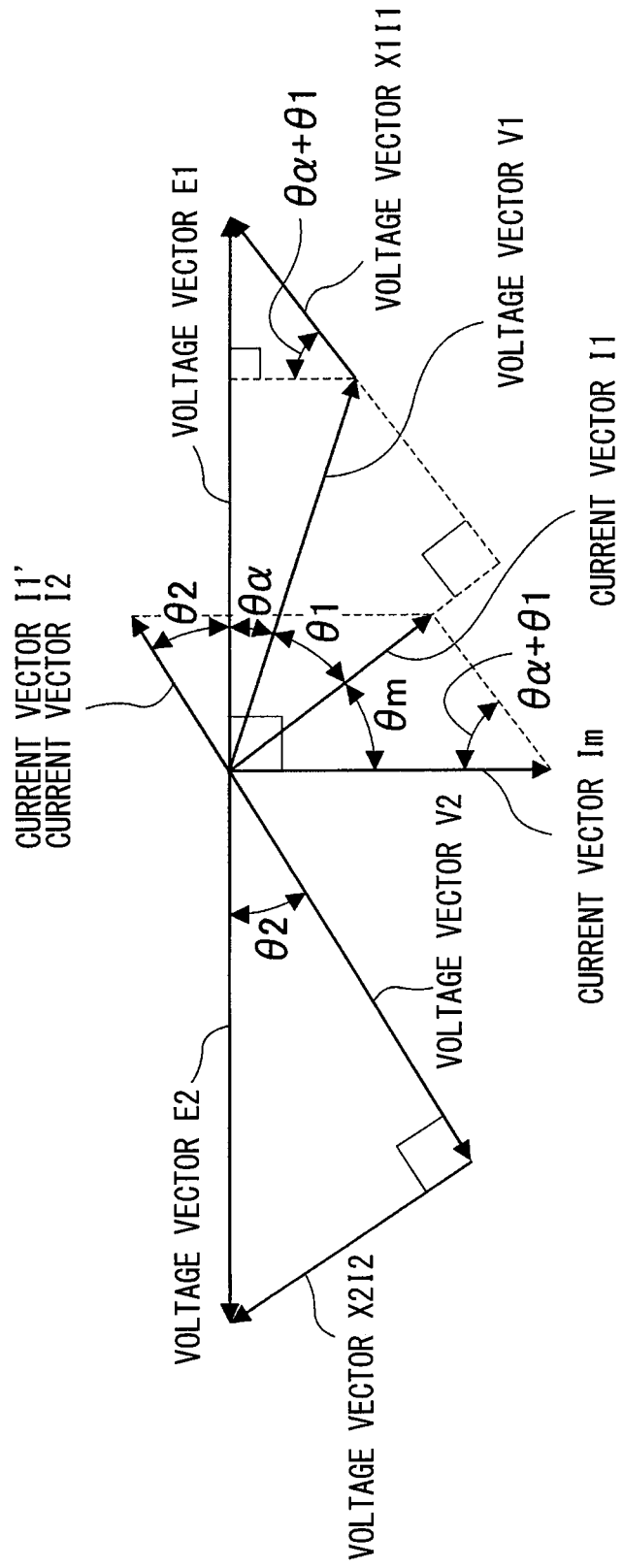
FIG. 24 is a vector diagram illustrating a voltage vector and a current vector of each part of a non-contact power supply device according to the seventh embodiment.

Incidentally, the voltage vector and the current vector of each part of the non-contact power supply device have a relationship as illustrated in FIG. 24. In this example, a phase difference θα is a phase difference between a voltage vector E1 and a voltage vector V1. A phase difference θm is a phase difference between a current vector Im and a current vector I1. Others are the same as those described in the first embodiment.

The current vector Im has a relationship represented in Expression 26.

$$\text{Im} = \frac{E2}{\omega \cdot M} = \frac{\sqrt{V2^2 + (X2 \cdot I2)^2}}{\omega \cdot M} \quad \text{[Ex. 26]}$$

The voltage vectors E1 and E2 have a relationship represented in Expression 27.

$$E1 = E2 = \sqrt{V2^2 + (X2 \cdot I2)^2} \quad \text{[Ex. 27]}$$

The phase differences θ2, θα, and θm have respective relationships represented in Expressions 28 to 30.

$$\theta 2 = \tan^{-1} \frac{X2 \cdot I2}{V2} \quad \text{[Ex. 28]}$$

$$\theta \alpha = \cos^{-1} \left\{ \frac{V1^2 + E1^2 - (X1 \cdot I1)^2}{2 \cdot V1 \cdot E1} \right\} \quad \text{[Ex. 29]}$$

$$\theta m = \cos^{-1} \left( \frac{\text{Im}^2 + I1^2 - I2^2}{2 \cdot \text{Im} \cdot I1} \right) \quad \text{[Ex. 30]}$$

Because the current vector I1 is a vector sum of the current vector I2 and the current vector Im, the current vectors I1, I2, and Im have relationships represented in Expressions 31 and 32.

$$I2 \cdot \cos \theta 2 = I1 \cdot \cos(\theta 1 + \theta \alpha) \quad \text{[Ex. 31]}$$

$$\text{Im} + I2 \cdot \sin \theta 2 = I1 \cdot \sin(\theta 1 + \theta \alpha) \quad \text{[Ex. 32]}$$

Since the phase difference between the voltage vector E1 and the current vector Im is 90 degrees, the phase differences θ1, θα, and θm have a relationship represented in Expression 33.

$$\theta m + \theta 1 + \theta \alpha = \frac{\pi}{2} \quad \text{[Ex. 33]}$$

Because the voltage vectors E1 and E2 are the same in magnitude and opposite in direction to each other, the voltage vectors E1 and E2 have relationships represented in Expressions 34 and 35.

$$V1 \cdot \cos \theta \alpha + |X1 \cdot I1| \cdot \sin(\theta \alpha + \theta 1) = V2 \cdot \cos \theta 2 + |X2 \cdot I2| \cdot \sin \theta 2 \quad \text{[Ex. 34]}$$

$$V1 \cdot \sin \theta \alpha + |X1 \cdot I1| \cdot \cos(\theta \alpha + \theta 1) - (V2 \cdot \sin \theta 2 + |X2 \cdot I2| \cdot \cos \theta 2) = 0 \quad \text{[Ex. 35]}$$

The coupling coefficient computation unit 761$b$ illustrated in FIG. 23 performs arithmetic operation with the use of the output voltage V1, the output current I1, the phase difference θ1, the angular frequency ω, the output voltage V2, and the output current I2, which have been input, and Expressions 26 to 29 and 31 to 33 through the Newton Raphson method, and obtains the impedances X1, X2, and the mutual inductance M. The capacitances C1 and C2 are not affected by a positional relationship between a power transmission side pad and a power receiving side pad. For that reason, even if capacitors set in advance as the capacitances C1 and C2 are used, no large error occurs in the computation result. The coupling coefficient computation unit 761$b$ obtains the inductances L1 and L2 from the input capacitances C1, C2 and the impedances X1, X2. Furthermore, the coupling coefficient computation unit 761$b$ obtains the coupling coefficient k from the inductances L1, L2 and the mutual inductance M.

Subsequently, advantages of the non-contact power supply device according to the seventh embodiment will be described.

According to the seventh embodiment, the power transmission side control circuit 761 obtains the impedance X1 including the leakage inductance not coupled with the power receiving coil, the impedance X2 including the leakage inductance not coupled with the power transmission coil, and the mutual inductance M of the power transmission coil and the power receiving coil, on the basis of the output voltage V1 and the output current I1 of the power transmission circuit, the phase difference θ1 between the output voltage V1 and the output current I1 of the power transmission circuit, the angular frequency ω of the output of the power transmission circuit, and the output voltage V2 and an output current I2 of the power receiving coil. More specifically, the coupling coefficient computation unit 761$b$ computes the impedances X1 and X2, and the mutual inductance M through Expressions 26 to 29 and 31 to 33 on the basis of the output voltage V1, the output current I1, the phase difference θ1, the angular frequency ω, the output voltage V2, and the output current I2. Therefore, the power transmission side control circuit 761 can reliably obtain the impedances X1, X2 and the mutual inductance M varying depending on the parking state of the vehicle or the like. Therefore, even if the impedances X1, X2, and the mutual inductance M are changed, the power transmission side control circuit 761 can reliably control the phase difference between the AC voltage and AC current voltage from the power transmission circuit. When the capacitances C1 and C2 are uncertain, the capacitances C1 and C2 can be obtained together with the use of Expressions 34 and 35.

The configuration according to the seventh embodiment can also be applied to other embodiments having the coupling coefficient computation unit.

Eighth Embodiment

Subsequently, a non-contact power supply device according to an eighth embodiment will be described. The non-contact power supply device according to the eighth embodiment is different from the non-contact power supply device of the first embodiment in the configuration of the power transmission side control circuit. More particularly, the power transmission side control circuit according to the first embodiment includes the phase difference target value computation unit that computes the phase difference target value and the output voltage target value computation unit that computes the output voltage target value. On the other hand, a power transmission side control circuit according to an eighth embodiment includes a target value computation unit that collectively computes a phase difference target value and an output voltage target value.

Since the configurations and operation other than those of the computation units of the phase difference target value and the output voltage target value are the same as those of the first embodiment, a description of those configurations and operation will be omitted except when it is necessary. First, the configurations and operation of the computation units of the phase difference target value and the output voltage target value will be described with reference to FIGS. 25 to 36.

Figure 25:
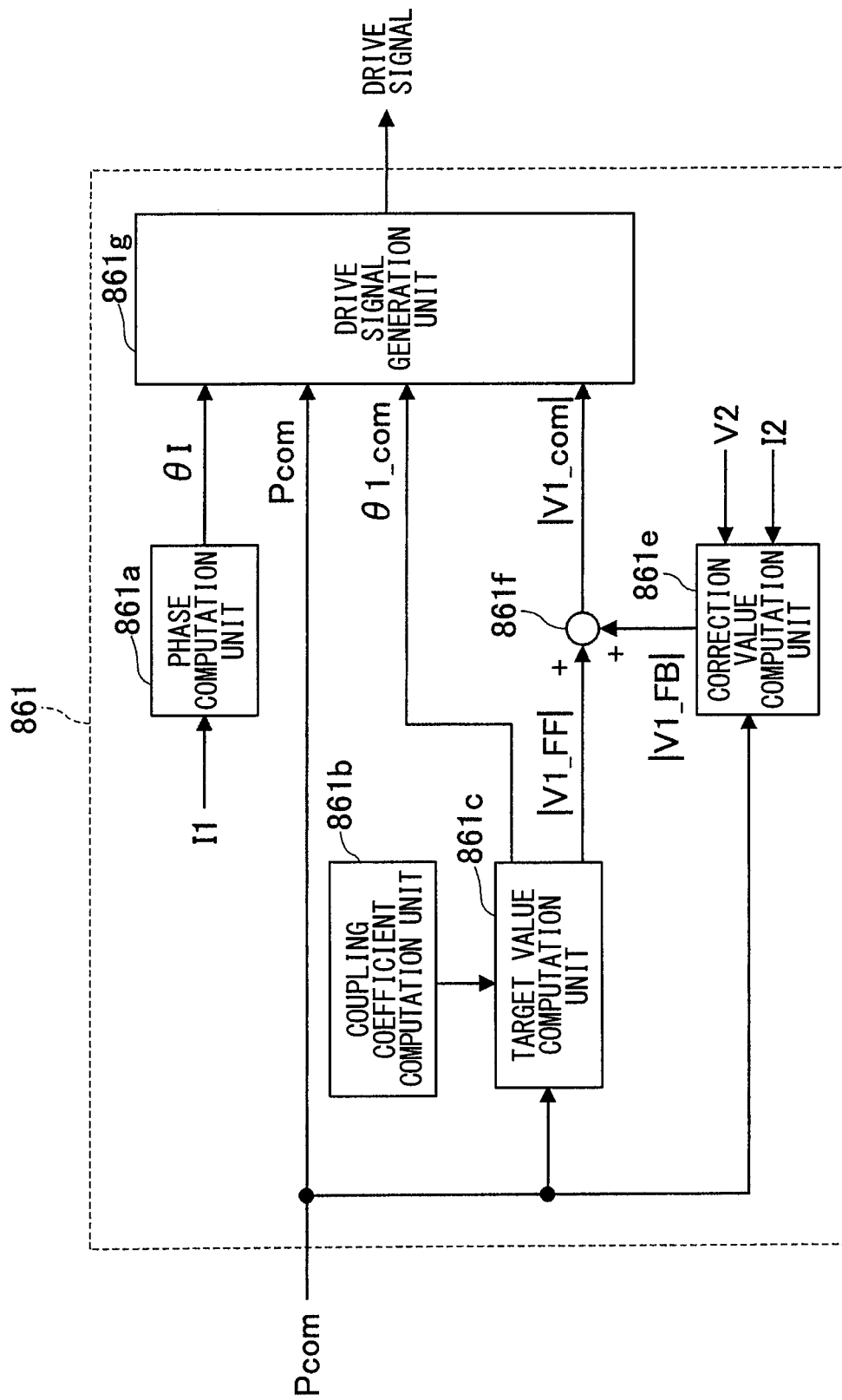
FIG. 25 is a block diagram of a power transmission side control circuit according to an eighth embodiment.

As illustrated in FIG. 25, the power transmission side control circuit 861 includes a phase computation unit 861$a$, a coupling coefficient computation unit 861$b$, a target value computation unit 861$c$, a correction value computation unit 861$e$, a correction unit 861$f$, and a drive signal generation unit 861$g$.

The phase computation unit 861$a$, the correction value computation unit 861$e$, the correction unit 861$f$, and the drive signal generation unit 861$g$ are the same blocks as those of the phase computation unit 161$a$, the correction value computation unit 161$e$, the correction unit 161$f$, and the drive signal generation unit 161$g$ in the first embodiment. Further, the coupling coefficient computation unit 861$b$ is the same block as that of the coupling coefficient computation unit 761$b$ of the seventh embodiment.

The target value computation unit 861$c$ is a block that computes and outputs a phase difference target value θ1_com and an output voltage target value |V1_FF| on the basis of a vector diagram showing a relationship between the voltage vector and the current vector.

Figure 26:
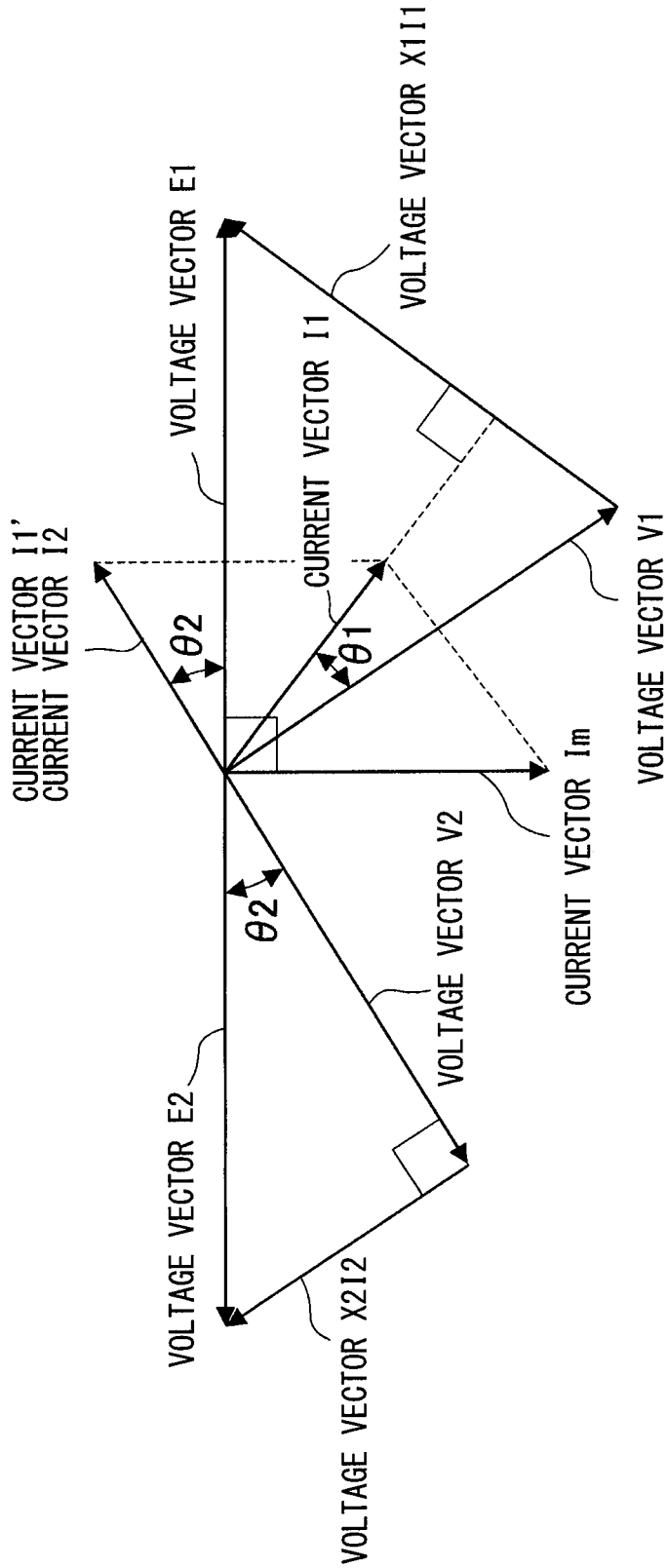
FIG. 26 is a vector diagram illustrating a voltage vector and a current vector of each part of a non-contact power supply device according to the eighth embodiment.
Figure 28:
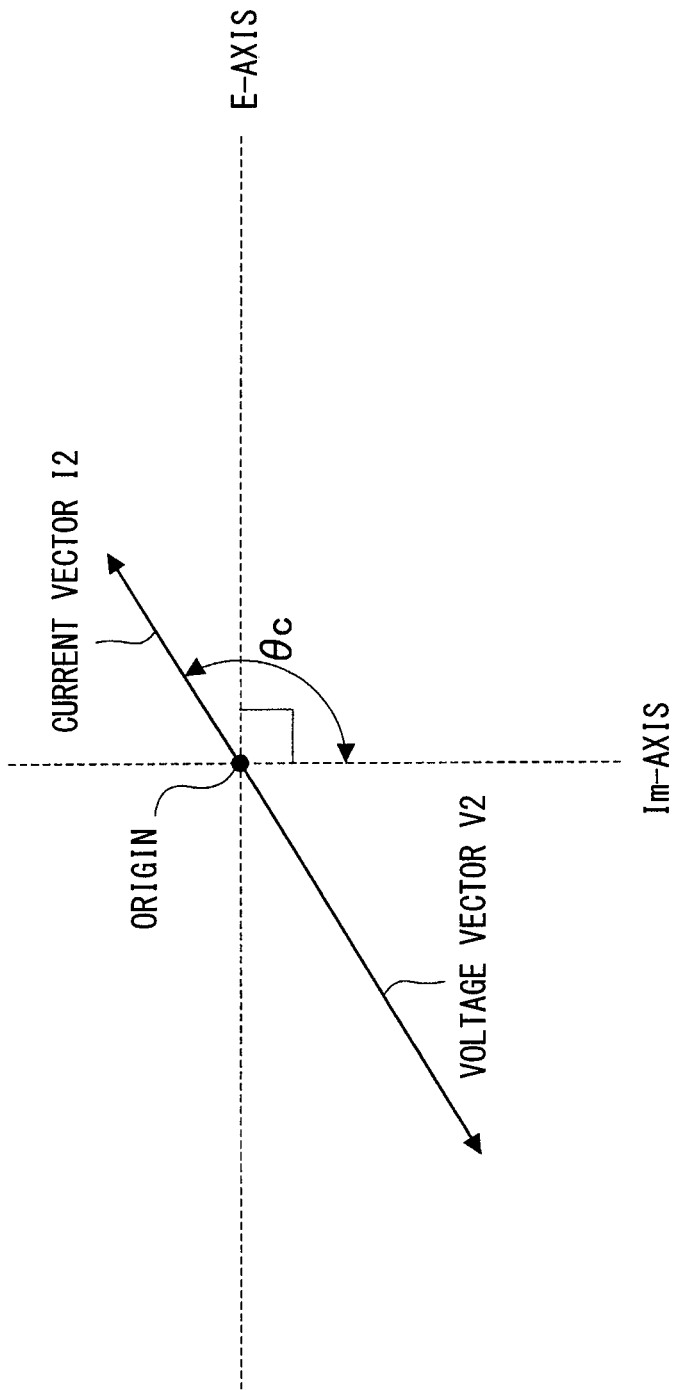
FIG. 28 is a second vector diagram illustrating the operation of a target value computation unit illustrated in FIG. 25.

Incidentally, the voltage vector and the current vector of each part of the non-contact power supply device have a relationship as illustrated in FIG. 26. In this example, as illustrated in FIG. 28, a phase difference θc is a phase difference between the current vector Im and the current vector I2. Others are the same as those described in the first embodiment.

The output power target value Pcom has a relationship represented in Expression 36.

$$Pcom = V2 \cdot I2 \quad [\text{Ex. 36}]$$

Assuming that an equivalent impedance of the power receiving coil, the power receiving side resonance capacitor, and the power receiving side rectifier circuit is R, an output voltage V2 has a relationship represented in Expression 37.

$$V2 = R \cdot I2 \quad [\text{Ex. 37}]$$

Figure 27:
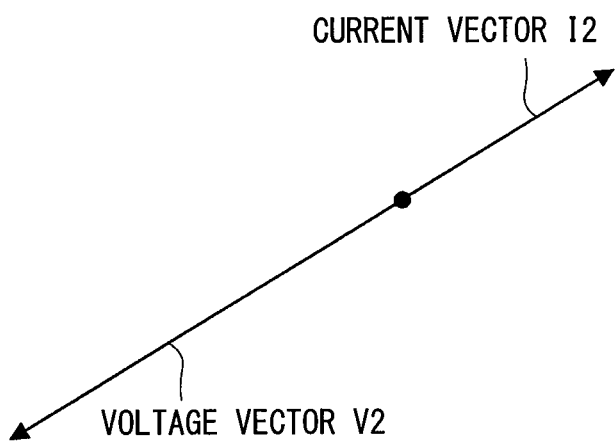
FIG. 27 is a first vector diagram illustrating the operation of a target value computation unit illustrated in FIG. 25.

The target value computation unit 861$c$ obtains an output voltage V2 which is a magnitude of a voltage vector V2 and an output current I2 which is a magnitude of a current vector I2 on the basis of an output power target value Pcom input from the vehicle control device, an equivalent impedance R set in advance, and Expressions 36 and 37. As a result, as illustrated in FIG. 27, the voltage vector V2 and the current vector I2 are determined.

Thereafter, the target value computation unit 861$c$ temporarily sets the phase difference θc to a predetermined value. As a result, as illustrated in FIG. 28, an Im axis indicating a direction of the current vector Im passing through an origin and an E axis orthogonal to the Im axis, which indicates a direction of the voltage vectors E1 and E2 passing through the origin are determined.

Figure 29:
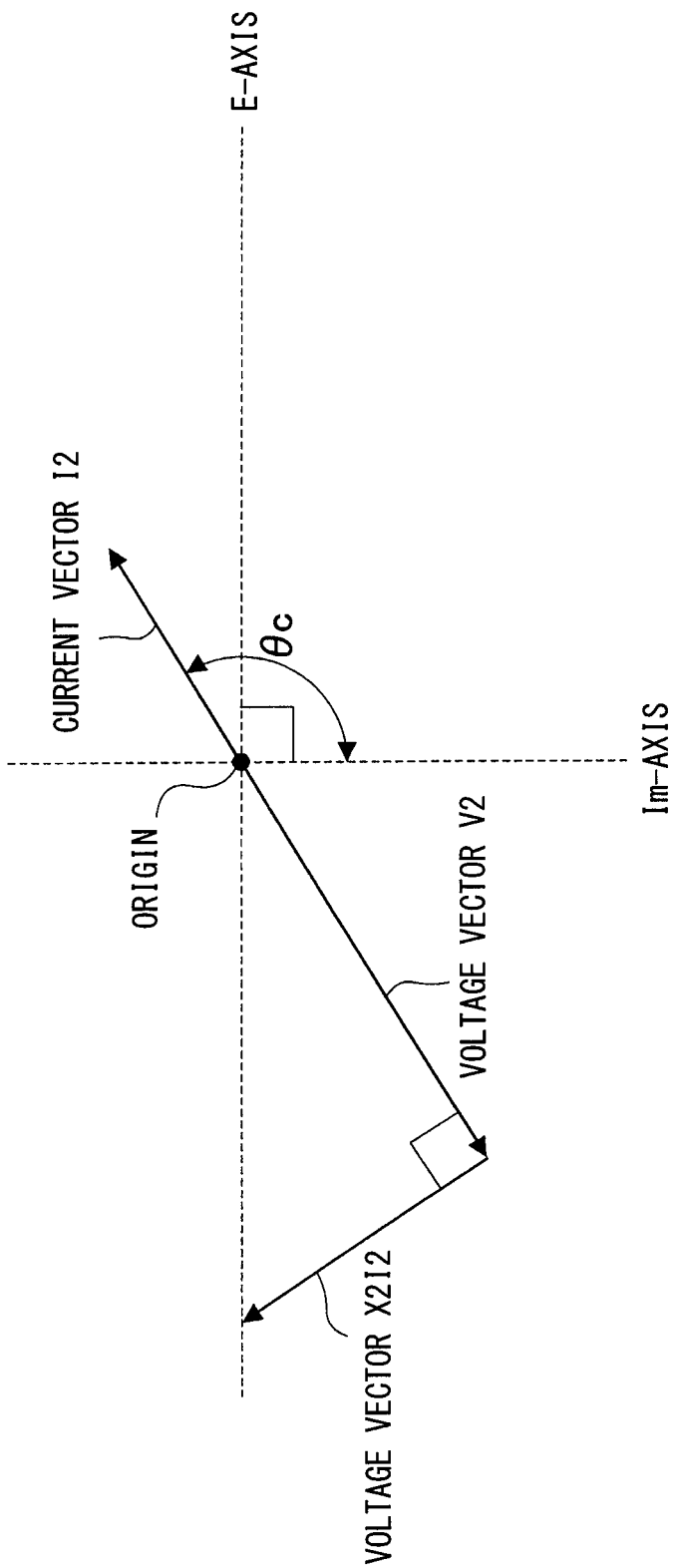
FIG. 29 is a third vector diagram illustrating the operation of a target value computation unit illustrated in FIG. 25.

As illustrated in FIG. 29, a vector orthogonal to the voltage vector V2 and extending from an end point of the voltage vector V2 to the E axis is a voltage vector X2I2. The target value computation unit 861$c$ obtains the angular frequency ω when the phase difference θc is a predetermined value on the basis of the voltage X2I2 which is the magnitude of the voltage vector X2I2, the inductance L2, a capacitance C2, the output current I2, a mutual inductance M, and Expression 3.

Figure 30:
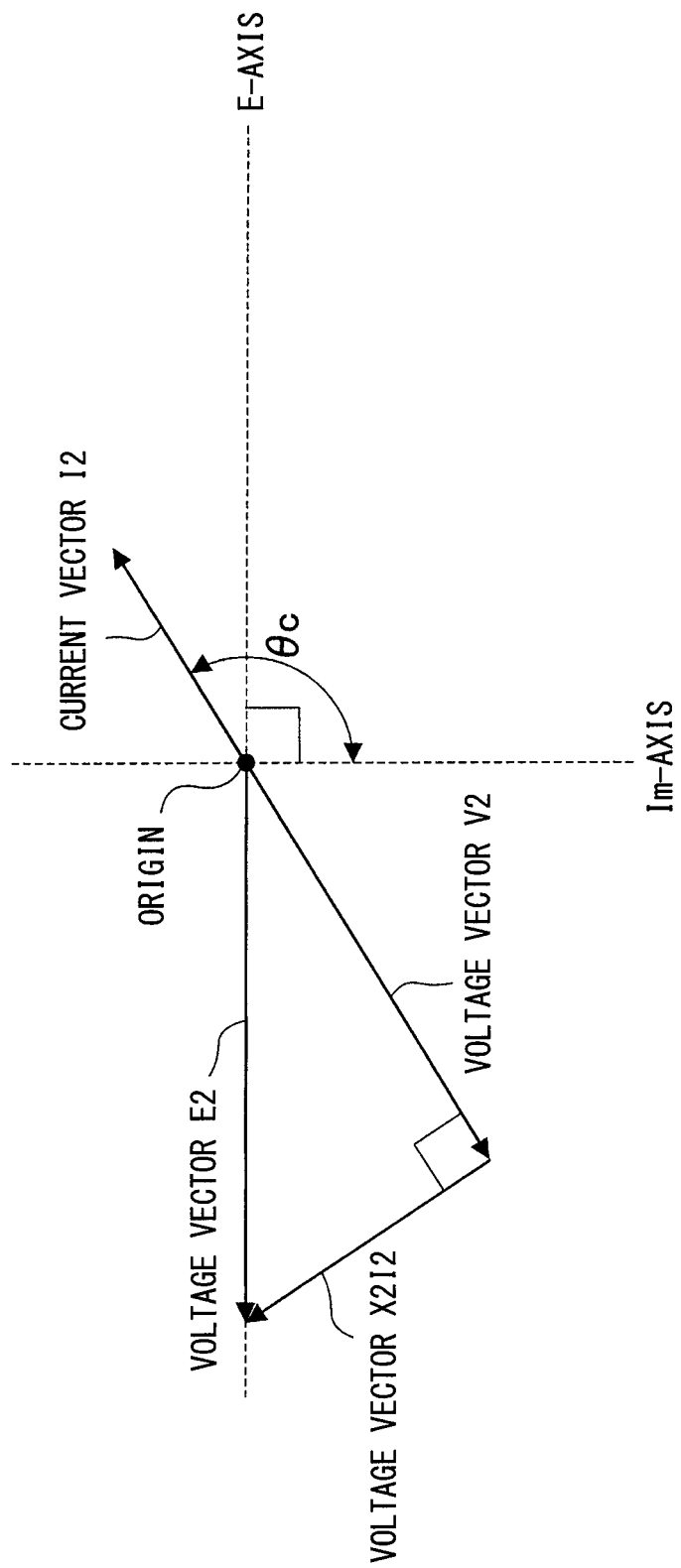
FIG. 30 is a fourth vector diagram illustrating the operation of a target value computation unit illustrated in FIG. 25.
Figure 31:
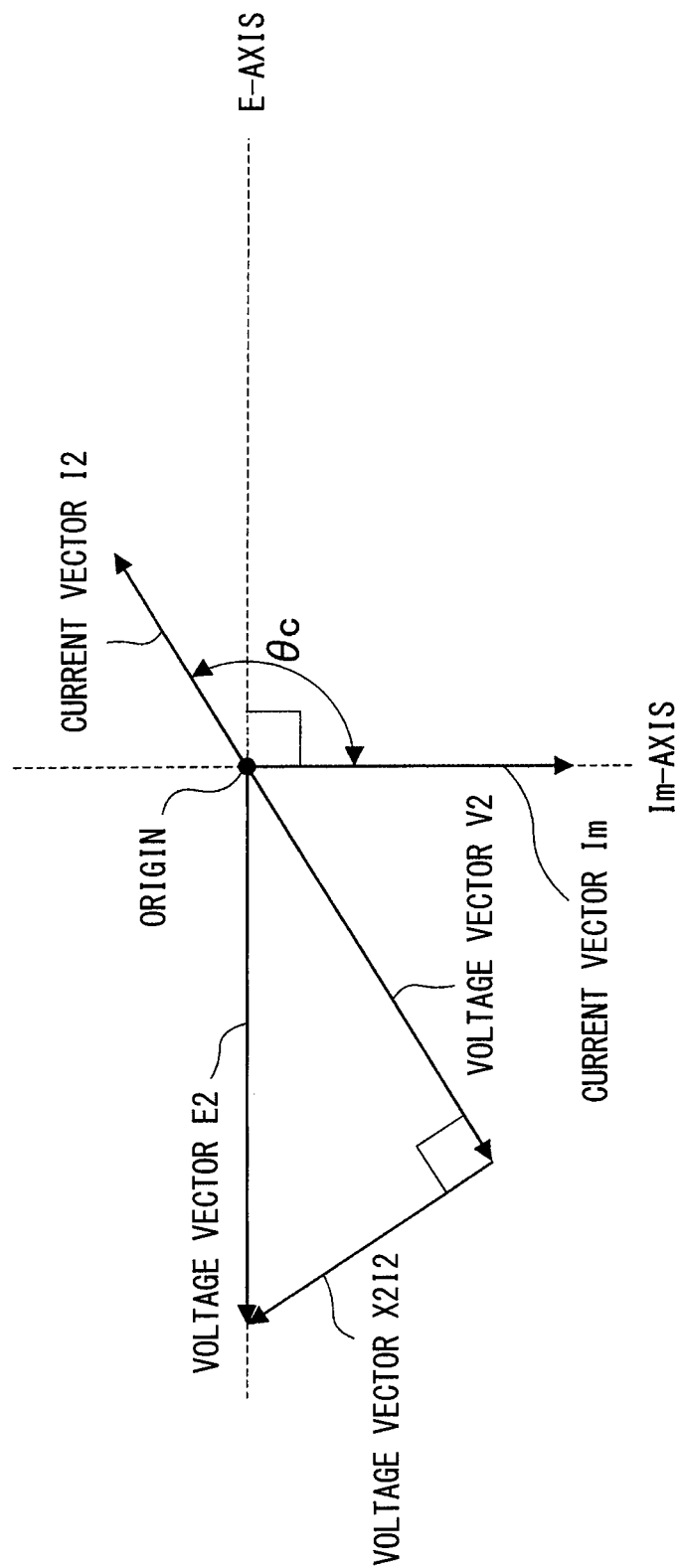
FIG. 31 is a fifth vector diagram illustrating the operation of a target value computation unit illustrated in FIG. 25.
Figure 32:
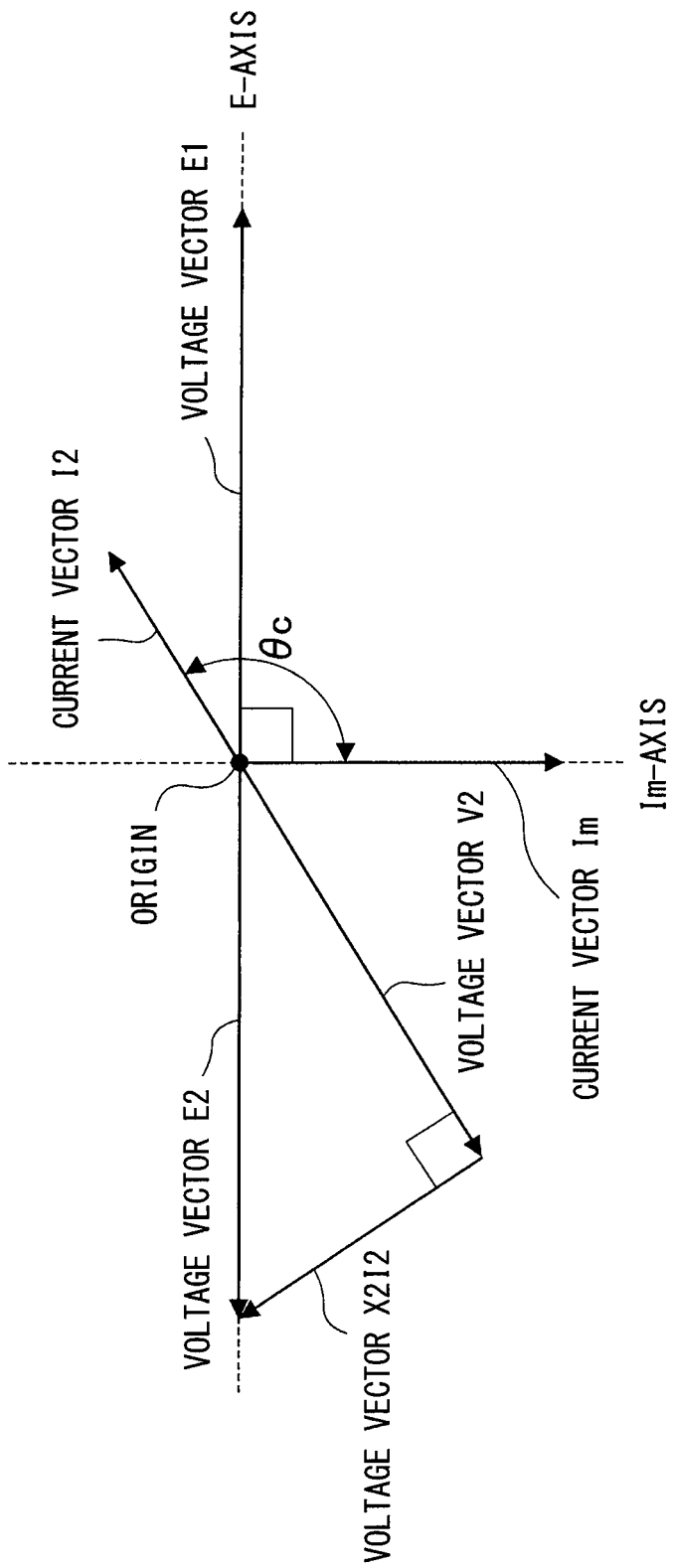
FIG. 32 is a sixth vector diagram illustrating the operation of a target value computation unit illustrated in FIG. 25.

As illustrated in FIG. 30, a vector extending from the origin to an end point of the voltage vector X2I2 is the voltage vector E2. The target value computation unit 861$c$ obtains a current Im which is a magnitude of the current vector Im on the basis of the voltage E2 which is the magnitude of the voltage vector E2 and Expression 26. As a result, the current vector Im is determined as illustrated in FIG. 31. Further, as illustrated in FIG. 32, the voltage vector E1 having the same magnitude as that of the voltage vector E2 and having a direction opposite to that of the voltage vector E2 is determined.

Figure 33:
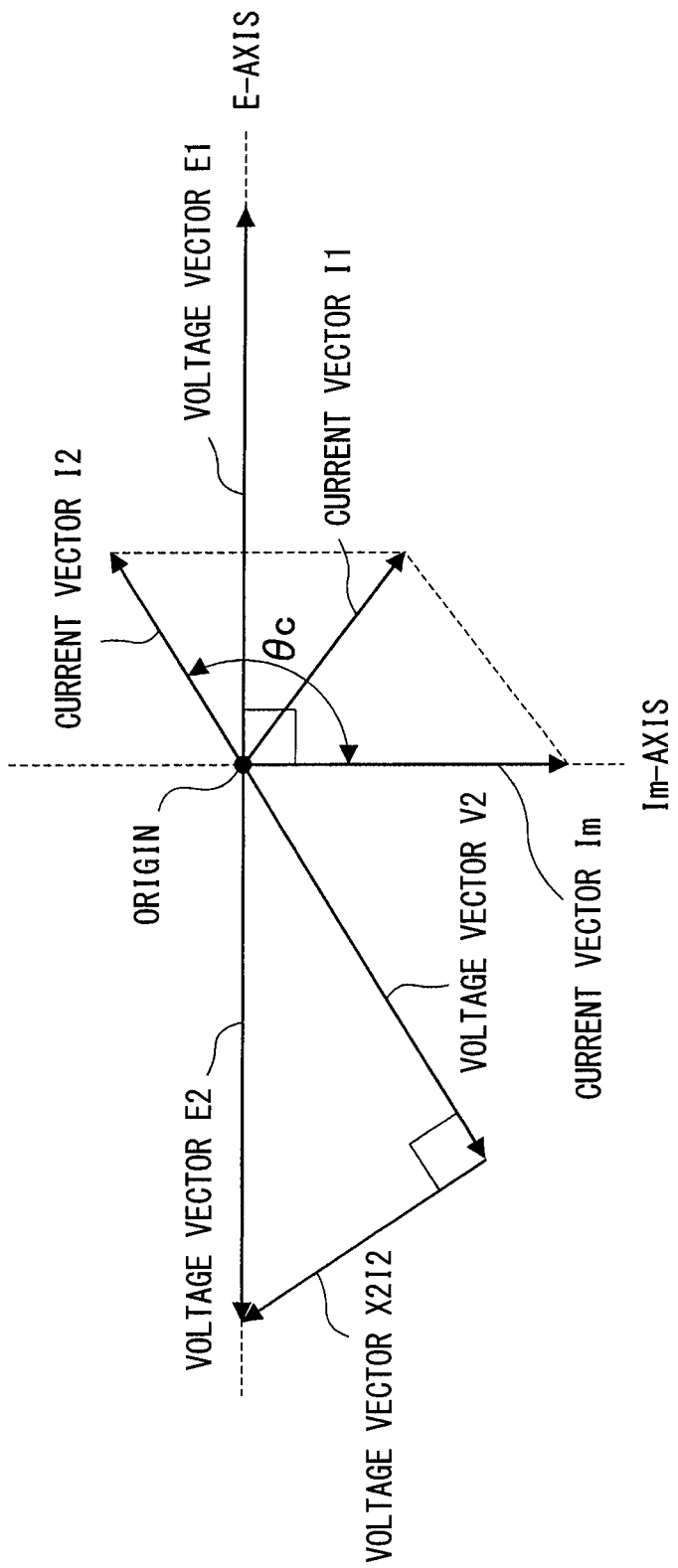
FIG. 33 is a seventh vector diagram illustrating the operation of a target value computation unit illustrated in FIG. 25.

As illustrated in FIG. 33, the current vector I1 is a vector sum of the current vector Im and the current vector I2. The target value computation unit 861$c$ obtains the current I1 which is the magnitude of the current vector I1 according to the current vector Im and the current vector I2.

Figure 34:
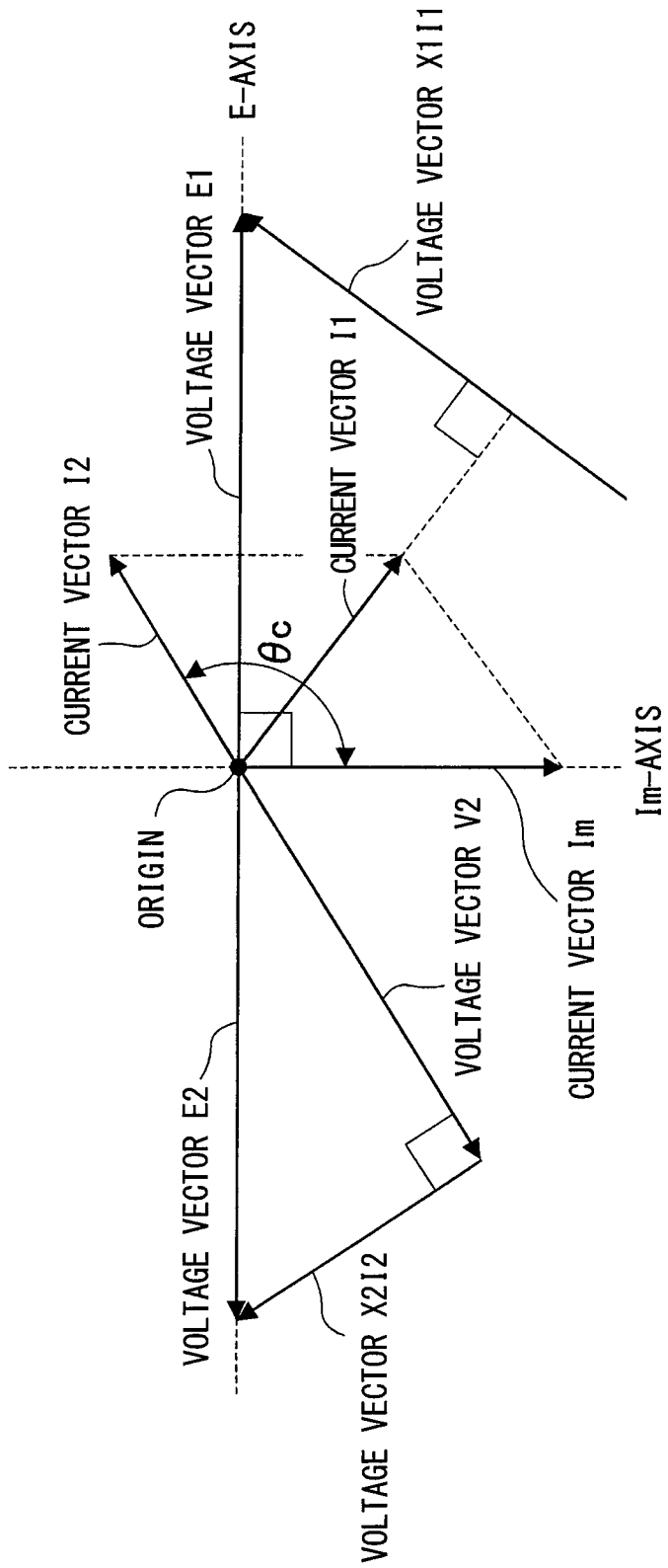
FIG. 34 is an eighth vector diagram illustrating the operation of a target value computation unit illustrated in FIG. 25.
Figure 35:
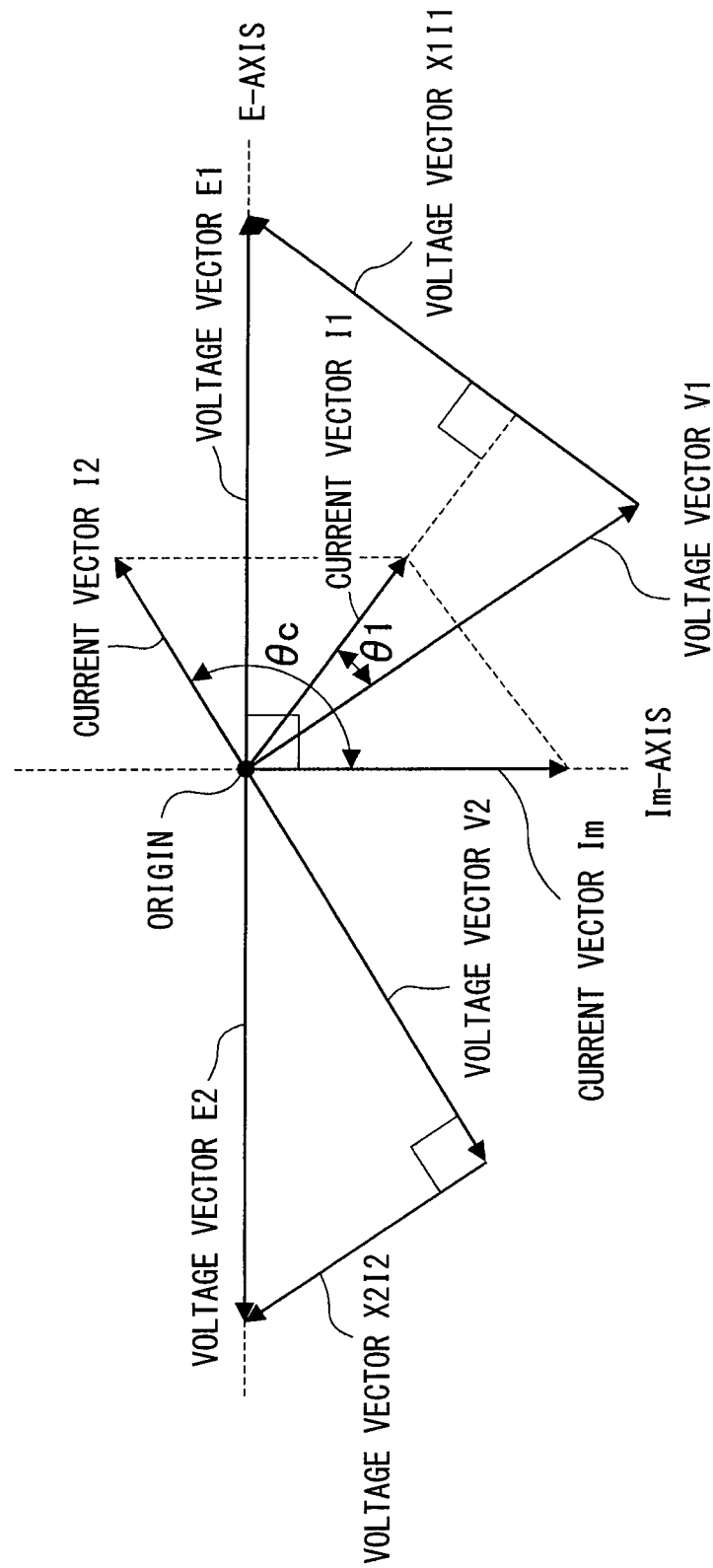
FIG. 35 is a ninth vector diagram illustrating the operation of a target value computation unit illustrated in FIG. 25.

Thereafter, the target value computation unit 861$c$ obtains a voltage X1I1, which is a magnitude of a voltage vector X1I1 according to the impedance X1 and the current I1 obtained in the process of computing the coupling coefficient k in the coupling coefficient computation 861$b$. As illustrated in FIG. 34, the voltage vector X1I1 is a vector that is orthogonal to the current vector I1 and whose end point reaches an end point of the voltage vector E1. As illustrated in FIG. 35, the voltage vector V1 is a vector extending from the origin to a start point of the voltage vector X1I1. The target value computation unit 861$c$ obtains the voltage V1 which is the magnitude of the voltage vector V1 as well as the phase difference θ1 according to the current I1 and the voltage X1I1.

Figure 36:
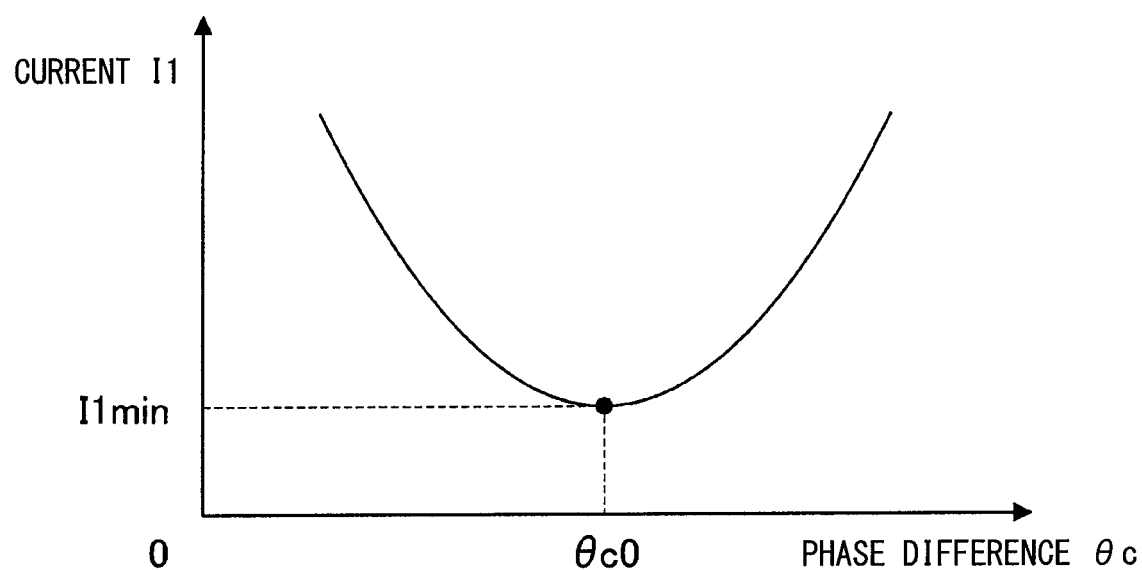
FIG. 36 is a graph showing a relationship between a phase difference θc and a current I1 illustrating the operation of the target value computation unit in FIG. 25.

Thereafter, the value of the phase difference θc is changed, and the same operation is repeated. As a result, a relationship between the phase difference θc and the current I1 as illustrated in FIG. 36 is obtained. The target value computation unit 861$c$ obtains a value θc0 of the phase difference θc at which the current I1 becomes a minimum I1$min$. The target value computation unit 861$c$ obtains the phase difference target value θ1_com and the output voltage target value |V1_FF| according to the phase difference θc0 and the voltage V1 in the case of the phase difference θc0.

The power transmission side control circuit 861 generates a drive signal from the phase difference target value θ1_com and the output voltage target value |V1_FF| and the like, and controls the power transmission circuit so that the phase difference becomes the phase difference target value θ1_com, and the magnitude of the voltage vector V1 becomes the output voltage target value |V1_FF|.

Subsequently, advantages of the non-contact power supply device according to the eighth embodiment will be described.

According to the eighth embodiment, the power transmission side control circuit 861 obtains the voltage vector target value |V1_FF| on the basis of the relationship between the voltage vector and the current vector. The power transmission side control circuit 861 controls the power transmission circuit so that the voltage vector of the alternating current output from the power transmission circuit is kept at the voltage vector target value |V1_FF|. For that reason, the power transmission side control circuit 861 can directly control the AC voltage and AC current output from the power transmission circuit. Therefore, the non-contact power supply device can suppress the delay caused by the control and improve the responsiveness.

According to the eighth embodiment, the power transmission side control circuit 861 obtains the voltage vector target value |V1_FF| with the use of the voltage vector X1I1 indicative of an electromotive voltage generated by an impedance X1 including a leakage inductance not coupled with the power receiving coil, and a voltage vector X2I2 indicative of an electromotive voltage generated by an impedance X2 including a leakage inductance not coupled with the power transmission coil, on the basis of a relationship between the voltage vector and the current vector. For that reason, the voltage vector target value |V1_FF| can be obtained more accurately.

According to the eighth embodiment, the power transmission side control circuit 861 obtains the phase difference target value θ1_com and the output voltage target value |V1_FF| on the basis of the relationship between the voltage vector and the current vector. The power transmission side control circuit 861 controls the power transmission circuit so that the phase difference becomes the phase difference target value θ1_com and the magnitude of the voltage vector V1 becomes the output voltage target value |V1_FF|. For that reason, the power transmission side control circuit 861 can control the AC voltage and AC current output from the power transmission circuit more accurately.

According to the eighth embodiment, the power transmission side control circuit 861 sets the phase difference at which the magnitude of the current vector I1 becomes minimum to the phase difference target value θ1_com. As a result, the power transmission side control circuit 861 can suppress the power output from the power transmission circuit.

It should be noted that the configuration of the eighth embodiment can also be applied to other embodiments having blocks for computing the phase difference target value θ1_com and the output voltage target value |V1_FF|. In the eighth embodiment, the angular frequency ω simultaneously obtained in the process of obtaining the phase difference target value θ1_com can be controlled as a command value.

Ninth Embodiment

Subsequently, a non-contact power supply device according to a ninth embodiment will be described. The non-contact power supply device according to the ninth embodiment is different from the non-contact power supply device of the eighth embodiment in that the configuration of the target value computation unit is changed. More particularly, the target value computation unit according to the eighth embodiment collectively computes the phase difference target value and the output voltage target value whereas a target value computation unit according to the ninth embodiment collectively computes an angular frequency and an output voltage target value.

Because the configurations and operation other than those of the target value computation unit are the same as those of the eighth embodiment, a description of those configurations and operation will be omitted except when it is necessary. First, a configuration and operation of the target value computation unit will be described with reference to FIGS. 37 to 47.

Figure 37:
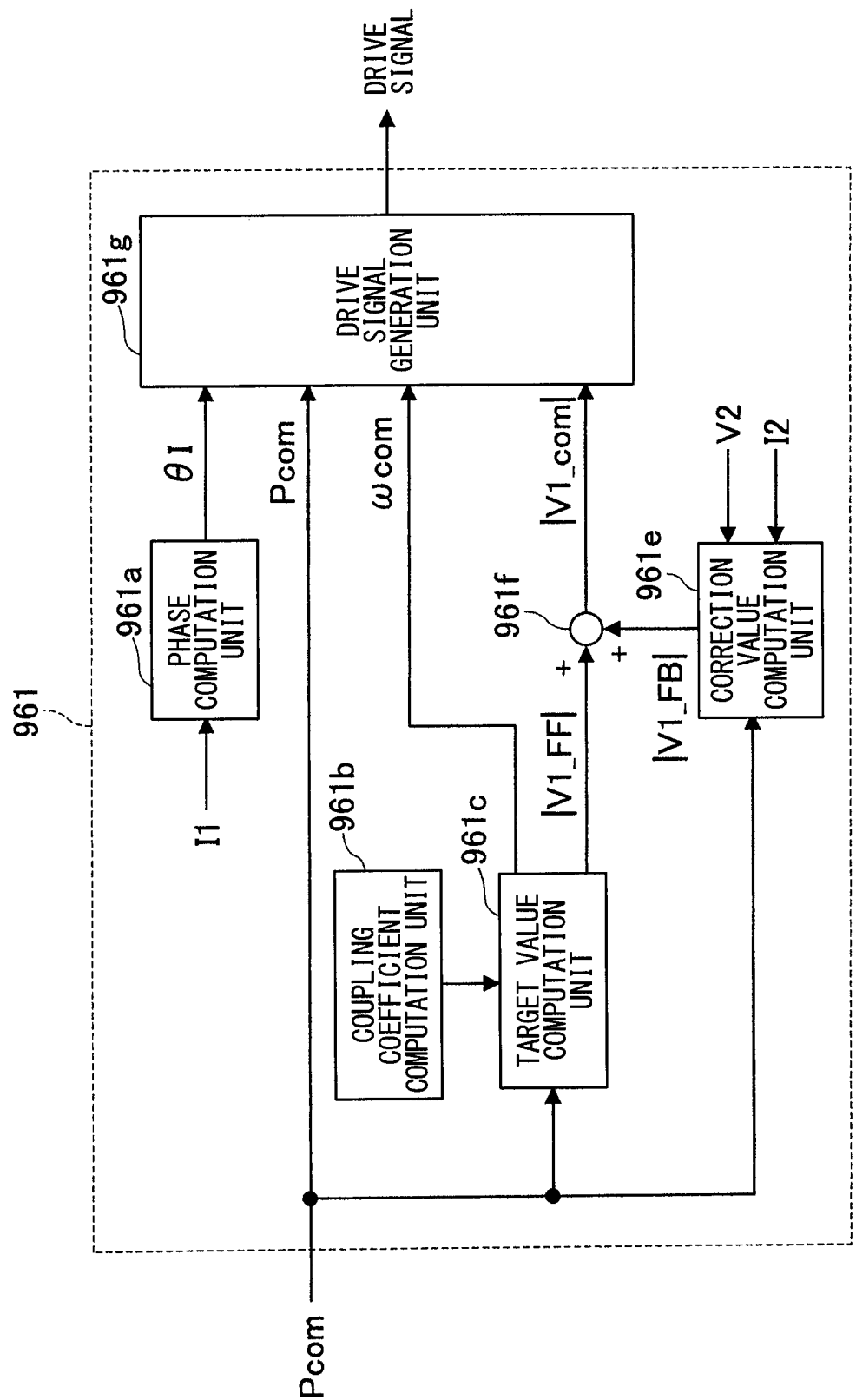
FIG. 37 is a block diagram of a power transmission side control circuit according to a ninth embodiment.

As illustrated in FIG. 37, the power transmission side control circuit 961 includes a phase computation unit 961*a*, a coupling coefficient computation unit 961*b*, a target value computation unit 961*c*, a correction value computation unit 961*e*, a correction unit 961*f*, and a drive signal generation unit 961*g*.

The phase computation unit 961*a*, the coupling coefficient computation unit 961*b*, the correction value computation unit 961*e*, and the correction unit 961*f* are the same blocks as those of the phase computation unit 861*a*, the coupling coefficient computation unit 861*b*, the correction value computation unit 861*e*, and the correction unit 861*f* in the eighth embodiment.

The target value computation unit 961*c* is a block that computes and outputs an angular frequency phase difference target value ωcom and an output voltage target value |V1_FF| on the basis of a vector diagram showing a relationship between the voltage vector and the current vector.

Figure 38:
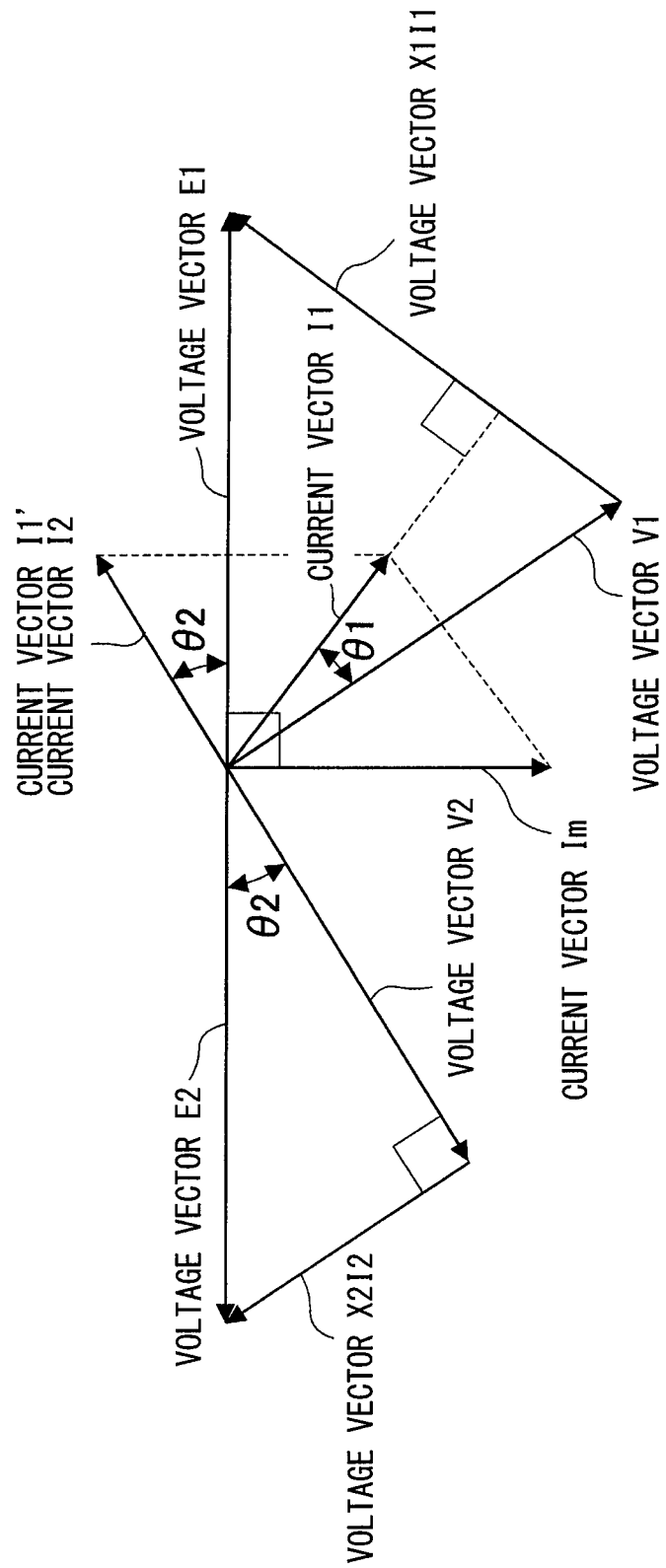
FIG. 38 is a vector diagram illustrating a voltage vector and a current vector of each part of a non-contact power supply device according to the ninth embodiment.

Incidentally, the voltage vector and the current vector of each part of the non-contact power supply device have a relationship as illustrated in FIG. 38. All components are the same as those described in the first embodiment.

Figure 39:
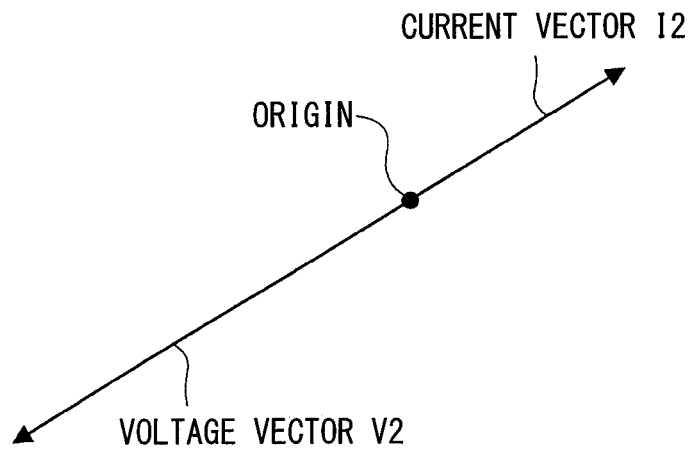
FIG. 39 is a first vector diagram illustrating the operation of a target value computation unit illustrated in FIG. 37.

The target value computation unit 961*c* obtains an output voltage V2 which is a magnitude of a voltage vector V2 and an output current I2 which is a magnitude of a current vector I2 on the basis of an output power target value Pcom input from the vehicle control device, an equivalent impedance R set in advance, and Expressions 36 and 37. As a result, as illustrated in FIG. 39, the voltage vector V2 and the current vector I2 are determined.

Thereafter, the target value computation unit 961*c* temporarily sets the angular frequency ω to a predetermined value. The target value computation unit 961*c* obtains a voltage X2I2 which is a magnitude of a voltage vector X2I2 according to an impedance X2 and a current I2.

Figure 40:
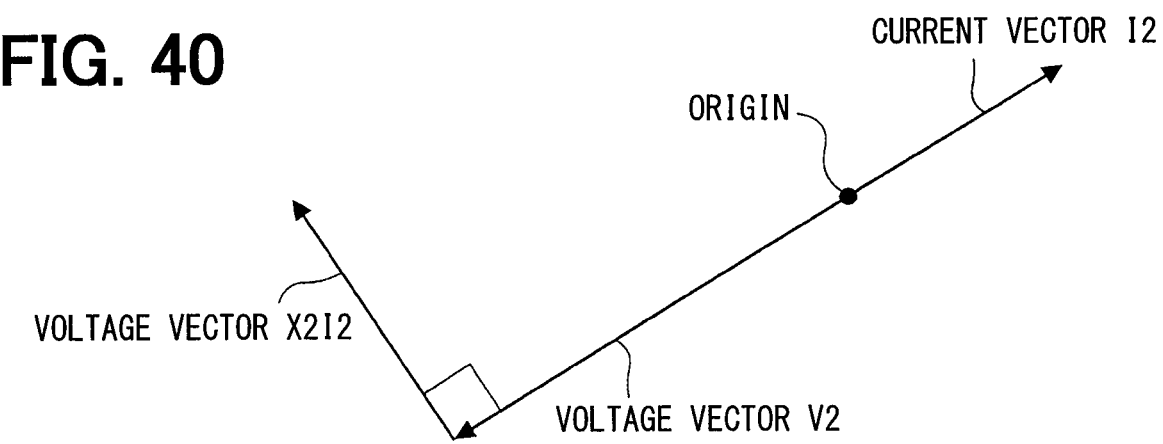
FIG. 40 is a second vector diagram illustrating the operation of a target value computation unit illustrated in FIG. 37.
Figure 41:
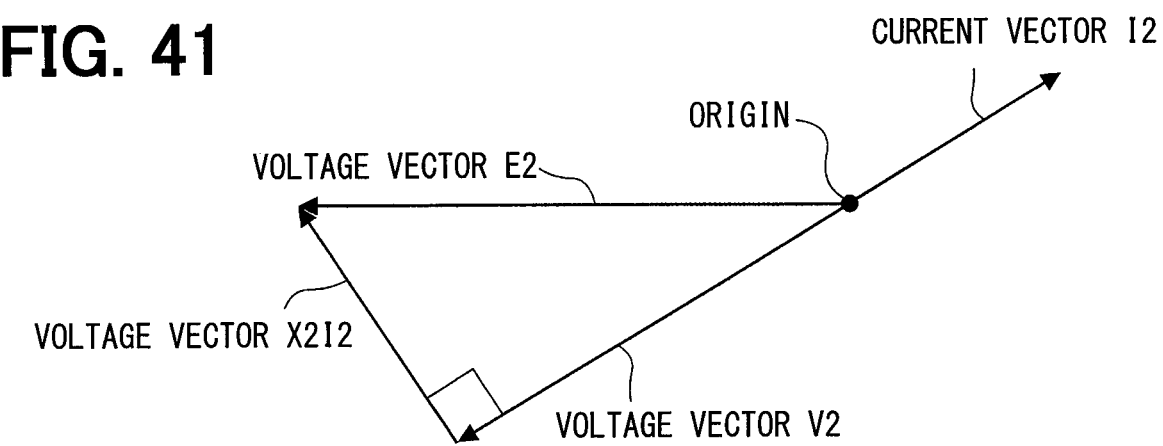
FIG. 41 is a third vector diagram illustrating the operation of a target value computation unit illustrated in FIG. 37.

As illustrated in FIG. 40, the voltage vector X2I2 is orthogonal to the voltage vector V2. As illustrated in FIG. 41, the voltage vector E2 is a vector sum of the voltage vector V2 and the voltage vector X2I2. A vector extending from the origin to an end point of the voltage vector X2I2 is the voltage vector E2. The target value computation unit 961*c* obtains the voltage E2 which is the magnitude of the voltage vector E2 according to the voltage V2 and the voltage X2I2.

Figure 42:
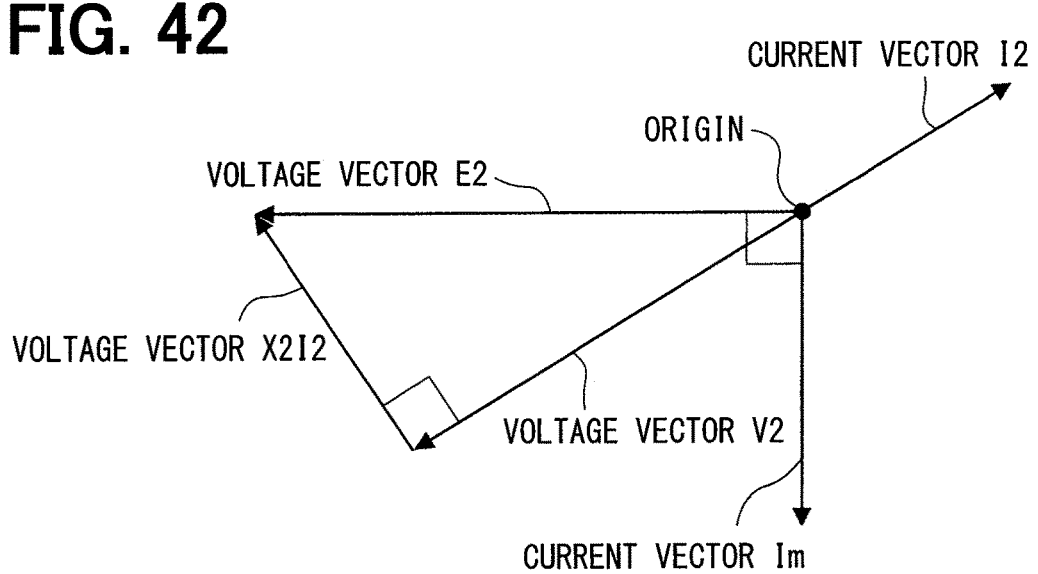
FIG. 42 is a fourth vector diagram illustrating the operation of a target value computation unit illustrated in FIG. 37.

Thereafter, the target value computation unit 961*c* obtains a current Im which is a magnitude of a current vector Im on the basis of the voltage E2 and Expression 26. The current vector Im is orthogonal to the voltage vector E2. As a result, the current vector Im is determined as illustrated in FIG. 42.

Figure 43:
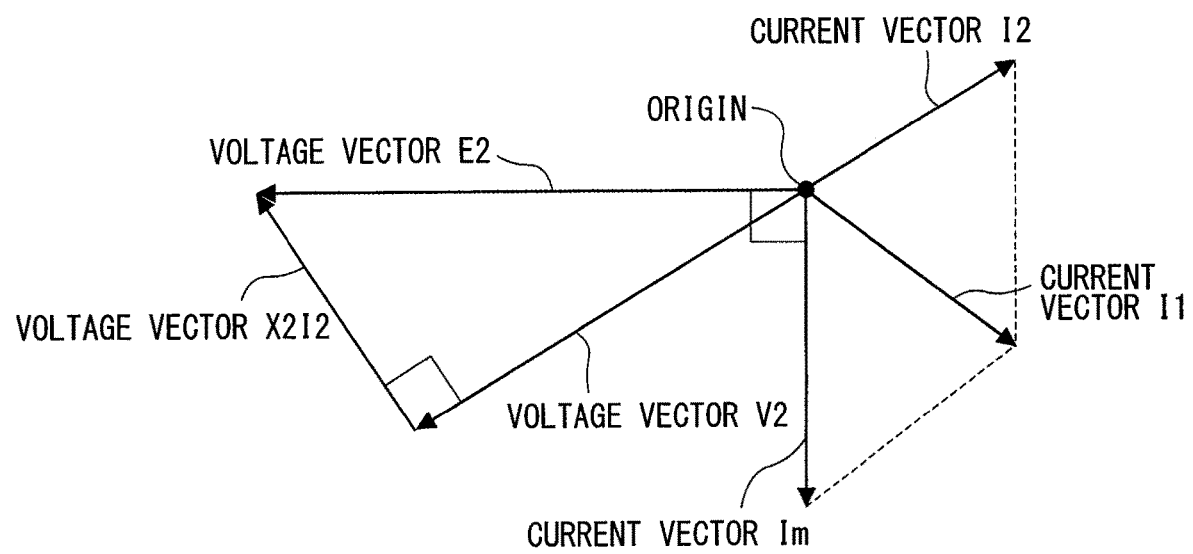
FIG. 43 is a fifth vector diagram illustrating the operation of a target value computation unit illustrated in FIG. 37.

As illustrated in FIG. 43, the current vector I1 is a vector sum of the current vector Im and the current vector I2. The target value computation unit 861*c* obtains the current I1 which is the magnitude of the current vector I1 according to the current vector Im and the current vector I2.

Figure 44:
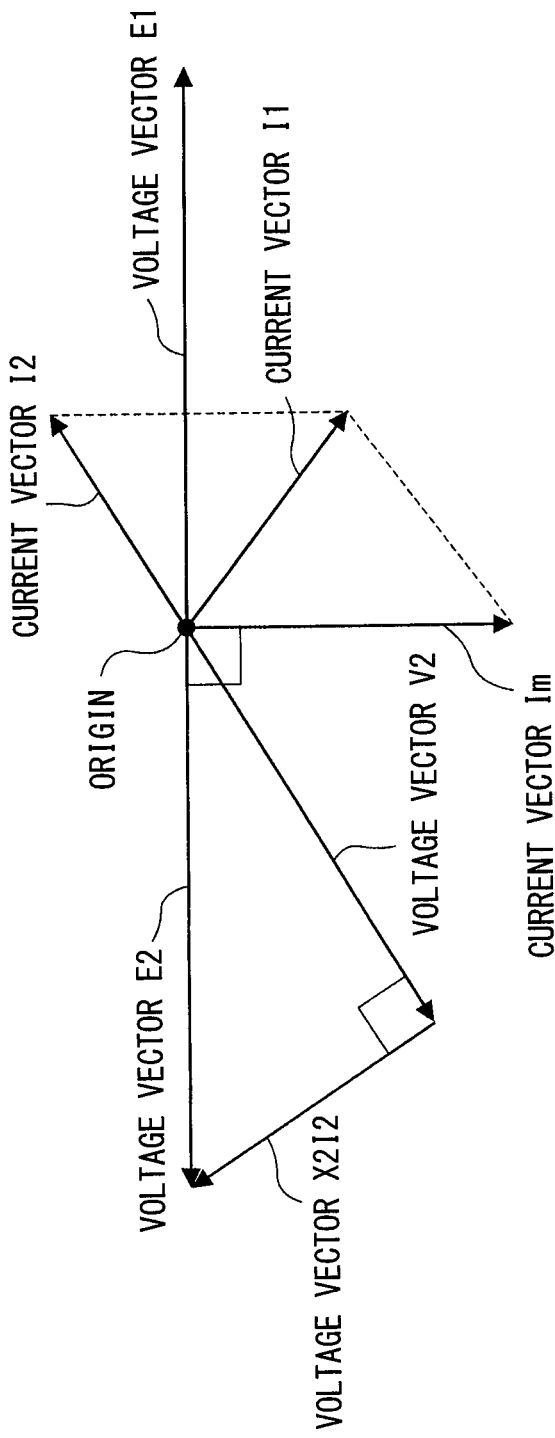
FIG. 44 is a sixth vector diagram illustrating the operation of a target value computation unit illustrated in FIG. 37.
Figure 45:
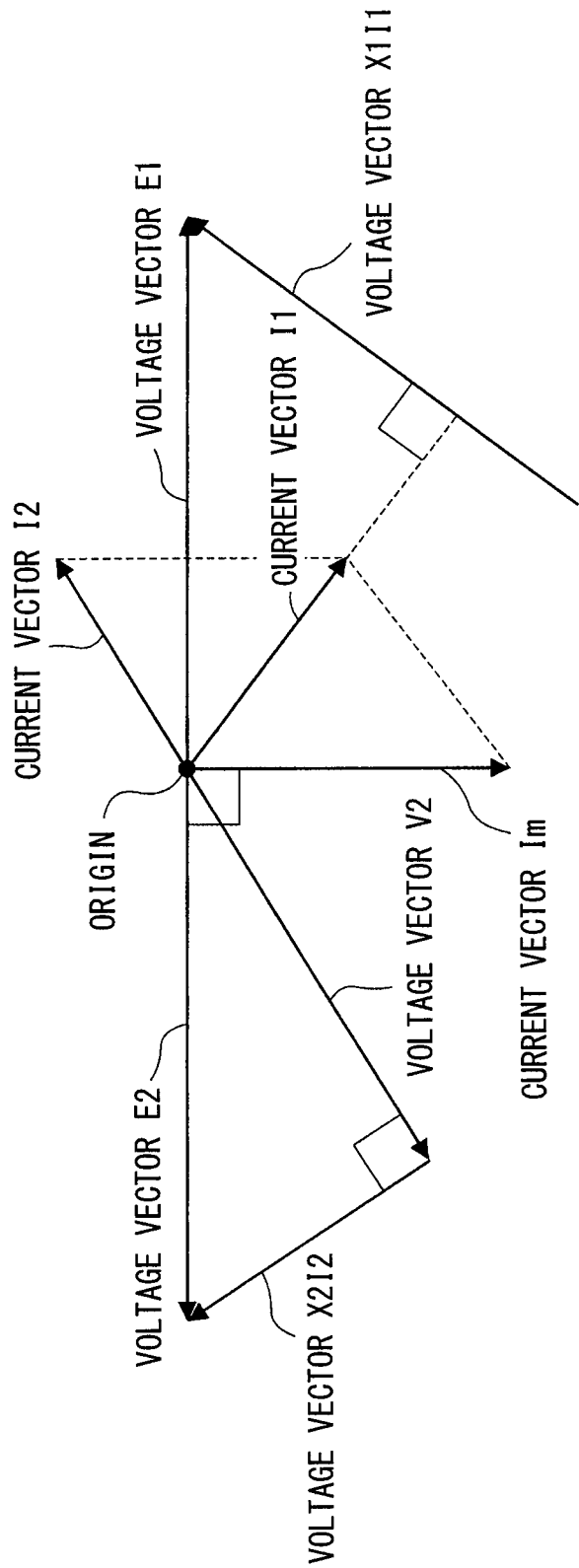
FIG. 45 is a seventh vector diagram illustrating the operation of a target value computation unit illustrated in FIG. 37.
Figure 46:
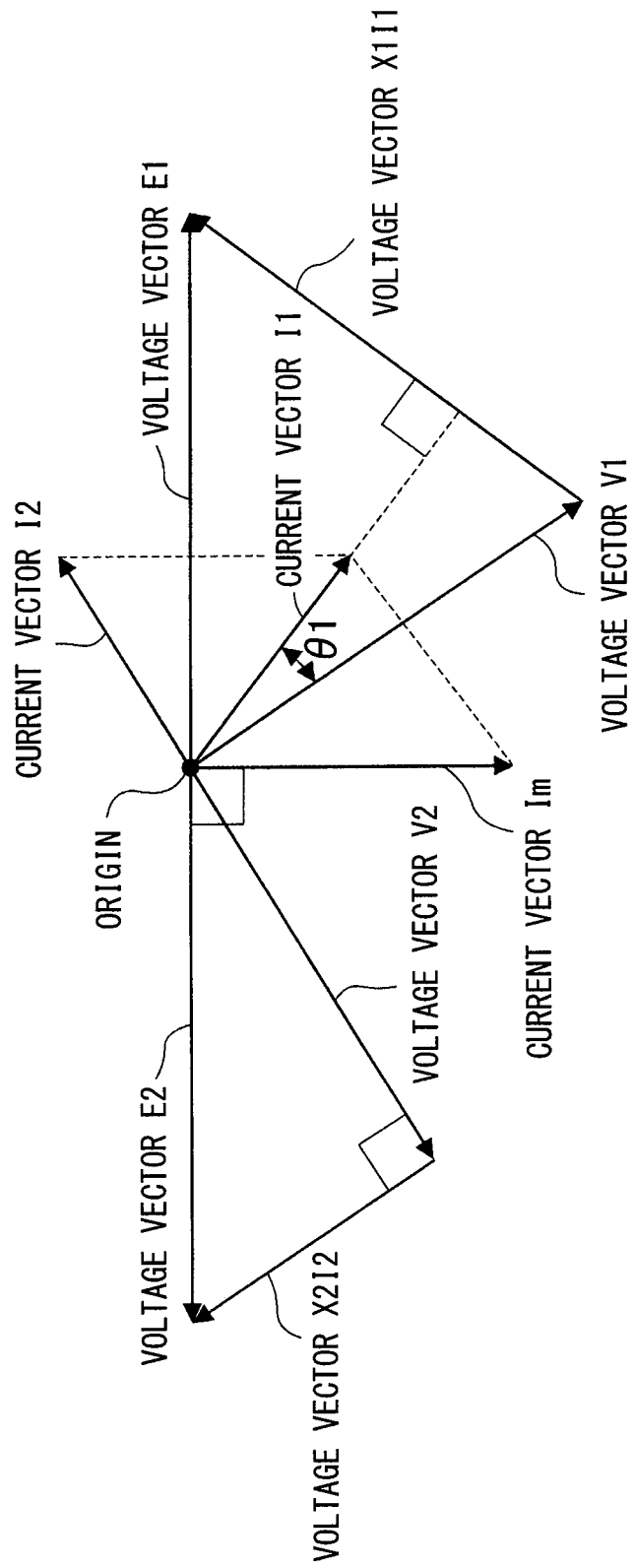
FIG. 46 is an eighth vector diagram illustrating the operation of a target value computation unit illustrated in FIG. 37.

As illustrated in FIG. 44, the voltage vector E1 having the same magnitude as that of the voltage vector E2 and having a direction opposite to that of the voltage vector E2 is determined. As illustrated in FIG. 45, the voltage vector X1I1 is a vector that is orthogonal to the current vector I1 and whose end point reaches an end point of the voltage vector E1. As illustrated in FIG. 46, the voltage vector V1 is a vector extending from the origin to a start point of the voltage vector X1I1. The target value computation unit 961c obtains the voltage V1 which is the magnitude of the voltage vector V1 as well as the phase difference θ1 according to the current I1 and the voltage X1I1.

Figure 47:
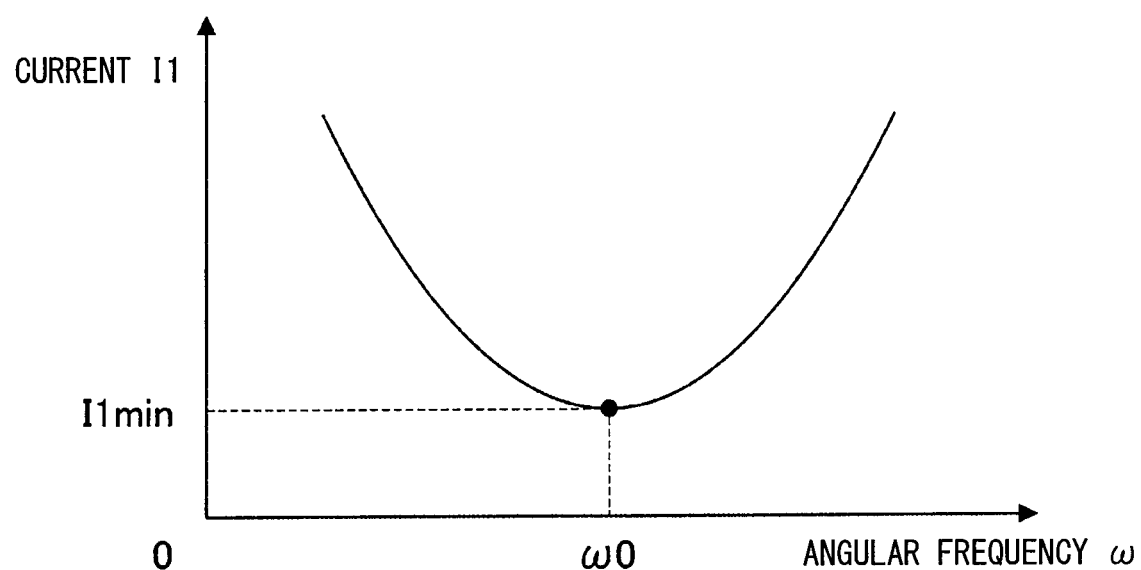
FIG. 47 is a graph showing a relationship between an angular frequency ω and a current I1 illustrating the operation of the target value computation unit in FIG. 37.

Thereafter, the value of the angular frequency ω is changed, and the same operation is repeated. As a result, a relationship between the angular frequency ω and the current I1 as illustrated in FIG. 47 is obtained. The target value computation unit 961c obtains a value ω0 of the angular frequency ω at which the current I1 becomes a minimum I1min. The target value computation unit 961c obtains the angular frequency target value ωcom and the output voltage target value |V1_FF| according to the angular frequency ω0 and the voltage V1 in the case of the angular frequency ω0.

The drive signal generation unit 961g illustrated in FIG. 37 is a block that generates and outputs a drive signal for controlling the power transmission circuit on the basis of the phase θI, the output power target value Pcom, the angular frequency target value target value ωcom, and the output voltage target value |V1_com|.

The power transmission side control circuit 961 generates a drive signal from the angular frequency target value ωcom and the output voltage target value |V1_FF| and the like, and controls the power transmission circuit so that the angular frequency becomes the angular frequency target value ωcom, and the magnitude of the voltage vector V1 becomes the output voltage target value |V1_FF|.

Subsequently, advantages of the non-contact power supply device according to the ninth embodiment will be described.

According to the ninth embodiment, the power transmission side control circuit 961 obtains the voltage vector target value |V1_FF| on the basis of the relationship between the voltage vector and the current vector. The power transmission side control circuit 961 controls the power transmission circuit so that the voltage vector of the alternating current output from the power transmission circuit is kept at the voltage vector target value |V1_FF|. For that reason, the power transmission side control circuit 961 can directly control the AC voltage and AC current output from the power transmission circuit. Therefore, the non-contact power supply device can suppress the delay caused by the control and improve the responsiveness.

According to the ninth embodiment, the power transmission side control circuit 961 obtains the voltage vector target value |V1_FF| with the use of the voltage vector X1I1 indicative of an electromotive voltage generated by an impedance X1 including a leakage inductance not coupled with the power receiving coil, and a voltage vector X2I2 indicative of an electromotive voltage generated by an impedance X2 including a leakage inductance not coupled with the power transmission coil, on the basis of a relationship between the voltage vector and the current vector. For that reason, the voltage vector target value |V1_FF| can be obtained more accurately.

According to the ninth embodiment, the power transmission side control circuit 961 obtains the angular frequency target value ωcom and the output voltage target value |V1_FF| on the basis of the relationship between the voltage vector and the current vector. The power transmission side control circuit 961 controls the power transmission circuit so that the angular frequency becomes the angular frequency target value ωcom and the magnitude of the voltage vector V1 becomes the output voltage target value |V1_FF|. For that reason, the power transmission side control circuit 961 can control the AC voltage and AC current output from the power transmission circuit more accurately.

According to the ninth embodiment, the power transmission side control circuit 961 sets the angular frequency at which the magnitude of the current vector I1 becomes minimum to the angular frequency target value ωcom. As a result, the power transmission side control circuit 961 can suppress the power output from the power transmission circuit. In the ninth embodiment, the phase difference θ1_com simultaneously obtained in the process of obtaining the angular frequency target value ωcom can be controlled as a command value.

Tenth Embodiment

Subsequently, a non-contact power supply device according to a tenth embodiment will be described. The non-contact power supply device according to the tenth embodiment is different from the non-contact power supply device of the first embodiment in that immittance conversion circuits are added between a power transmission circuit and a power transmission coil and between a power receiving coil and a power receiving circuit.

Because the configurations and operation other than those of the immittance conversion circuits are the same as those of the first embodiment, a description of those configurations and operation will be omitted except when it is necessary. First, a configuration and operation of the non-contact power supply device will be described with reference to FIGS. 48 to 51.

Figure 48:
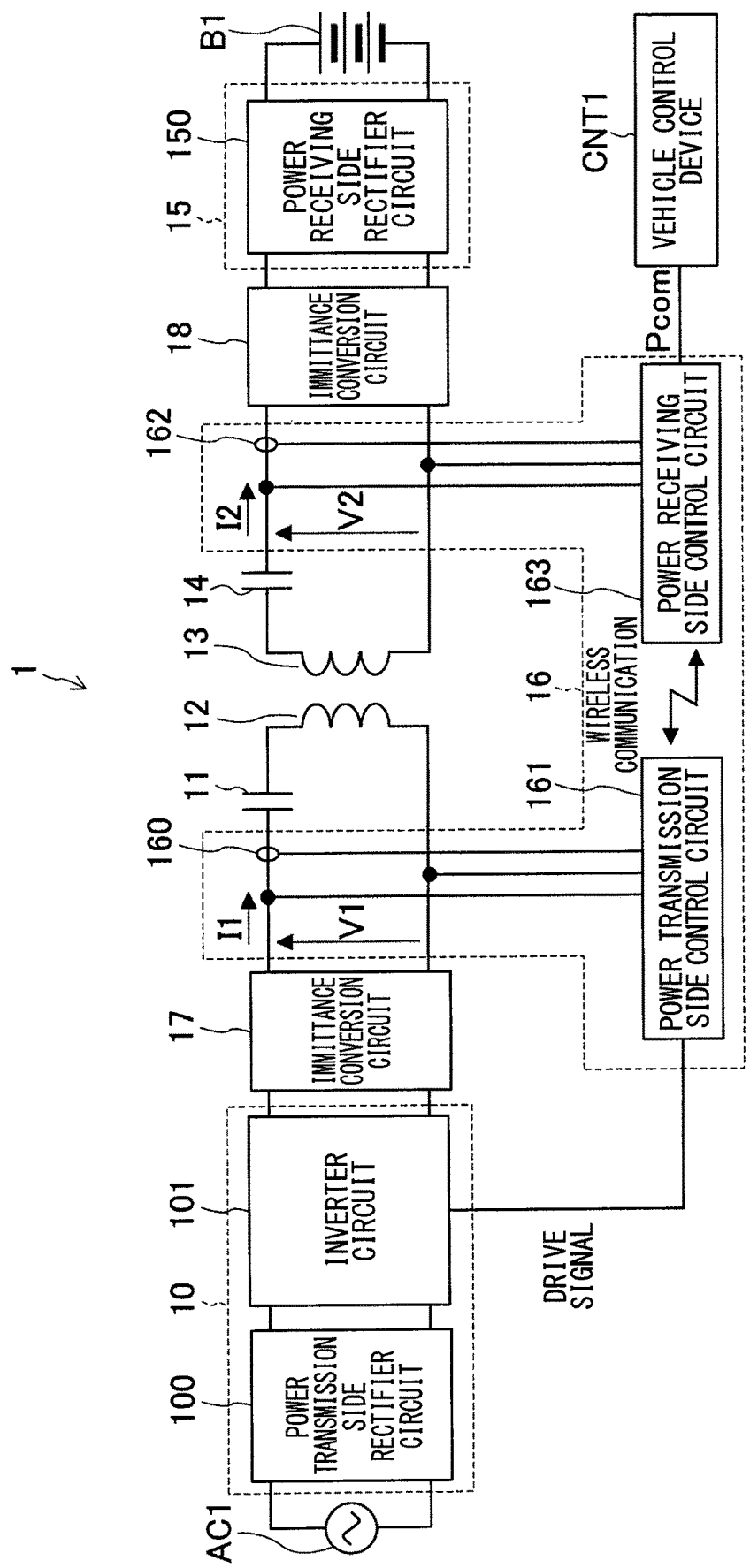
FIG. 48 is a circuit diagram of a non-contact power supply device according to a tenth embodiment.

As illustrated in FIG. 48, the non-contact power supply device 1 includes a power transmission circuit 10, a power transmission side resonance capacitor 11, a power transmission coil 12, a power receiving coil 13, a power receiving side resonance capacitor 14, a power receiving circuit 15, and a control circuit 16. Further, the non-contact power supply device 1 includes immittance conversion circuits 17 and 18. The power transmission circuit 10, the power transmission side resonance capacitor 11, the power transmission coil 12, the power receiving coil 13, the power receiving side resonance capacitor 14, the power receiving circuit 15, and the control circuit 16 are identical with those in the first embodiment.

Figure 49:
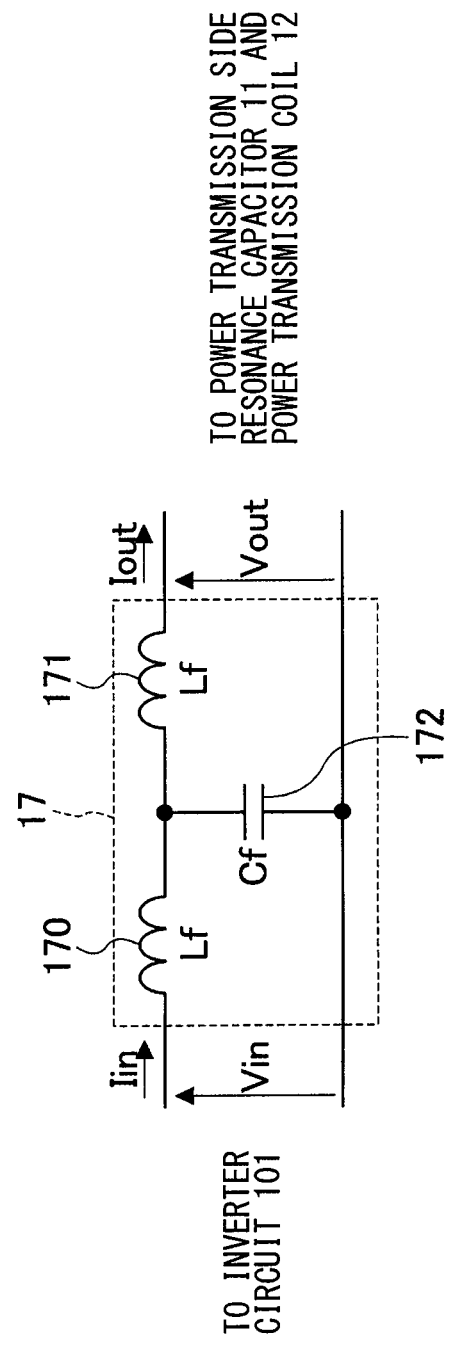
FIG. 49 is a circuit diagram of an immittance conversion circuit in FIG. 48.

The immittance conversion circuit 17 is disposed between the power transmission circuit 10 and the power transmission coil 12 and performs an immittance conversion. More specifically, in the immittance conversion circuit 17, an impedance viewed from one terminal pair is proportional to an admittance of a circuit connected to the other terminal pair. As illustrated in FIG. 49, the immittance conversion circuit 17 includes reactors 170, 171 and a capacitor 172. The reactors 170 and 171 are connected in series with each other. One end of the reactor 170 is connected to one output end of the inverter circuit 101, and one end of the reactor 171 is connected to the other end of the power transmission side resonance capacitor 11. One end of the capacitor 172 is connected to a series connection point of the reactors 170 and 171, and the other end of the capacitor 172 is connected to the other output end of the inverter circuit 101 and the other end of the power transmission coil 12.

As illustrated in FIG. 49, a voltage and a current at an input end of the immittance conversion circuit 17 are Vin and Iin, a voltage and a current at the output end of the immittance conversion circuit 17 are Vout and Iout, an inductance of the reactors 170 and 171 is Lf, and a capacitance of the capacitor 172 is Cf, those elements have a relationship represented in Expression 38.

$$\begin{pmatrix} Vout \\ Iout \end{pmatrix} = \begin{pmatrix} 0 & j\omega Lf \\ -j\omega Cf & 0 \end{pmatrix} \begin{pmatrix} Vin \\ Iin \end{pmatrix} \quad [\text{Ex. 38}]$$

The immittance conversion circuit 18 illustrated in FIG. 48 is disposed between the power receiving coil 13 and the power receiving circuit 15 and performs an immittance conversion. More specifically, in the immittance conversion circuit 17, an impedance viewed from one terminal pair is proportional to an admittance of a circuit connected to the other terminal pair. The immittance conversion circuit 18 has the same configuration as that of the immittance conversion circuit 17.

Figure 50:
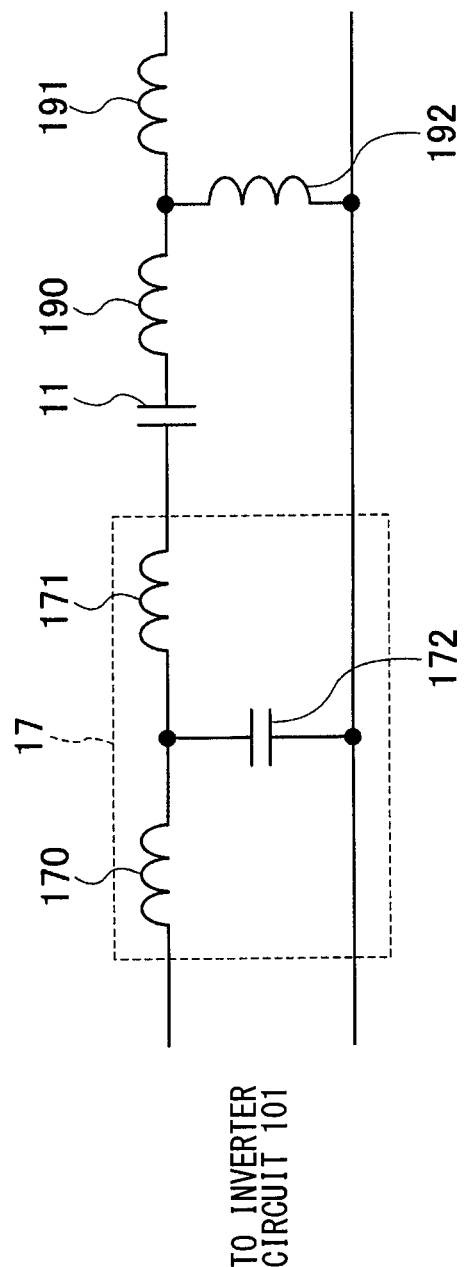
FIG. 50 is a circuit diagram of an equivalent circuit around the immittance conversion circuit in FIG. 48.
Figure 51:
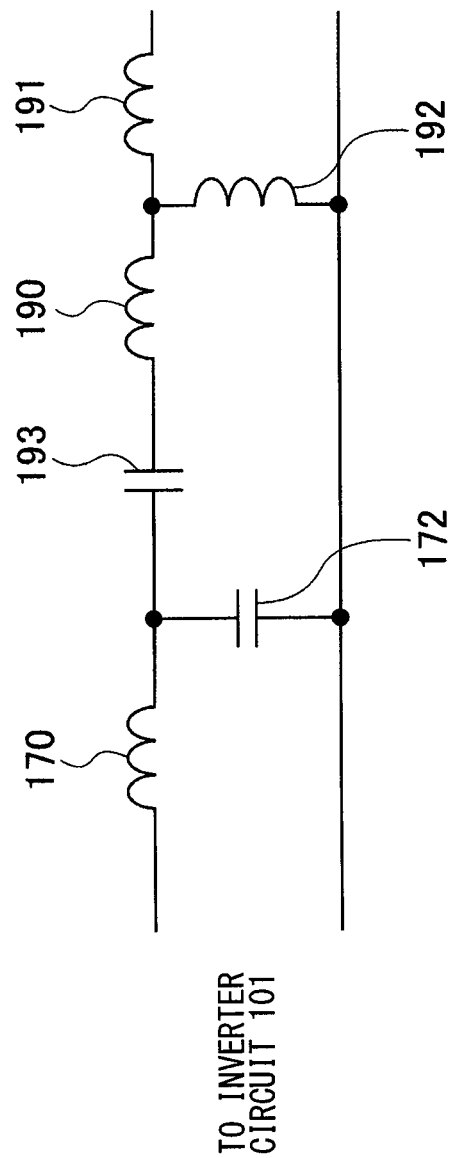
FIG. 51 is a circuit diagram further equivalently modified from the equivalent circuit around the immittance conversion circuit illustrated in FIG. 50.

Meanwhile, the power transmission coil 12 and the power receiving coil 13 are expressed by a T type equivalent circuit as illustrated in FIG. 50. In this example, the reactor 190 corresponds to a leakage inductance not coupled with the power receiving coil 13. The reactor 192 corresponds to a leakage inductance not coupled with the power transmission coil 12. The reactor 191 corresponds to a mutual inductance of the power transmission coil 12 and the power receiving coil 13. Further, as illustrated in FIG. 51, the reactor 171 of the immittance conversion circuit 17 and the power transmission side resonance capacitor 11 can be added together by an impedance at the frequency ω and replaced with an equivalent capacitor 193.

With the provision of the immittance conversion circuits 17 and 18, a configuration of a vector diagram showing a relationship between the output voltage vector and the current vector output from the power transmission circuit 10 is different from that in the first embodiment. However, as in the first embodiment, the power transmission side control circuit 161 controls the power transmission circuit 10 in consideration of the immittance conversion represented in Expression 38 on the basis of the vector diagram. As in the first embodiment, the AC voltage and AC current output from the power transmission circuit 10 can be directly controlled. Therefore, the non-contact power supply device can suppress the delay caused by the control and improve the responsiveness.

Subsequently, advantages of the non-contact power supply device according to the tenth embodiment will be described.

According to the tenth embodiment, the non-contact power supply device 1 has the immittance conversion circuits 17 and 18 between the power transmission circuit 10 and the power transmission coil 12 and between the power receiving coil 13 and the power receiving circuit 15. Therefore, the vector diagram showing the relationship between the output voltage vector and the output current vector output from the power transmission circuit 10 is different from that in the first embodiment. However, as in the first embodiment, the power transmission side control circuit 161 controls the power transmission circuit 10 on the basis of the relationship between the voltage vector and the current vector. Therefore, even when the power transmission side control circuit 161 is equipped with the immittance conversion circuits 17 and 18, the same advantages as those of the first embodiment can be obtained.

In the tenth embodiment, the example in which the immittance conversion circuits 17 and 18 are disposed between the power transmission circuit 10 and the power transmission coil 12 and between the power receiving coil 13 and the power receiving circuit 15, respectively is described. However, the present disclosure is not limited to the above configuration. The immittance conversion circuit may be disposed at least either between the power transmission circuit and the power transmission coil or between the power receiving coil and the power receiving circuit.

The configuration of the tenth embodiment can also be applied to other embodiments.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A non-contact power supply device comprising:
a power transmission coil that generates a magnetic flux by receiving an alternating current;
a power transmission circuit that is connected to the power transmission coil and supplies the alternating current to the power transmission coil;
a power transmission side control circuit that is connected to the power transmission circuit and controls the power transmission circuit;
a power receiving coil that generates an alternating current by interlinking the magnetic flux generated in the power transmission coil; and
a power receiving circuit that is connected to the power receiving coil and a power supply target, converts the alternating current supplied from the power receiving coil into a direct current, and supplies the direct current to the power supply target, wherein:
the power transmission side control circuit obtains a voltage vector target value based on a phase difference between a detected voltage vector of the alternating current output from the power transmission circuit and a detected current vector of the alternating current output from the power transmission circuit;
the power transmission side control circuit controls an inverter of the power transmission circuit to set the voltage vector of the alternating current output from the power transmission circuit such that a phase of the voltage vector of the alternating current output reaches a phase difference target value of the voltage vector target value, and a magnitude of the voltage vector of the alternating current output reaches an output voltage target magnitude of the voltage vector target value; and
the power transmission side control circuit calculates the output voltage target magnitude of the voltage vector target value, based on an output power target value that is a target value of an electric power to be supplied from the power receiving circuit to the power supply target or an output current target value that is a target value of the current to be supplied to the power supply target.

2. The non-contact power supply device according to claim 1, wherein:
the power transmission side control circuit obtains the voltage vector target value using a voltage vector indicative of an electromotive voltage generated by an impedance including a leakage inductance not coupled with the power receiving coil, and a voltage vector indicative of an electromotive voltage generated by an impedance including a leakage inductance not coupled with the power transmission coil, based on the phase difference between the detected voltage vector of the alternating current output from the power transmission circuit and the detected current vector of the alternating current output from the power transmission circuit.

3. The non-contact power supply device according to claim 1, wherein:
the power transmission side control circuit obtains the output voltage target magnitude based on the output power target value or the output current target value, a mutual inductance of the power transmission coil and the power receiving coil, a frequency of the alternating current output from the power transmission circuit, and an inductance of the power receiving coil.

4. The non-contact power supply device according to claim 3, wherein:
the power transmission side control circuit obtains the mutual inductance of the power transmission coil and the power receiving coil, based on an alternating voltage and the alternating current output from the power transmission circuit, a phase difference between the alternating voltage and the alternating current output from the power transmission circuit, the frequency of the alternating current output from the power transmission circuit, and the inductances of the power transmission coil and the power receiving coil.

5. The non-contact power supply device according to claim 1, wherein:
the power transmission side control circuit corrects the output voltage target magnitude based on the output power target value and the power to be supplied to the power supply target from the power receiving circuit or the output current target value and the current to be supplied to the power supply target from the power receiving circuit.

6. The non-contact power supply device according to claim 1, further comprising:
a power receiving side control circuit that transmits information, which is related to the power receiving coil and the power receiving circuit and necessary for controlling the power transmission circuit, to the power transmission side control circuit, wherein:
the power transmission side control circuit controls the power transmission circuit based on the information related to the power receiving coil and the power receiving circuit which is received from the power receiving side control circuit.

7. The non-contact power supply device according to claim 6, wherein:
the power transmission side control circuit and the power receiving side control circuit exchange information related to a phase of the current to be supplied from the power receiving coil to the power receiving circuit therebetween.

8. The non-contact power supply device according to claim 1, wherein:
the power transmission circuit includes an inverter circuit that is connected to the power transmission coil, has a switching device, converting an input direct current into an alternating current by switching the switching device, and supplies the alternating current to the power transmission coil; and
the power transmission side control circuit corrects the phase difference target value to set the current flowing in the switching device to be within a predetermined range from zero when the switching device is turned on.

9. The non-contact power supply device according to claim 1, wherein:
the power transmission side control circuit sets the phase difference, at which the magnitude of the current vector is minimum, to be the phase difference target value.

10. The non-contact power supply device according to claim 1, wherein:
the phase difference is represented as an angular frequency, and the power transmission side control circuit obtains the voltage vector target value based on the angular frequency of the detected voltage vector of the alternating current output from the power transmission circuit; and
the power transmission side control circuit controls the inverter of the power transmission circuit to set the voltage vector of the alternating current output from the power transmission circuit such that an angular frequency of the voltage vector of the alternating current output reaches an angular frequency target value of the voltage vector target value, and the magnitude of the voltage vector of the alternating current output reaches the output voltage target magnitude of the voltage vector target value.

11. The non-contact power supply device according to claim 10, wherein:
the power transmission side control circuit sets the angular frequency, at which the magnitude of the current vector is minimum, to the angular frequency target value.

12. The non-contact power supply device according to claim 1, wherein:
the power transmission side control circuit obtains an impedance including a leakage inductance not coupled with the power receiving coil, an impedance including a leakage inductance not coupled with the power transmission coil, and a mutual inductance of the power transmitting coil and the power receiving coil, based on an output voltage and an output current of the power transmission circuit, a phase difference between the output voltage and the output current of the power transmission circuit, an angular frequency of an output of the power transmission circuit, and an output voltage and an output current of the power receiving coil.

13. The non-contact power supply device according to claim 1, further comprising:
an immittance conversion circuit disposed in at least one of between the power transmission circuit and the power transmission coil and between the power receiving coil and the power receiving circuit.

* * * * *